(12) United States Patent
Biebel

(10) Patent No.: US 10,704,249 B2
(45) Date of Patent: Jul. 7, 2020

(54) MECHANICAL CLOSURE DEVICE

(71) Applicant: Art Metal Industries, New Milford, CT (US)

(72) Inventor: Kevin Biebel, New Milford, CT (US)

(73) Assignee: Art Metal Industries, LLC, New Milford, CT (US)

(*) Notice: Subject to any disclaimer, the term of this patent is extended or adjusted under 35 U.S.C. 154(b) by 68 days.

(21) Appl. No.: 15/678,285

(22) Filed: Aug. 16, 2017

(65) Prior Publication Data

US 2018/0051452 A1 Feb. 22, 2018

Related U.S. Application Data

(60) Provisional application No. 62/376,051, filed on Aug. 17, 2016.

(51) Int. Cl.
*E03F 5/04* (2006.01)
*F16K 1/20* (2006.01)
(Continued)

(52) U.S. Cl.
CPC .............. *E03F 5/0411* (2013.01); *E02B 7/26* (2013.01); *E02D 29/00* (2013.01);
(Continued)

(58) Field of Classification Search
CPC .......... F16K 1/16; F16K 1/165; F16K 1/2021; F16K 3/00; F16K 3/02; F16K 3/0209;
(Continued)

(56) References Cited

U.S. PATENT DOCUMENTS

| | | |
|---|---|---|
| 231,544 A | 8/1880 | Darst |
| 699,468 A | 5/1902 | Jackson |

(Continued)

FOREIGN PATENT DOCUMENTS

| | | |
|---|---|---|
| CN | 2522695 | 11/2002 |
| CN | 1961993 | 4/2011 |

(Continued)

OTHER PUBLICATIONS

The "Original" DraftStoppa, Advantec Australasia Pty Ltd, Jan. 28, 2009.

(Continued)

*Primary Examiner* — Kevin L Lee
(74) *Attorney, Agent, or Firm* — Alix, Yale & Ristas, LLP

(57) ABSTRACT

A mechanical closure device comprises an enclosure having four sides, a top and bottom and defining a discharge opening at the bottom. A floodgate assembly is interiorly removably mounted to the enclosure and comprises a pair of doors pivoted on a hinge assembly between an opened position and closed position. In the closed position, the doors seal against the flange to prevent passage of water through the discharge opening. A discharge drain assembly is preferably disposed on one door and has an opened and a closed position. An appendage is provided to facilitate opening and of the door. Upon removal, the floodgate assembly is stably positionable on a multipositionable service rack. A multipurpose tool is employed unlatching the floodgate doors and slidably removing the floodgate assembly.

24 Claims, 68 Drawing Sheets

(51) Int. Cl.
*E02D 29/14* (2006.01)
*E02D 29/00* (2006.01)
*F16K 3/02* (2006.01)
*E02B 7/26* (2006.01)
*E03F 5/06* (2006.01)

(52) U.S. Cl.
CPC ........ *E02D 29/1481* (2013.01); *F16K 1/2021* (2013.01); *F16K 3/02* (2013.01); *E03F 5/06* (2013.01)

(58) Field of Classification Search
CPC .. E03F 5/0411; E03F 5/06; E02B 7/26; E02B 7/28; E02B 7/00
See application file for complete search history.

(56) References Cited

U.S. PATENT DOCUMENTS

| | | | |
|---|---|---|---|
| 930,829 | A | 8/1909 | Bolling |
| 1,715,903 | A | 6/1929 | Dame |
| 2,586,967 | A | 2/1952 | Lundy |
| 2,741,972 | A | 8/1953 | Pryne |
| 4,073,147 | A | 2/1978 | Nomura |
| 4,362,118 | A | 12/1982 | Koch, Jr. et al. |
| 4,474,167 | A | 10/1984 | McCabe |
| 5,711,343 | A | 1/1998 | Beckett |
| 6,287,050 | B1 | 9/2001 | Montgomery et al. |
| 6,623,209 | B1 | 9/2003 | Waters, Jr. |
| 7,101,114 | B1 | 9/2006 | Waters, Jr. |
| 7,234,894 | B1 | 6/2007 | Flury |
| 7,435,035 | B2 | 10/2008 | Cullen |
| 7,467,911 | B2 | 12/2008 | Flury |
| 7,523,589 | B1 * | 4/2009 | Smith ............... E06B 9/02 49/463 |
| 7,926,539 | B1 | 4/2011 | Hurst et al. |
| 8,033,753 | B2 * | 10/2011 | Waters, Jr. .......... E21F 1/08 405/96 |
| 8,246,272 | B1 * | 8/2012 | Heitz ............... E06B 9/04 405/105 |
| 8,695,628 | B2 * | 4/2014 | Komatsu et al. ..... E03F 9/007 137/423 |
| 9,004,814 | B2 | 4/2015 | Petrillo |
| 9,752,342 | B2 | 9/2017 | Waters, Jr. |
| 2008/0016780 | A1 | 1/2008 | McDougle et al. |
| 2009/0120855 | A1 | 5/2009 | Flury |
| 2012/0034032 | A1 | 2/2012 | Waters, Jr. |
| 2013/0209173 | A1 * | 8/2013 | Quek ............... E04H 9/145 405/87 |
| 2014/0241804 | A1 | 8/2014 | Petrillo |
| 2016/0097212 | A1 * | 4/2016 | Waters, Jr. .......... E05F 1/02 49/13 |
| 2017/0314808 | A1 | 11/2017 | Waters, Jr. et al. |
| 2017/0314809 | A1 | 11/2017 | Waters, Jr. et al. |
| 2017/0314810 | A1 | 11/2017 | Waters, Jr. et al. |
| 2017/0343237 | A1 | 11/2017 | Waters, Jr. et al. |
| 2017/0343238 | A1 | 11/2017 | Waters, Jr. et al. |

FOREIGN PATENT DOCUMENTS

| | | |
|---|---|---|
| CN | 201962783 | 9/2011 |
| CN | 102392686 | 3/2012 |
| CN | 202187317 | 4/2012 |
| CN | 103256407 | 8/2013 |
| DE | 102009050535 | 4/2011 |
| EP | 2314356 | 4/2011 |
| GB | 1247798 | 9/1971 |
| JP | H0426037 | 2/1987 |
| JP | H10140592 | 5/1998 |
| JP | 2003253912 | 9/2003 |
| JP | 2005061201 | 3/2005 |
| JP | 2008133708 | 6/2008 |
| KR | 200192098 | 8/2000 |
| KR | 2020020013062 | 4/2002 |
| KR | 200280864 | 6/2002 |
| KR | 1020100074363 | 7/2010 |
| KR | 20100123473 | 11/2010 |
| WO | WO2006074702 | 7/2006 |
| WO | WO2009082882 | 7/2009 |

OTHER PUBLICATIONS

Installation Instructions for Model RSK Backdraft Damper, Fantech, Oct. 26, 2004.
Model A 21 $2^2$(65mm) Dry Pipe Valve—Reliable Automatic Sprinkler Co., (published prior to Aug. 17, 2016).
Dry-Pipe, Deluge, Preaction Valves & Accessories, Factory Mutual Insurance Company, Jun. 2009.
Model D Dry Pipe Valve, Tyco Fire Protection Products, Feb. 2012.
Viking-F-1-Dry-Valve-Data-Sheet, The Viking Corporation, Mar. 28, 2013.
Model DPV-1 Dry Pipe Valve, DN100 and DN150 Model ACC-1 Dry Pipe Valve Accelerator European Conformity Valve Trim, 16 bar, Tyco Fire Protection Products, Feb. 2012.
http://floodbreak.com/products/vent-shaft-flood-protection/vent-shaft-system/, Floodbreak, (web page available, Vent Shaft System, Oct. 2014).
Round Backdraft Dampers Now Available from Greenheck, Greenheck, May 26, 2018.
Fire Dampers Type: Butterfly 60min, (published prior to Aug. 17, 2016).
Fundamentals of fluid mechanics, Bruce R. Munson, (published prior to Aug. 17, 2016).
Translation of EP2314356, Schwenzer, Apr. 27, 2011.
Translation of CN103256407, Xingqiu, Aug. 21, 2013.
Translation of CN1961993, Qi, Jun. 4, 2011.
Translation of CN2522695, Zhang, Nov. 27, 2002.
Translation of KR200192098, Dae Hyung Co Ltd, Aug. 16, 2000.
Translation of CN201962783, Xiamen Kaili Hardware Entpr Co Ltd, Sep. 7, 2011.
Translation of KR200280864, Chung et al, Jun. 24, 2002.
Translation of KR2020020013062, Jeon, Apr. 29, 2002.
Translation of CN102392686, Han et al, Mar. 28, 2012.
Translation of JP2003253912, Tomoshi et al, Sep. 10, 2003.
Translation of JPH04026037, Tatsuro et al, Feb. 3, 1987.

* cited by examiner

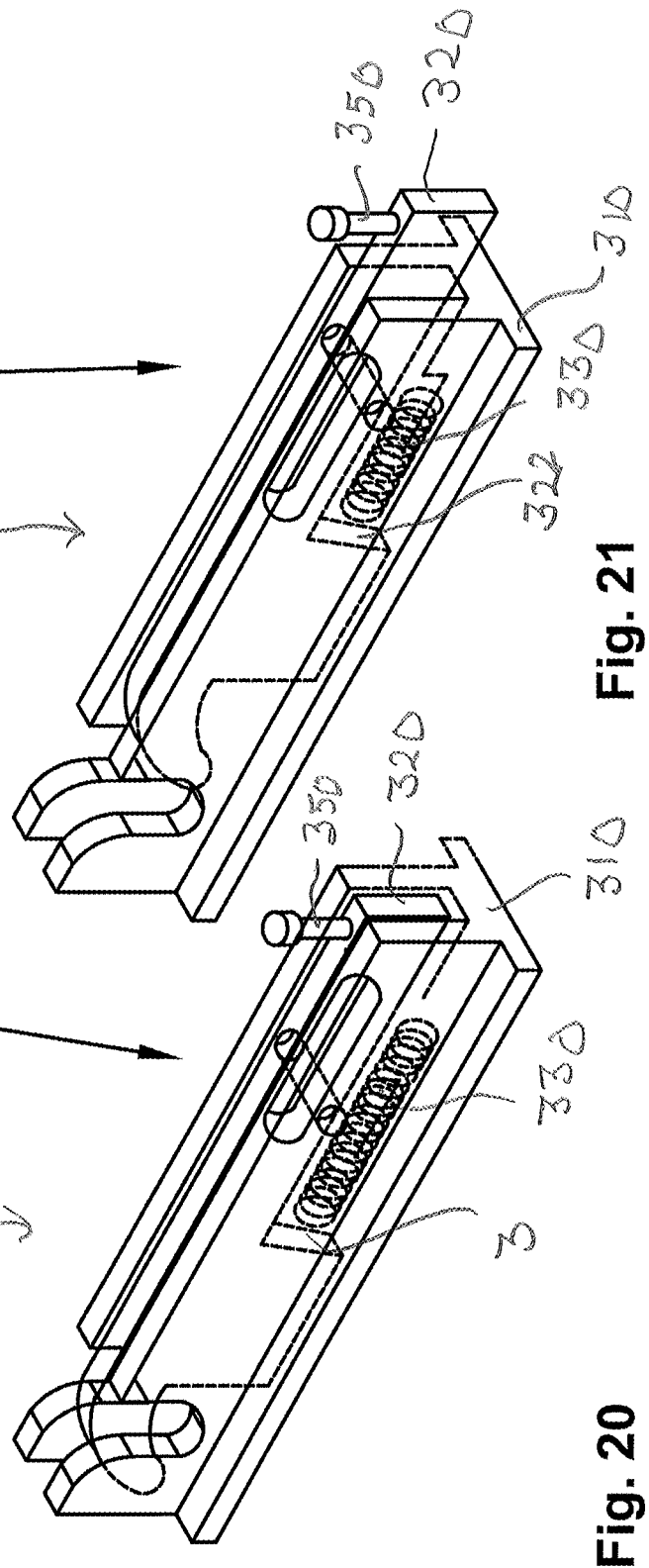

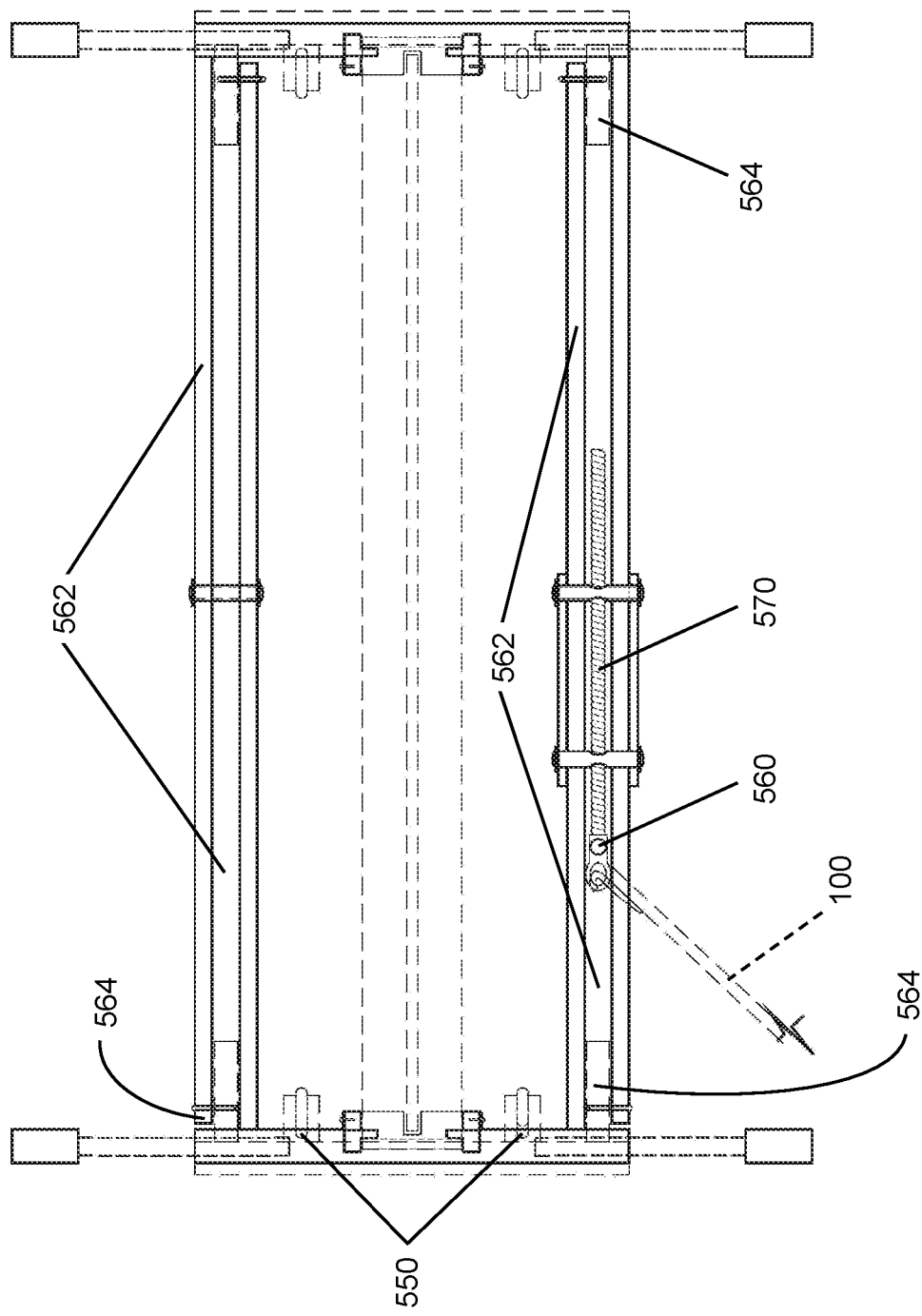

MECHANICAL CLOSURE DEVICE

CROSS-REFERENCE TO RELATED APPLICATION

This application claims priority of U.S. Provisional Patent Application No. 62/376,051 filed on Aug. 17, 2016, the disclosure of which is incorporated herein by reference.

BACKGROUND

This disclosure relates generally to devices and methods for protecting openings from flood damage. More particularly, this disclosure relates to mechanical devices for protecting vulnerable openings from flood damage, especially below-grade openings in urbanized environments.

Mechanical closure devices have been advanced to passively protect openings from being deluged with flood waters. In particular, subway system vent shafts and other below ground openings may be very vulnerable to water inundation during flooding conditions and coastal storm surges.

It is highly desired that a mechanical closure device (hereafter "MCD") be relatively easily installed beneath a street level grate and that the MCD be relatively easily removed for maintenance and storage purposes when conditions so warrant. In addition, it is highly desirable that once installed, the MCD be secured in place and resistant to vandalism and to attempts to remove or change the functional mode of the MCD without authorization. It is also highly desirable that the MCD be easily operated to close the floodgates by authorized personnel when conditions dictate. The MCD should also be easily transformed between opened and closed positions and provide a closure function which provides a high degree of sealing integrity when the MCD doors are closed during flooding or imminent flooding conditions.

In addition, it is highly desirable that the mechanical floodgate assembly be easily removed from the enclosure for maintenance.

SUMMARY

Briefly stated, a mechanical closure device comprises an enclosure having four sides, a top and a bottom with the flange projecting inwardly at the bottom and defining a discharge opening. A floodgate assembly is interiorly removably mounted to the enclosure. The floodgate assembly mounts a pair of doors pivoted on a hinge assembly between an opened position and a closed position wherein the door is sealed against the flange to prevent passage of water through the opening. At least one appendage is mounted to each door to facilitate opening and closing the door. A discharge drain assembly is disposed on one door and has an opened and a closed position.

The floodgate assembly further comprises a debris deflector substantially extending between opposed sides of the enclosure and disposed above the hinge assembly. The debris shield further includes a pair of spaced openings. The enclosure mounts a plurality of lift tabs. At least one appendage generally aligns with an opening in the debris shield. At least one appendage defines an opening. A T-shaped tool mounts a hook which is engageable in the appendage opening.

The floodgate assembly further comprises a pair of spaced supports which mount the hinge assembly and are slidably received in opposed channel-like guides and secured to the opposed sides of the enclosure. A bolt secures the extension to the enclosure and a T-shaped tool having a torque driver is engageable with the bolt for tightening or loosening the bolt.

Each of the doors mounts a gasket at its underside for sealing between the door and the flange in the closed position. The hinge assembly further comprises an elongated rod which engages each of the doors to form a piano hinge. The rod has opposed ends which are received in a sleeve and the rod moves in a slot of the floodgate assembly.

The discharge drain has a lockable latch and doors cannot be moved to the opened position unless the drain assembly is in a closed position.

In one embodiment, a mechanical closure device comprises an enclosure having four sides, a top and a bottom with a sealing portion projecting inwardly at the bottom and defining a discharge opening. At least one floodgate assembly is interiorly mounted in the enclosure and slidably dismountable therefrom. Each floodgate assembly mounts at least one door pivoted on a hinge assembly between an opened position and a closed position wherein each door seals against the sealing portion to prevent passage of water through the discharge opening. At least one appendage is mounted to each door to facilitate opening and closing the door. A discharge drain assembly is disposed on one door and has an opened and a closed position.

Each floodgate assembly further comprises a debris deflector substantially extending between opposed sides of the enclosure and disposed above the hinge assembly and mounting a latch assembly. The debris shield further defines an opening which accesses the latch assembly. Each of the doors mounts a gasket at its underside for sealing between the door and the sealing portion in the closed position.

There are two substantially identical floodgate assemblies and four doors in one embodiment.

The floodgate assembly is mountable to an enclosure and comprises a frame assembly comprising spaced supports and a debris shield extending between the supports. A pair of doors is hinged to the frame assembly and is moveable between an opened and a closed position. At least one handle is pivotally mounted to a debris shield and the handle has a pair of end portions which engage the doors for securing the doors in the opened position.

A variably positionable service rack receives the floodgate assembly. The service rack comprises a jack assembly which positions the received assembly at a plurality of selected heights.

BRIEF DESCRIPTION OF THE DRAWINGS

FIG. 20 is an annotated perspective view of the locking latch of FIG. 19 in an unlatched position;

FIG. 21 is an annotated perspective view, portions in phantom, of the latched mode for the locking latch assembly of FIG. 19;

FIG. 68 is a plan view of the service rack of FIG. 59 at the high point expanded position of FIG. 66, portions of the floodgate assembly and the service rack in a collapsed being illustrated in phantom.

DETAILED DESCRIPTION

Figure 5:
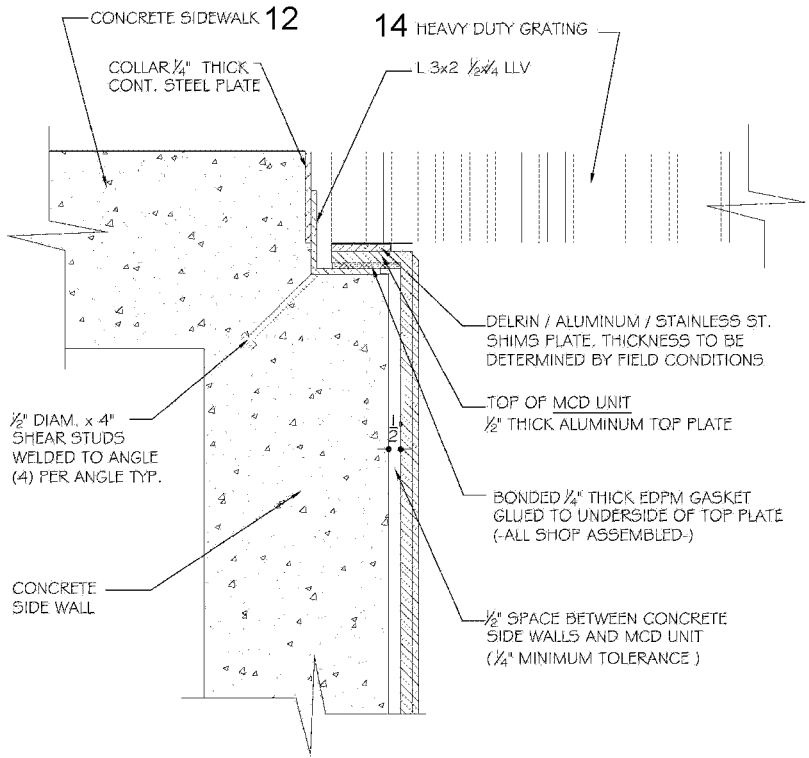
FIG. 5 is an annotated side sectional view of portions of a sidewalk structure, a sidewalk gate and a portion of an installed MCD.

With reference to the drawings wherein like numerals represent like parts throughout the several figures, an MCD is generally designated by the numeral 10. MCD 10 is especially adapted for dropping into a below-grade opening, such as for example, a vent opening through a sidewalk (shown generally as 12 in FIG. 5) and disposed below a sidewalk grate (shown generally as 14 in FIG. 5).

The MCD 10 functions to provide a passage which is normally open, but incorporates a floodgate control assembly 50 which functions in a closed position to prevent the inundation of water through an opening. Although the MCD 10 is especially adapted, for example, for vent shafts in a subway system or other similar type applications, the MCD 10 can clearly be implemented in a wide variety of below grade openings so that it is easily transformable to a floodgate to prevent the inundation of water through the protective opening.

Figure 3:
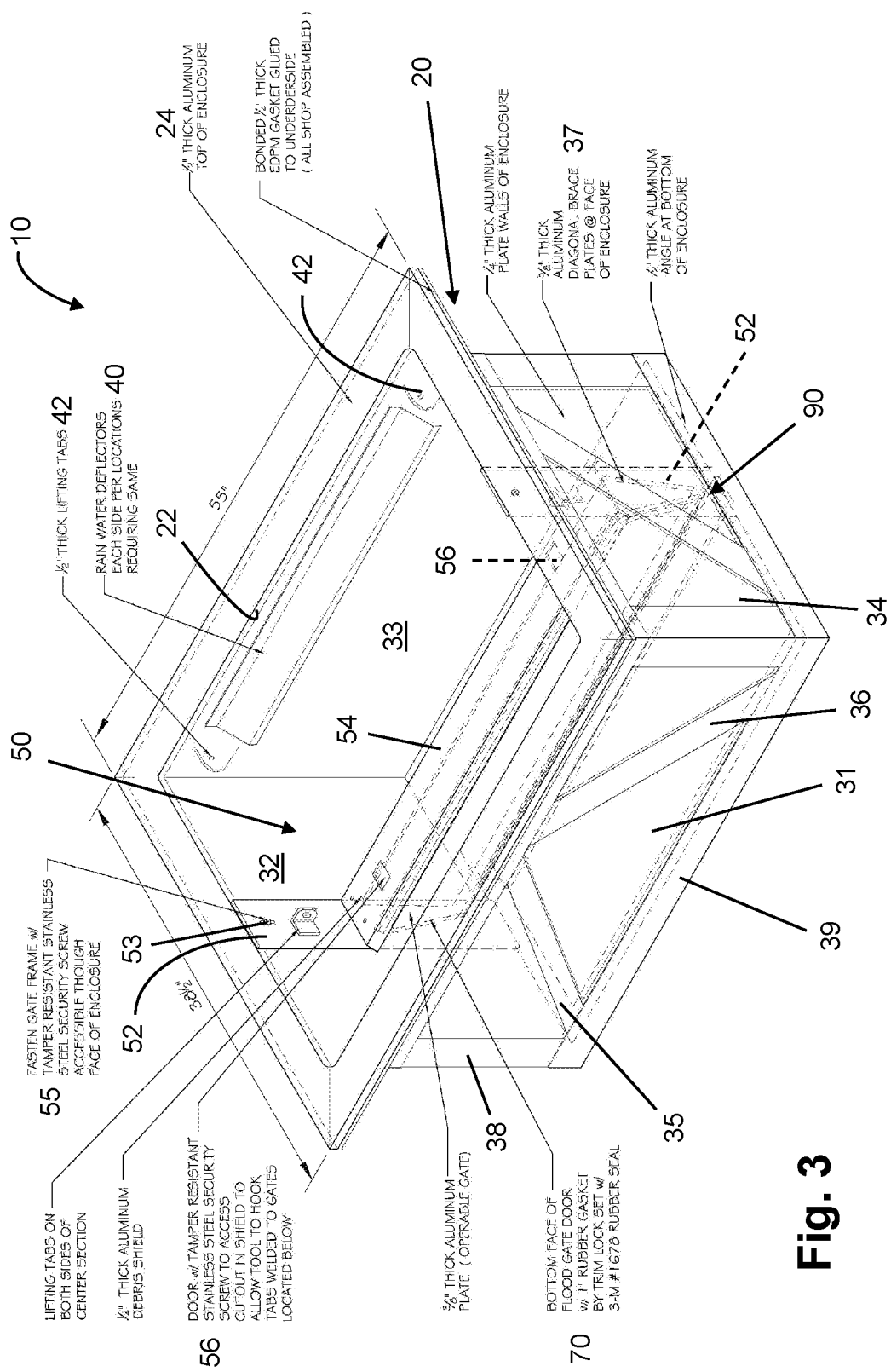
FIG. 3 is an annotated diagrammatic perspective view, portions shown in phantom, of an MCD with the floodgate doors in an opened position.
Figure 4:
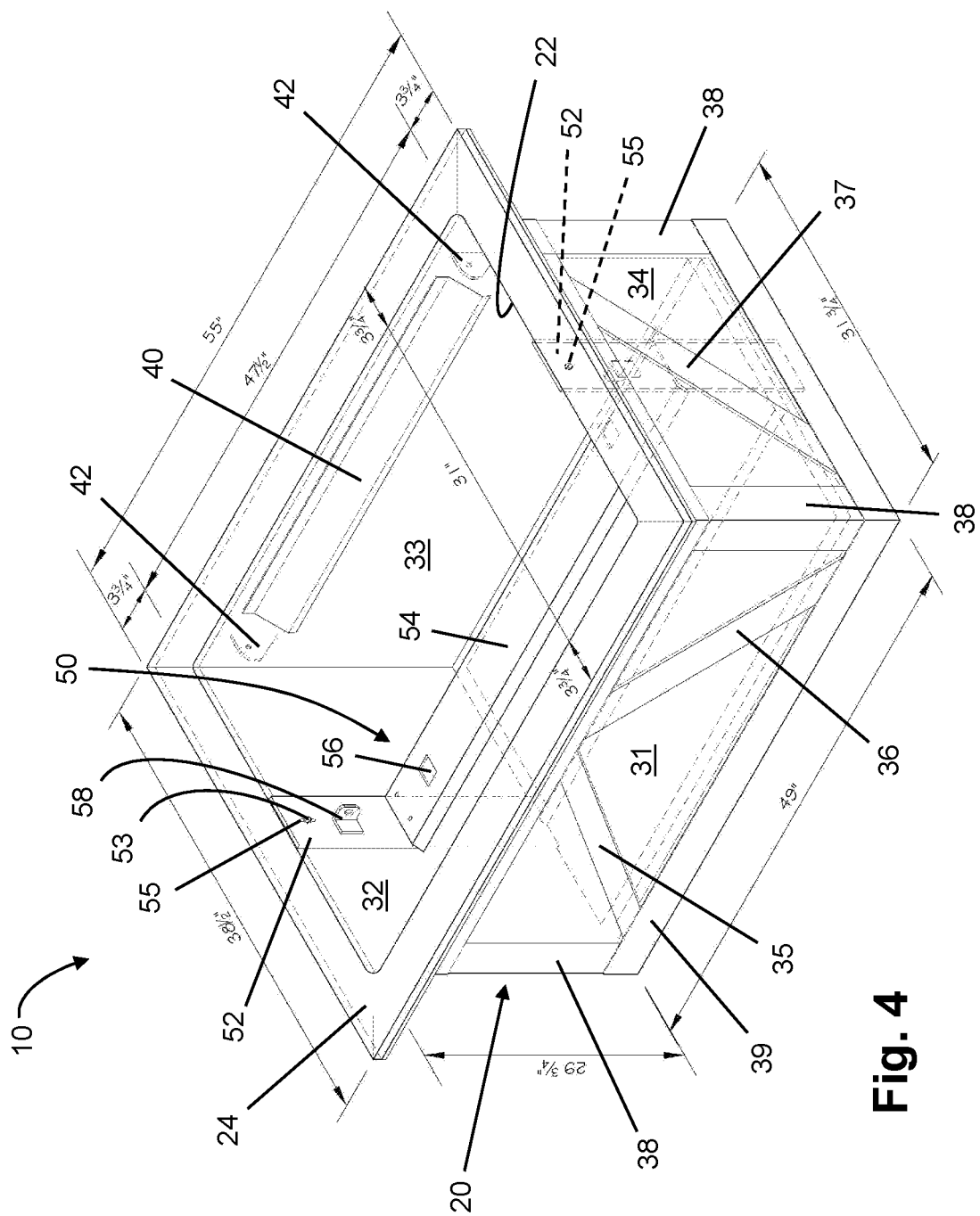
FIG. 4 is an annotated diagrammatic perspective view, portions in phantom, of an MCD with the floodgate doors being disposed in a closed position.

With reference to FIGS. 3 and 4, the MCD 10 may be generally described as a four-sided enclosure 20 having an opened top 22 with a peripheral circumferential lip 24 and a bottom portion 26 with an interior inwardly extending flange 28 which defines a bottom opening 30. The enclosure may be further described as having four metal side panels 31-34 which are reinforced by metal braces 35, 36 and 37 and corner pieces 38 and 39.

Rainwater deflectors 40 longitudinally extend at the interior upper portions of the elongated sides 31 and 33 of the enclosures. Half-inch thick lifting tabs 42 are mounted to the sides 31 and 33 at spaced opposite ends from the deflectors 40. The lifting tabs 42 are positioned and have sufficient integrity to allow the enclosures to be lifted for installation and removal purposes.

Figure 1:
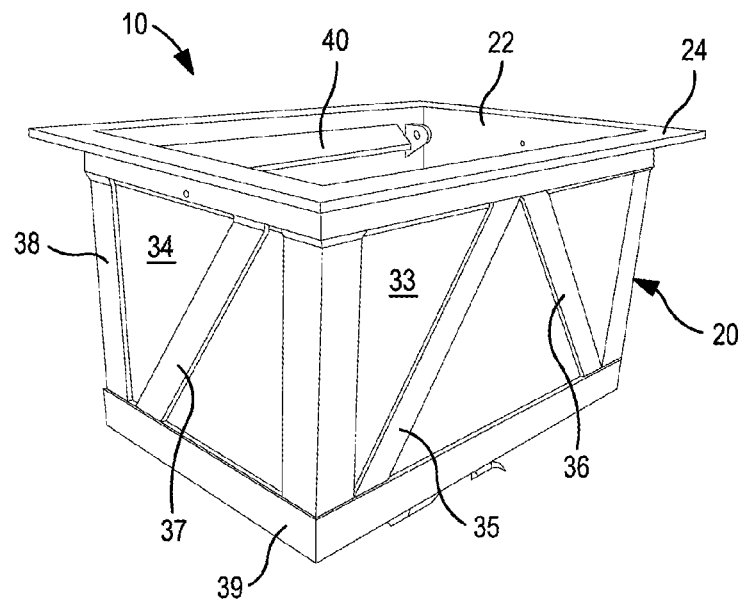
FIG. 1 is a photograph of an MCD.
Figure 2:
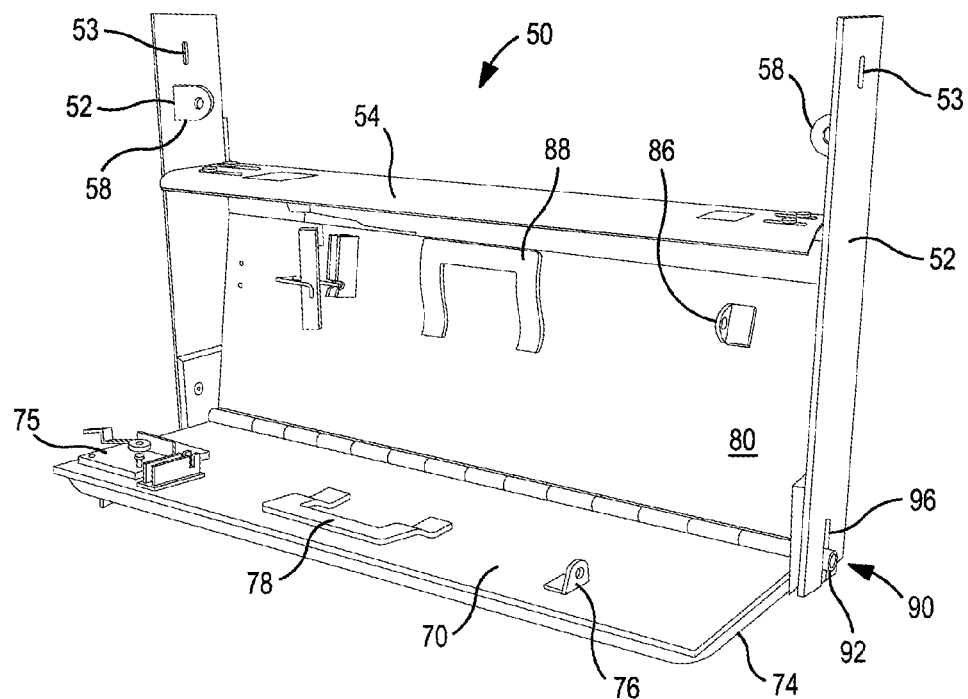
FIG. 2 is a photograph of a floodgate control assembly with one door being disposed in a closed position and a second door being disposed in an opened position.

A floodgate control assembly is generally designated by the numeral 50 (FIG. 2). The floodgate control assembly comprises a pair of longitudinally spaced elongated supports 52 which are substantially identical and generally extend from the top to the bottom of the enclosure. The supports 52 mount against medial portions of the sides 32 and 34. The supports have an opening 53 which receives a bolt for fastening the supports to the sides 32 and 34 of the enclosure. An elongated canopy-like debris shield 54 extends the length of the spacing between the supports 52 and is connected to each of the supports at an upper location. The debris shield 54 includes an access opening 56 adjacent each end of the shield. The supports 52 include a lifting tab 58 at an upper location.

Figure 7:
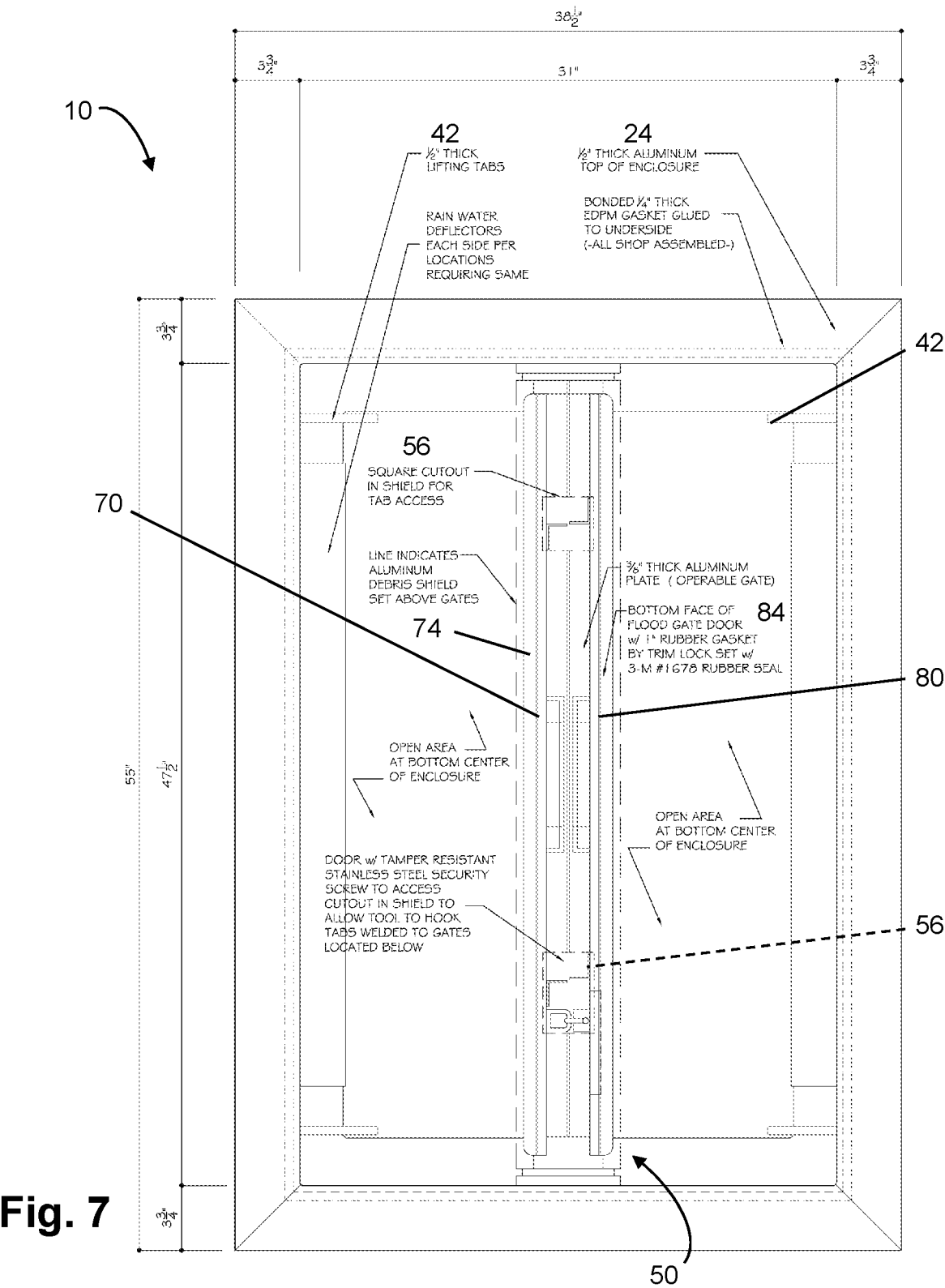
FIG. 7 is an annotated diagrammatic top plan view, portions in phantom, of the MCD of FIG. 3 with the floodgate doors in an opened position.
Figure 8:
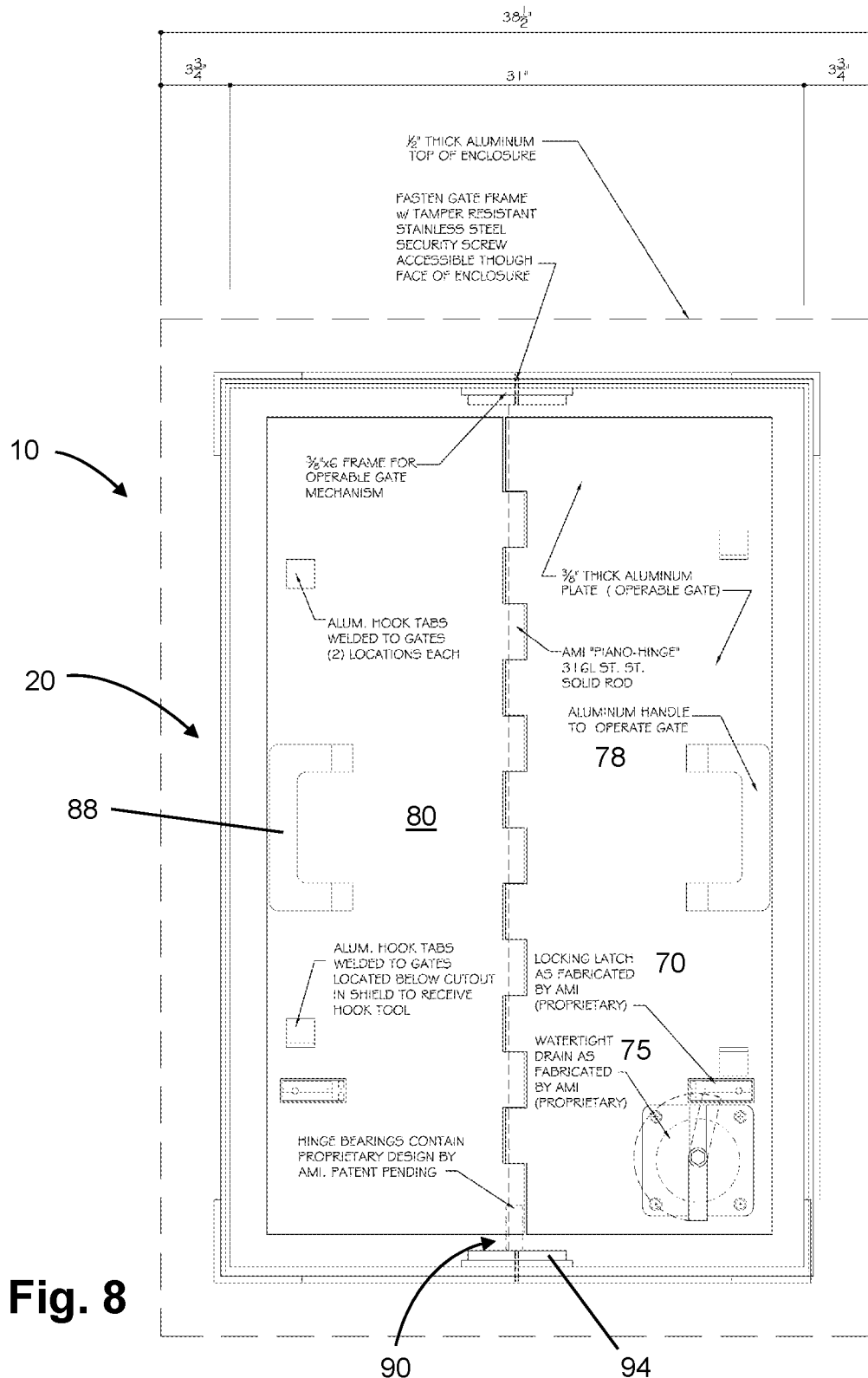
FIG. 8 is an annotated diagrammatic top plan view, portions in phantom, of the MCD of FIG. 3 with the floodgate doors in a closed position.
Figure 9:
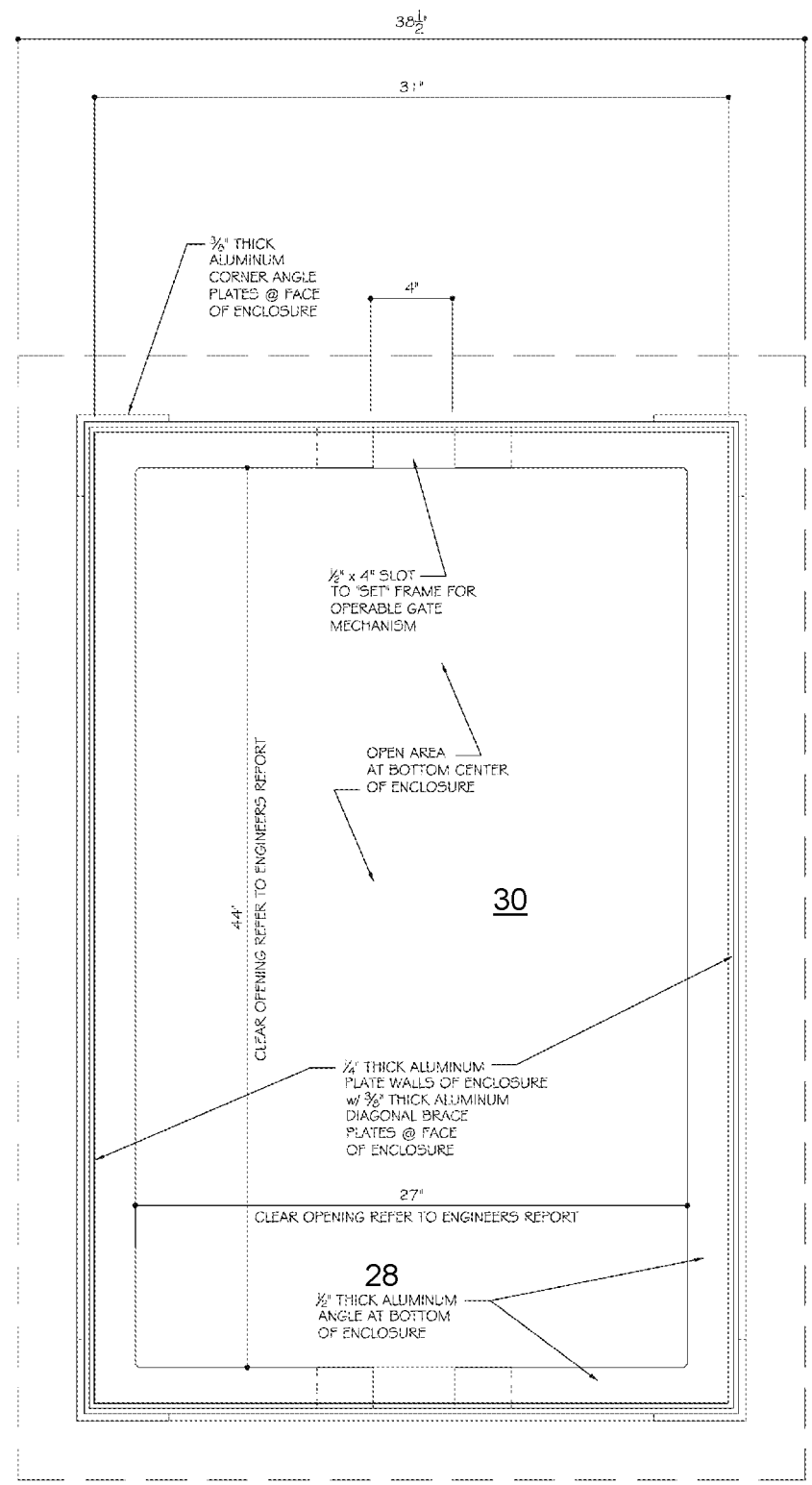
FIG. 9 is an annotated diagrammatic top plan view, portions in phantom, of the MCD of FIG. 3 with the floodgate control assembly being removed.
Figure 10:
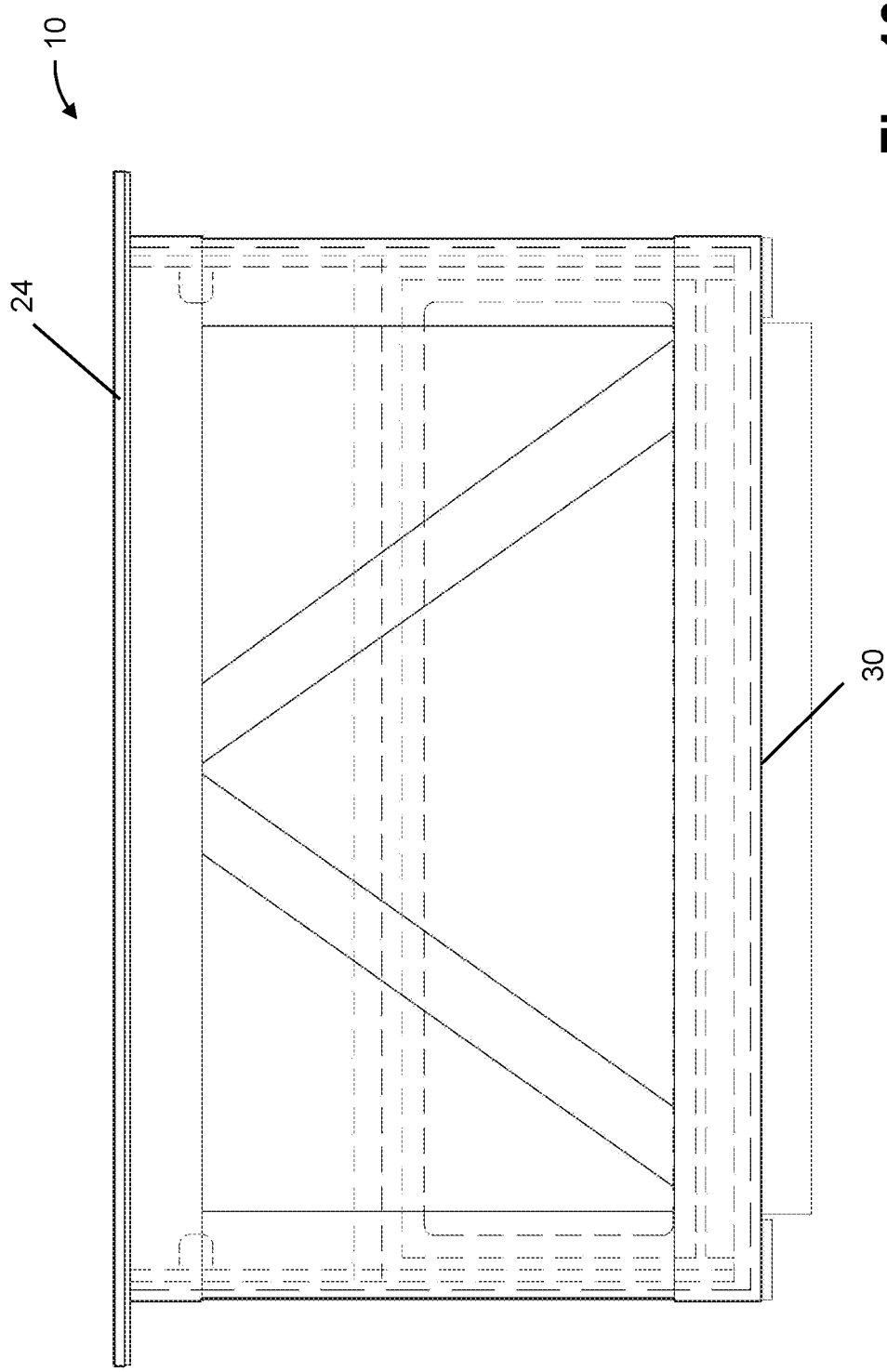
FIG. 10 is an annotated diagrammatic side elevational view, portions in phantom, of an elongated view of the MCD of FIG. 3.
Figure 13:
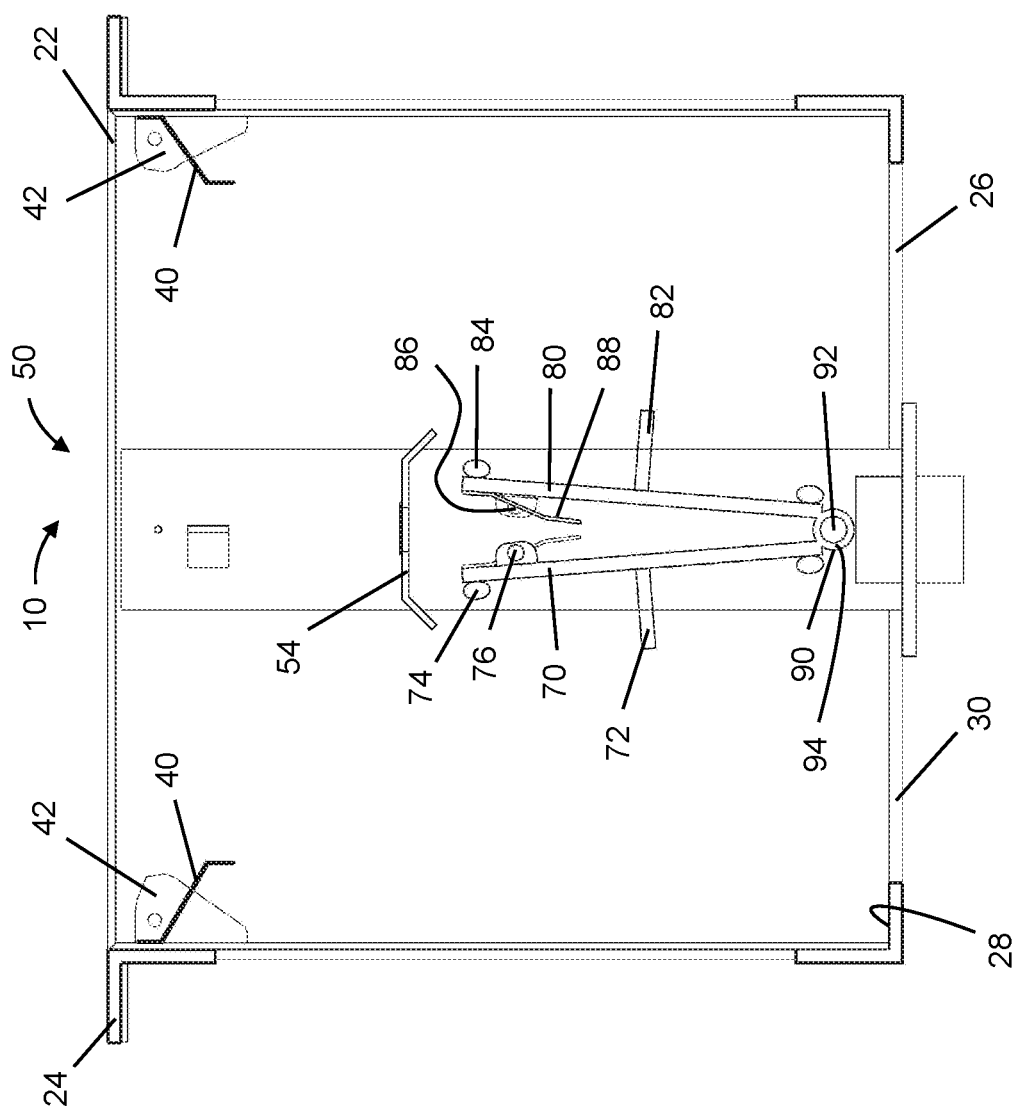
FIG. 13 is a second annotated diagrammatic elevational view, portions in phantom, of the MCD of FIG. 3 with the end panel removed and the floodgate doors in an opened position.
Figure 14:
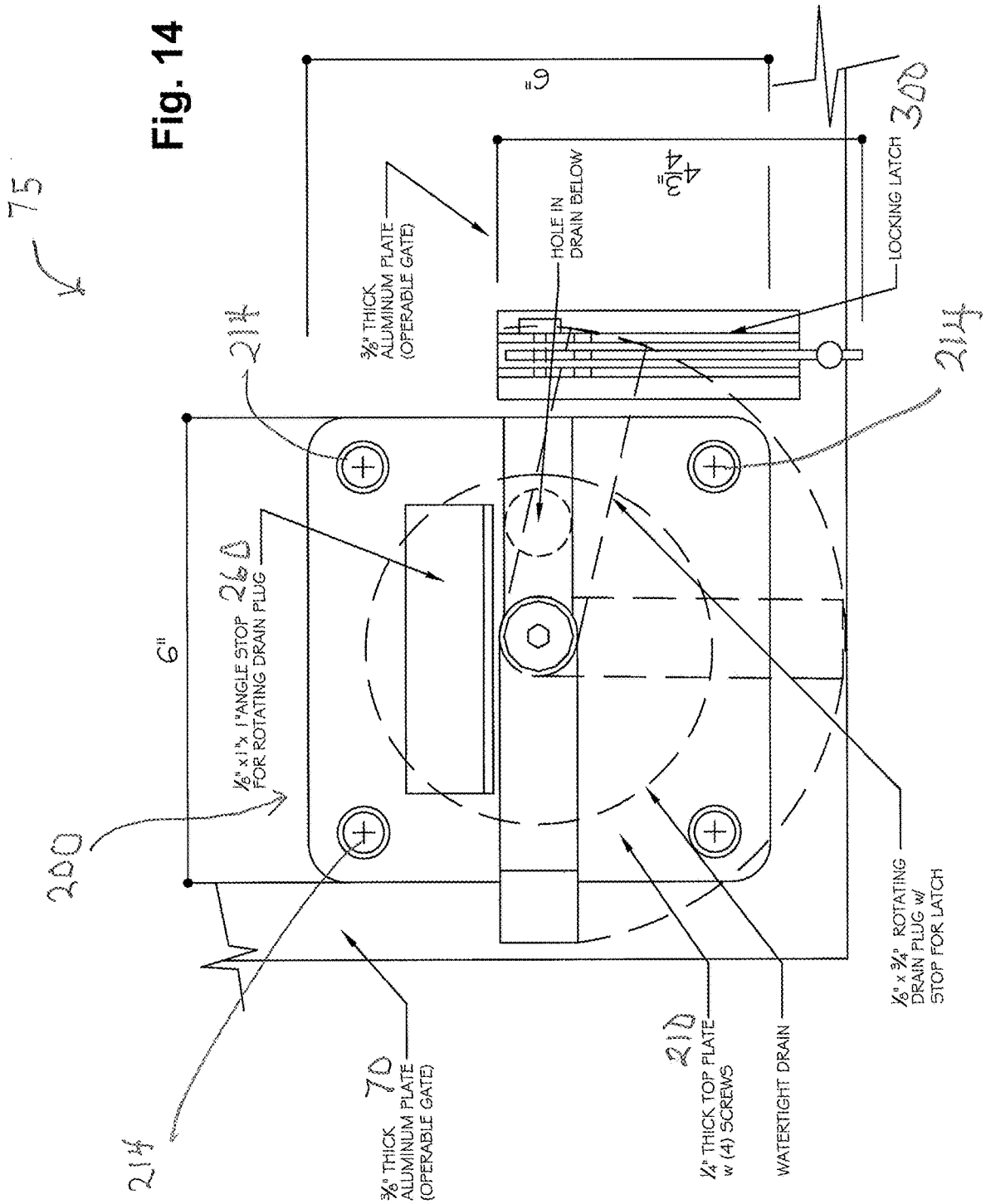
FIG. 14 is an enlarged annotated diagrammatic top plan view of a drain assembly and latch for the MCD of FIG. 3.

A pair of floodgate doors which may be ¾ inch thick aluminum 70 and 80 are mounted to the lower portions of the supports. The gates 70 and 80 are pivotal about a hinge assembly 90 and are movable between an upper opened position, as best illustrated in FIGS. 7 and 13 and a closed position, as best illustrated in FIG. 8. The floodgate doors 70 and 80 each include longitudinal reinforcement ribs 72 and 82 (FIG. 13).

Figure 22:
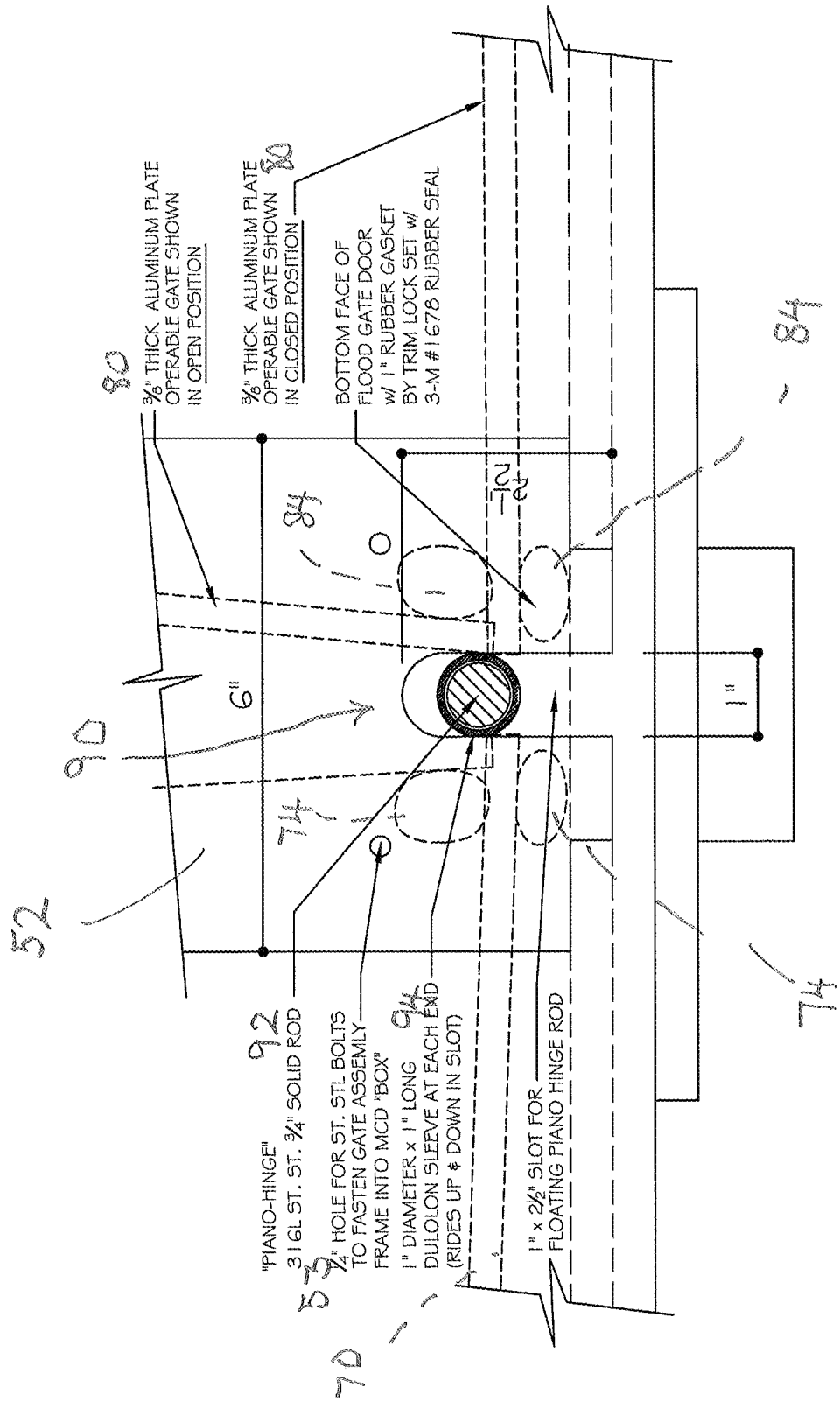
FIG. 22 is an enlarged annotated diagrammatic fragmentary elevational view, portions in phantom, of a hinge portion of the floodgate control assembly for the MCD of FIG. 3.
Figure 23:
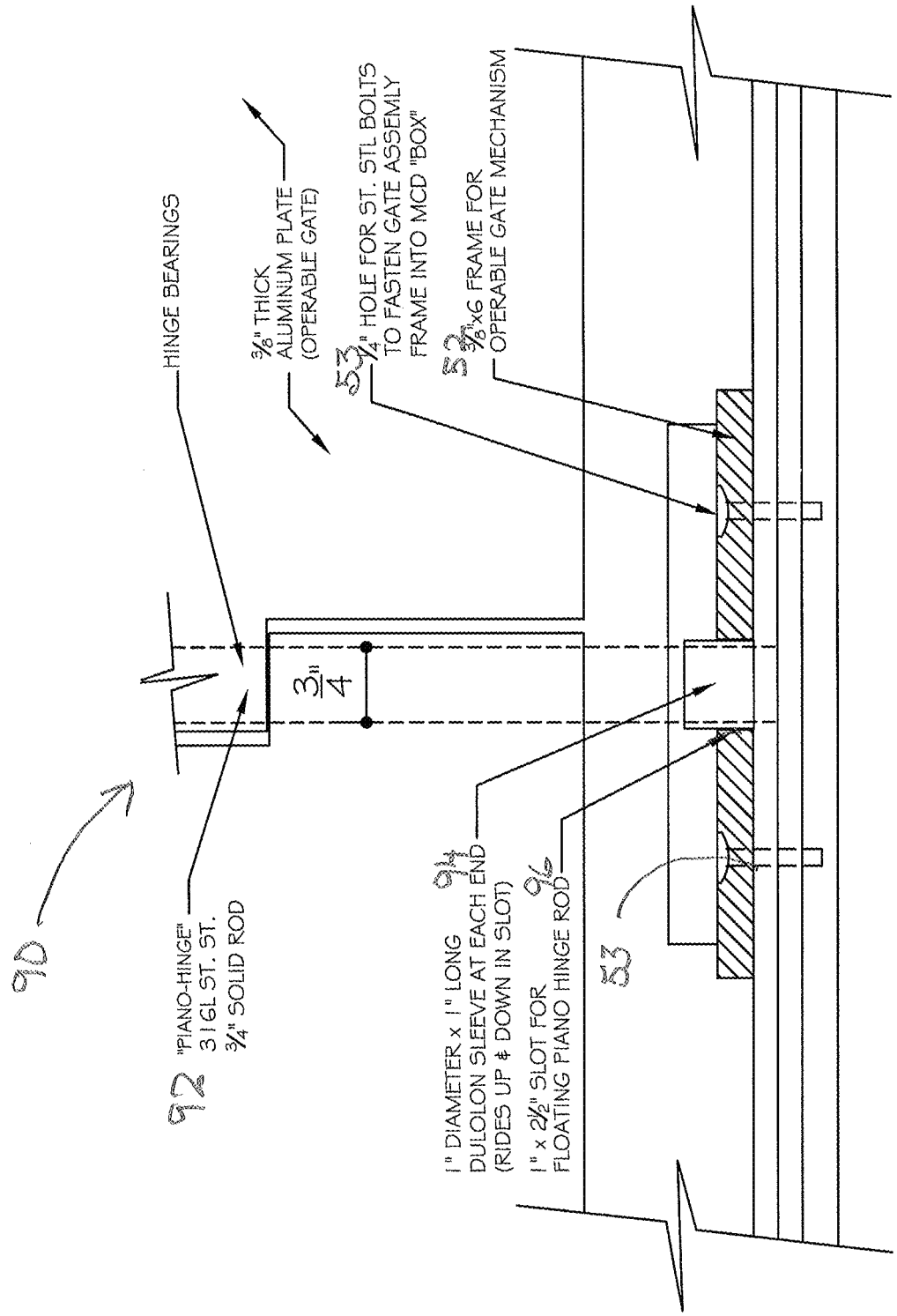
FIG. 23 is an annotated sectional view of the floodgate hinge portion of FIG. 22.
Figure 24:
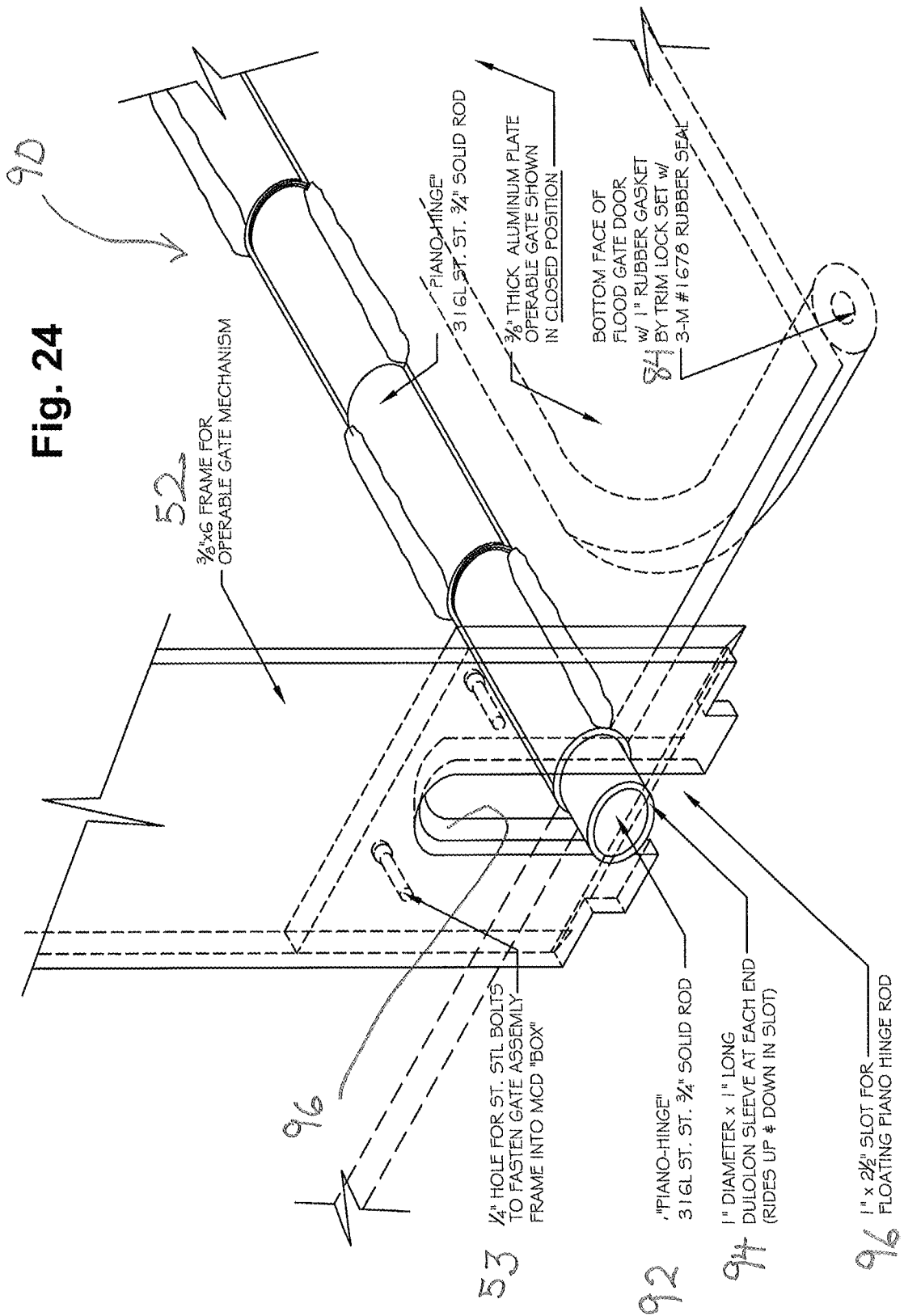
FIG. 24 is an annotated fragmentary perspective view, portions in phantom, of the floodgate hinge portion of FIG. 22.
Figure 25A:
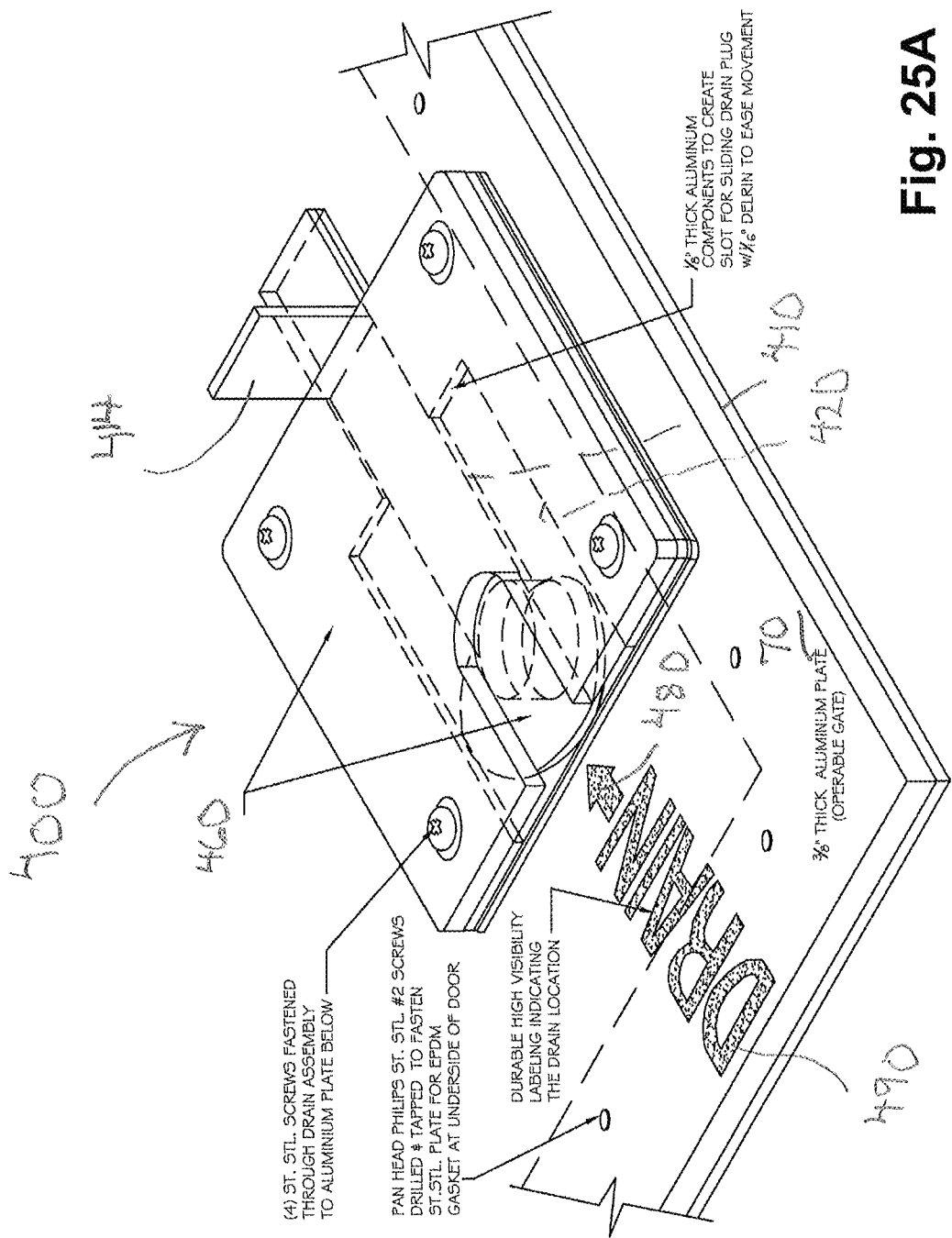
FIGS. 25A and 25B are perspective views, portions shown in phantom, of an alternate embodiment of a drain assembly mounted to a portion of a gate in the closed and the opened positions, respectively.
Figure 25B:
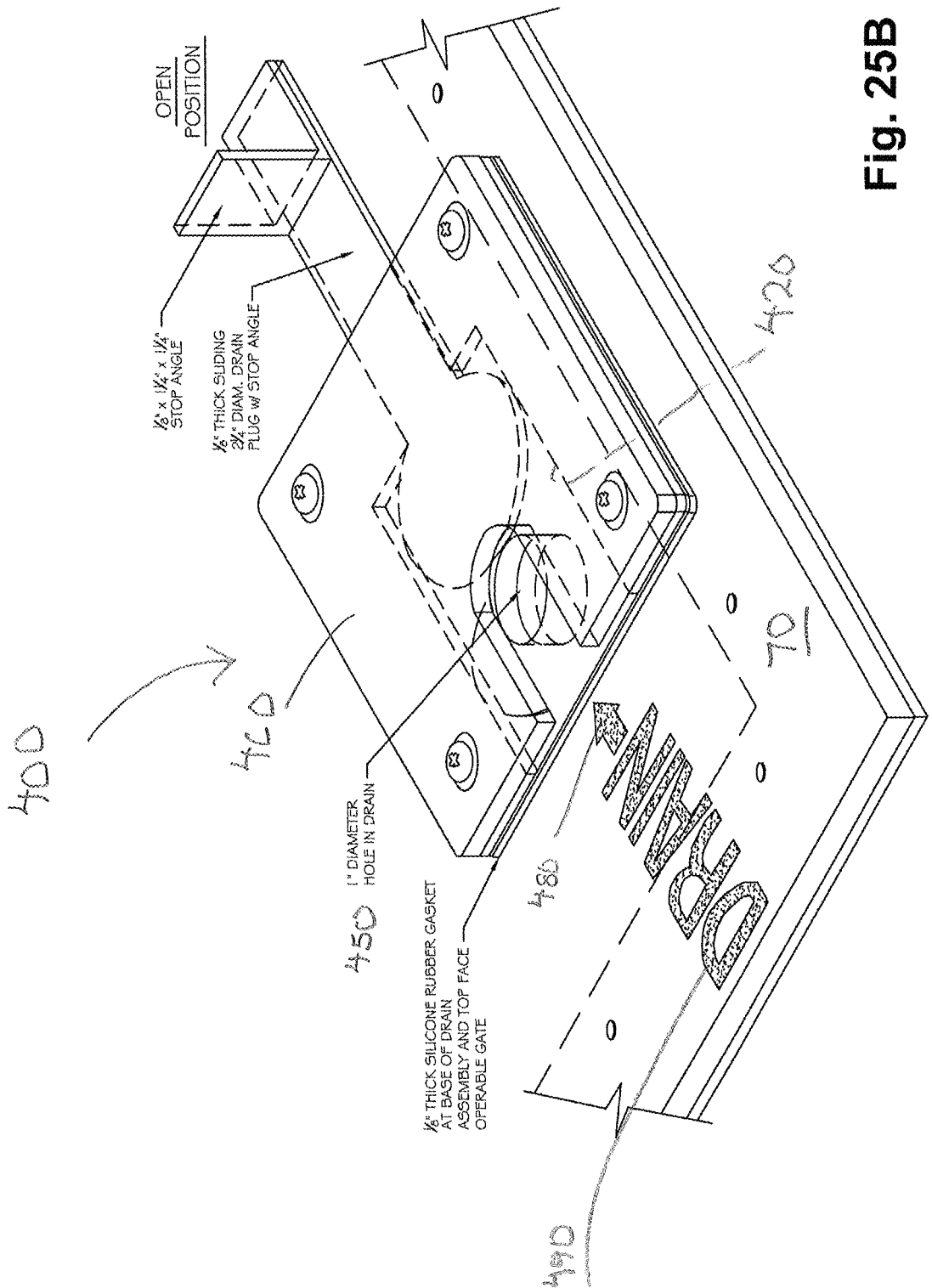
Figure 26:
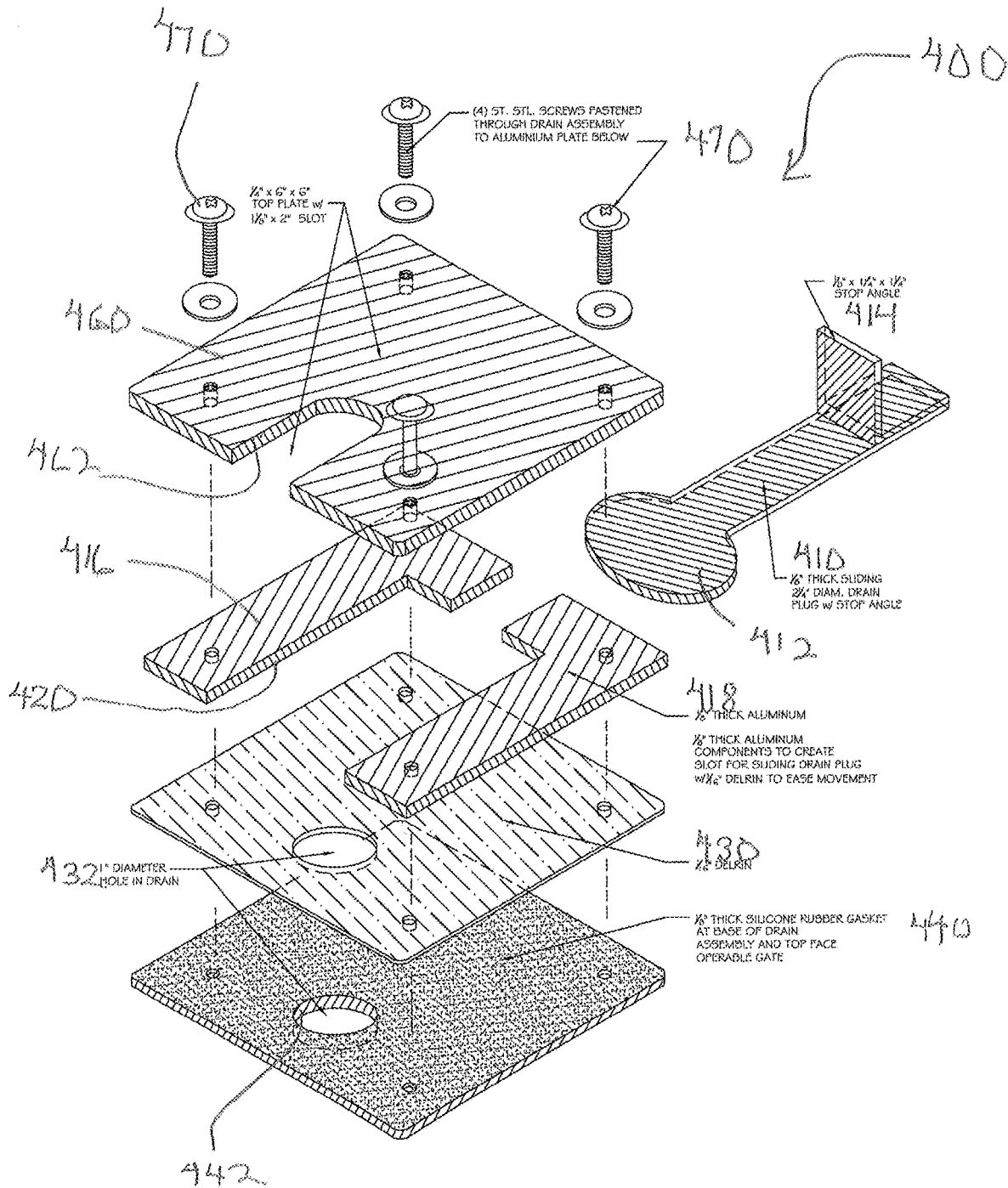
FIG. 26 is an exploded view of the drain assembly of FIGS. 25A and 25B.
Figure 27A:
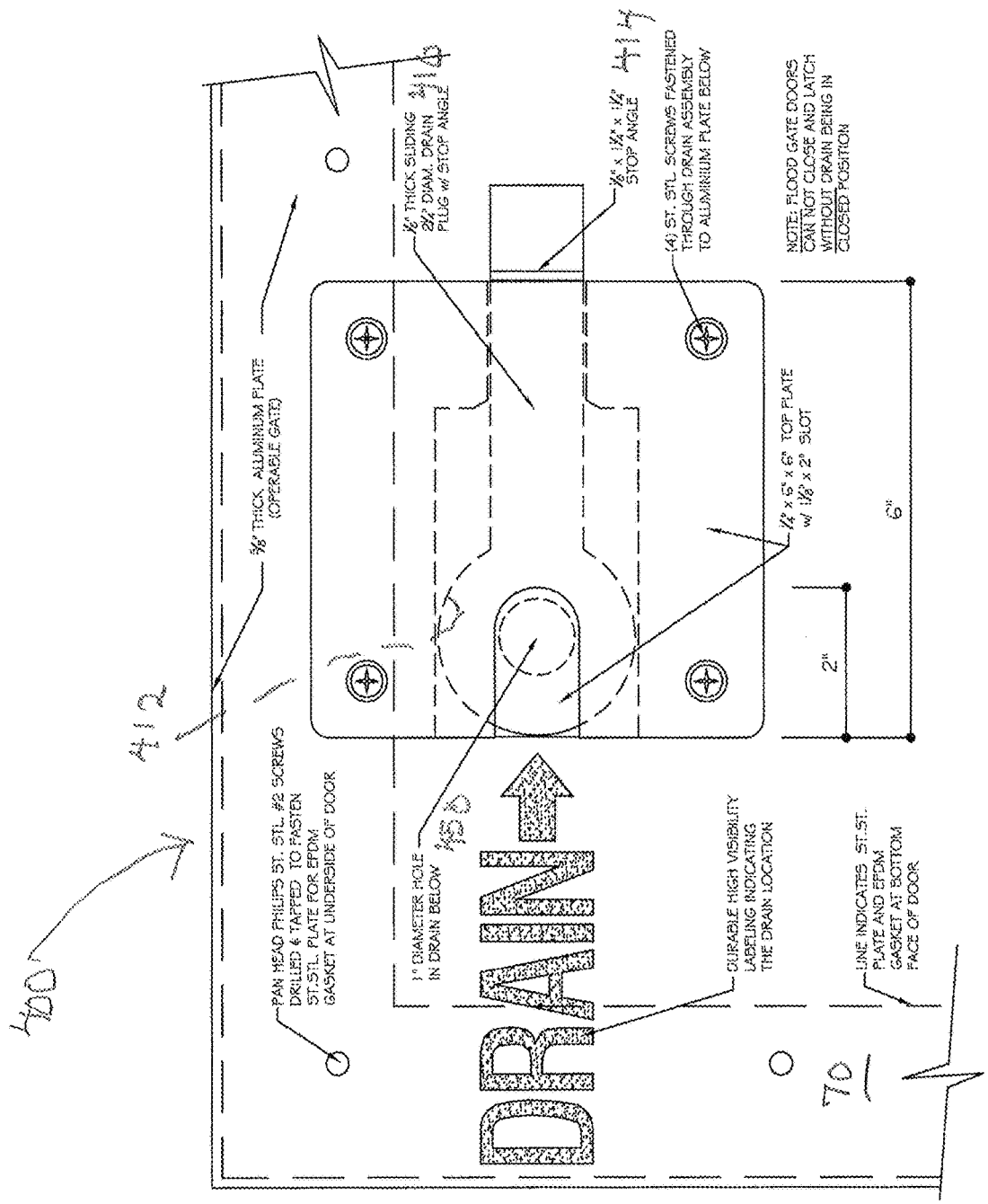
FIGS. 27A and 27B are top plan views and side sectional views, respectively, of the drain assembly of FIG. 25A in the closed position and mounted to a portion of the gate.
Figure 27B:
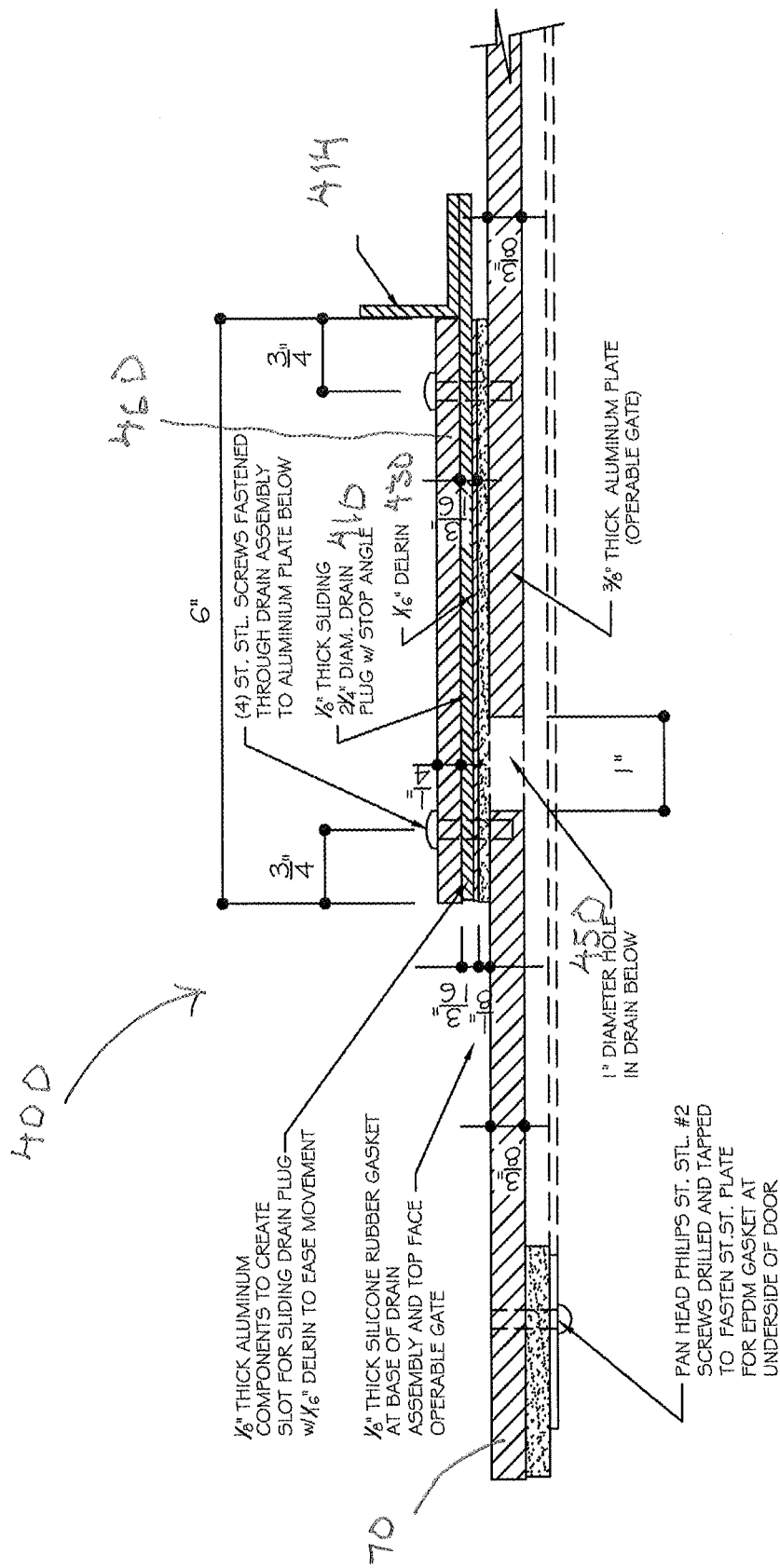
Figure 28A:
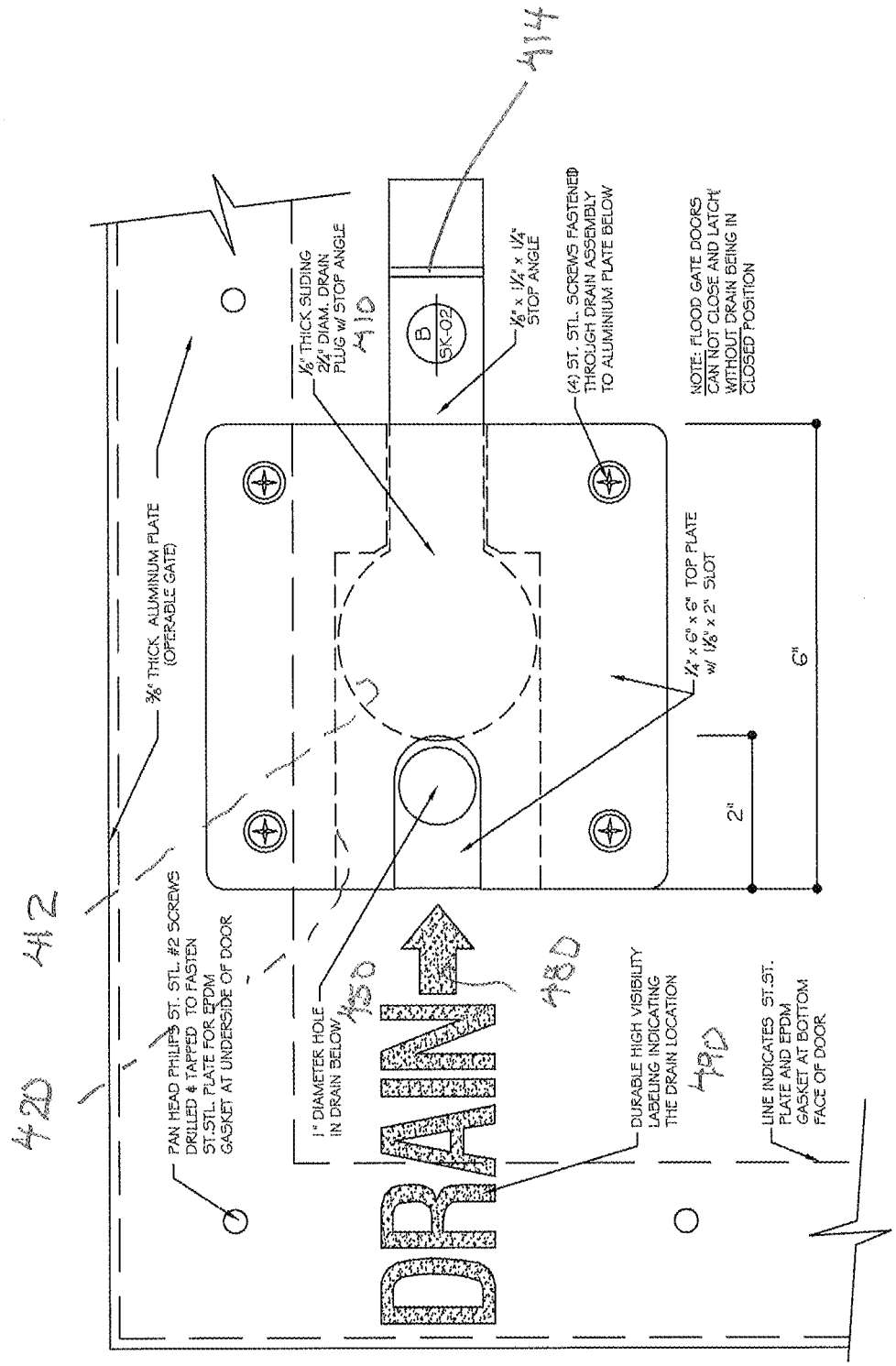
FIGS. 28A and 28B, respectively, are top plan views, partly in phantom and partly diagrammatic, and a sectional view, partly in phantom and partly diagrammatic, of the drain assembly in the opened position of FIG. 25B mounted to the top of a gate, partially illustrated.
Figure 28B:
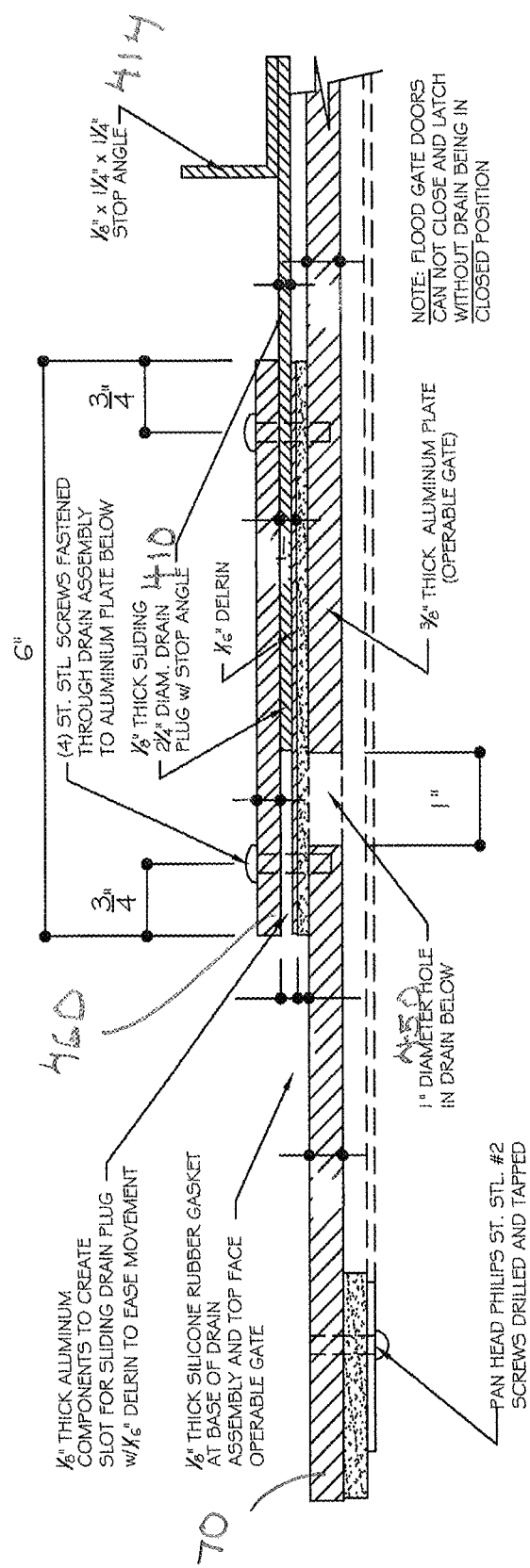

The floodgate doors 70 and 80 also carry a one inch rubber gasket 74 and 84, respectively, which are mounted at the peripheral underside of the doors (FIGS. 22 and 24). The gaskets 74 and 84 are preferably one inch rubber gaskets by Trim Lock™ set with a 3M #1678 rubber seal. When the doors are in the closed position, the gaskets 74 and 84 seal against the flange 28. The upper face of the doors include spaced lock tabs 76 and 86 which are welded to the doors and disposed generally below the cutout openings 56 in the debris shield.

With reference to FIGS. 2, 13 and 22-24, the hinge assembly 90 contains an elongated rod 92 which extends through the alternating knuckles of the floodgate doors 70 and 80 to provide a piano hinge. The rod 92 is received at opposed ends in a bearing 94 in the form of a sleeve of Delrin™ material. Each support has a slot-like opening 96. Each bearing 94 is received in an opening 96 of a corresponding support 52 to provide a floating hinge.

The doors also include handles 78 and 88 to facilitate operation of the gates. The handles are disposed at the upper side of the floodgate doors. Door 70 includes a mechanically operated lockable discharge drain assembly 75 (FIGS. 2, 8 and 14-18) which is normally closed to allow the doors to be moved to the opened position, but may be opened to discharge water.

Figure 6:
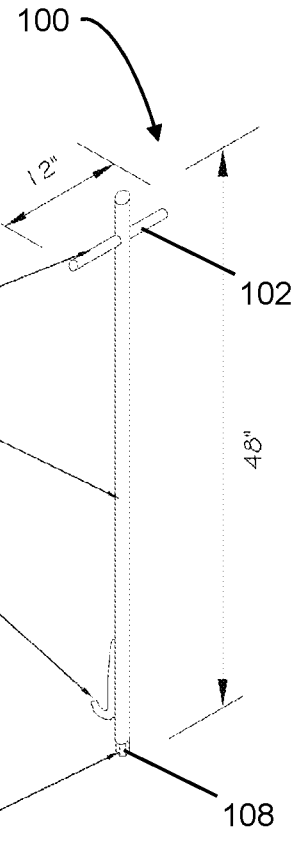
FIG. 6 is an annotated diagrammatic perspective view of a tool employed for the MCD of FIGS. 3 and 4.
Figure 11:
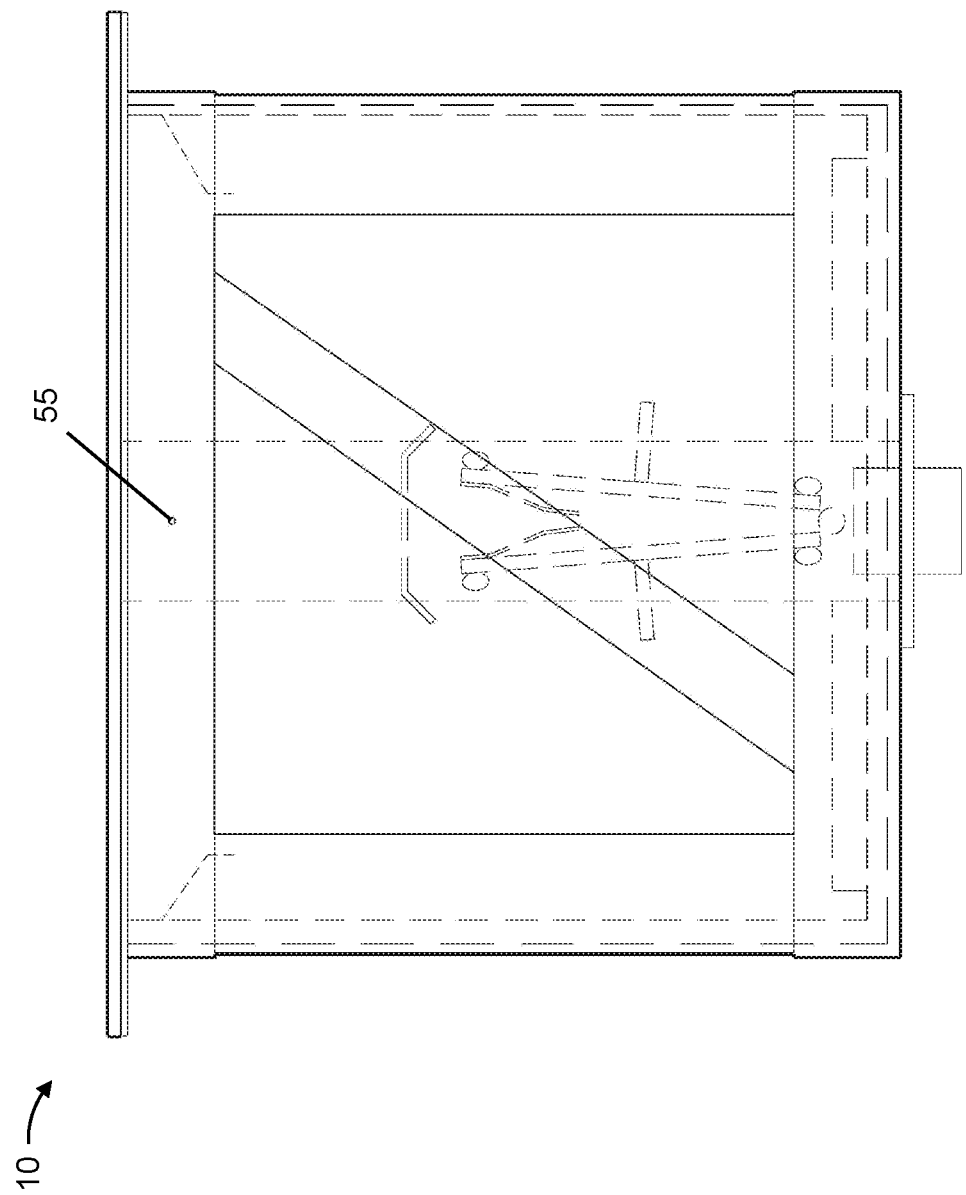
FIG. 11 is an annotated diagrammatic elevational exterior side view, portions in phantom, of the MCD of FIG. 3 with the floodgate doors in an opened position.
Figure 12:
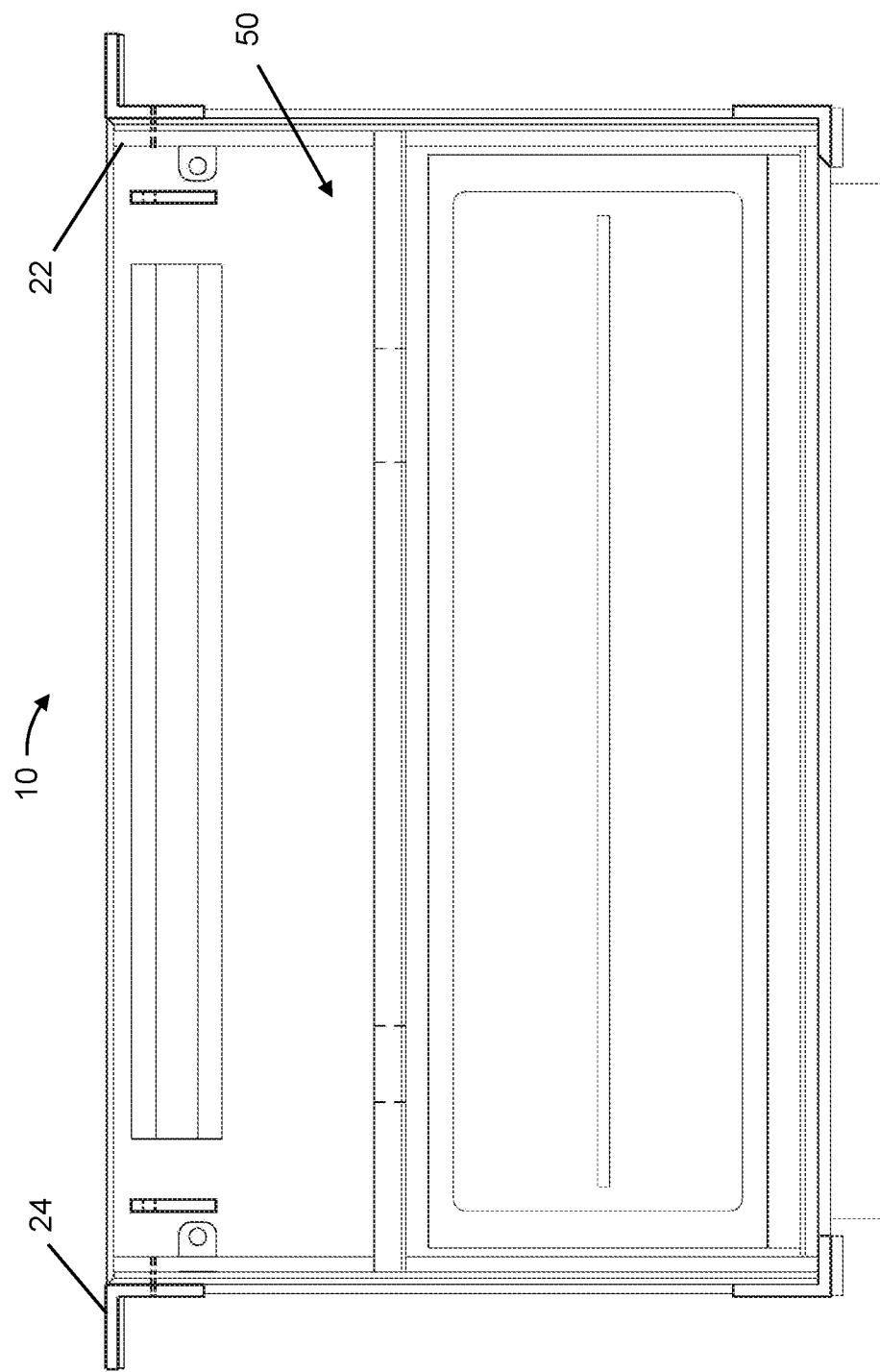
FIG. 12 is an annotated diagrammatic side elevational view, portions in phantom, of an elongated view of the MCD of FIG. 3 with the floodgate doors in an opened position.

With reference to FIG. 6, a tool for the MCD 10 is generally designated by the numeral 100. The tool 100 has a general T-shape with a rod-like handle 102 and a hook 106 at the lower portion of a rod-like leg 104. The hook is adapted to engage the tabs 76 and 86 on the doors to position the floodgate doors at either the closed or the opened positions. The closure mode can be accomplished without removal of the grate while the MCD is installed and positioned. The end of the leg includes a torque head 108 for torqueing a security bolt to drive the bolt 55 or loosening the bolt for securing the floodgate control assembly 50 in the enclosure, as best illustrated in FIGS. 3, 4 and 11. The handle 102 functions to apply the torque and allow for the proper positioning of the hook 106.

Figure 15:
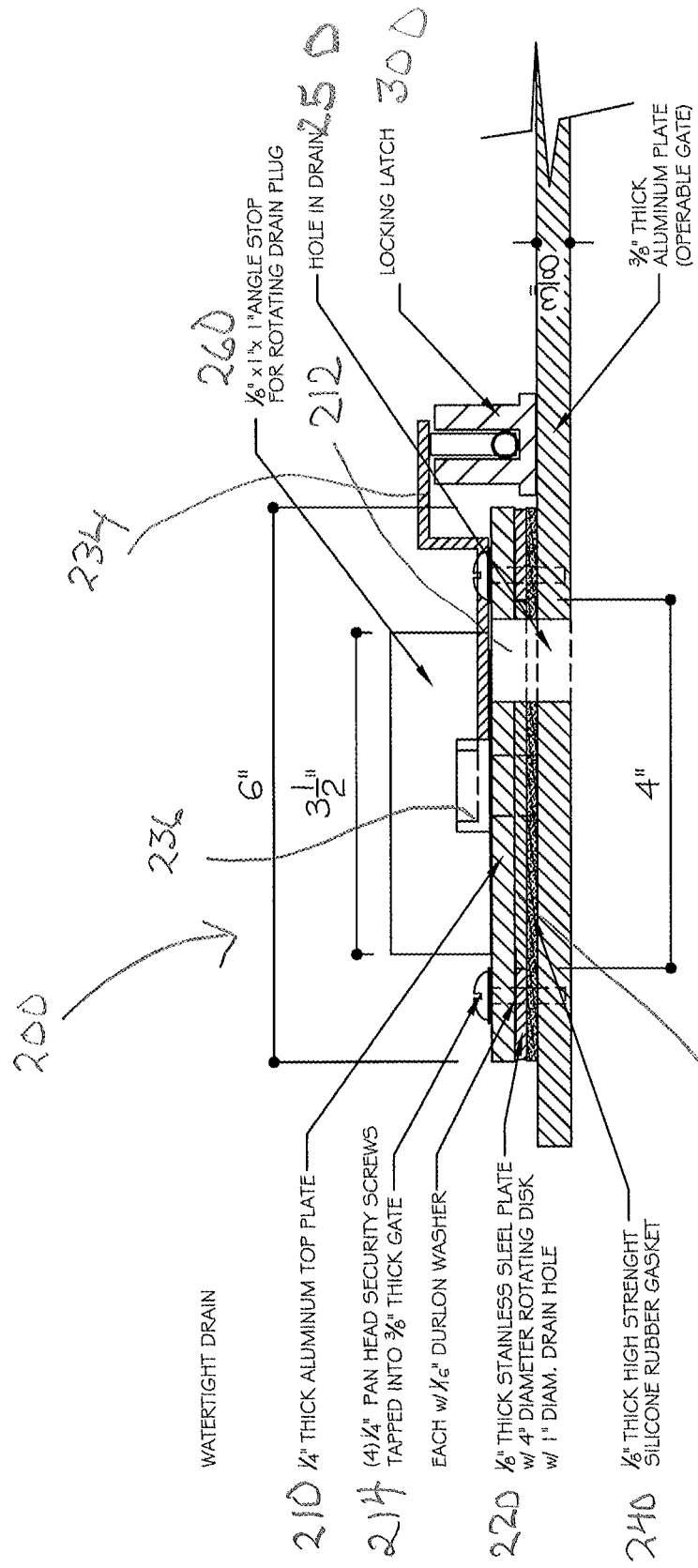
FIG. 15 is an annotated diagrammatic sectional view of the drain assembly and latch of FIG. 14.
Figure 16:
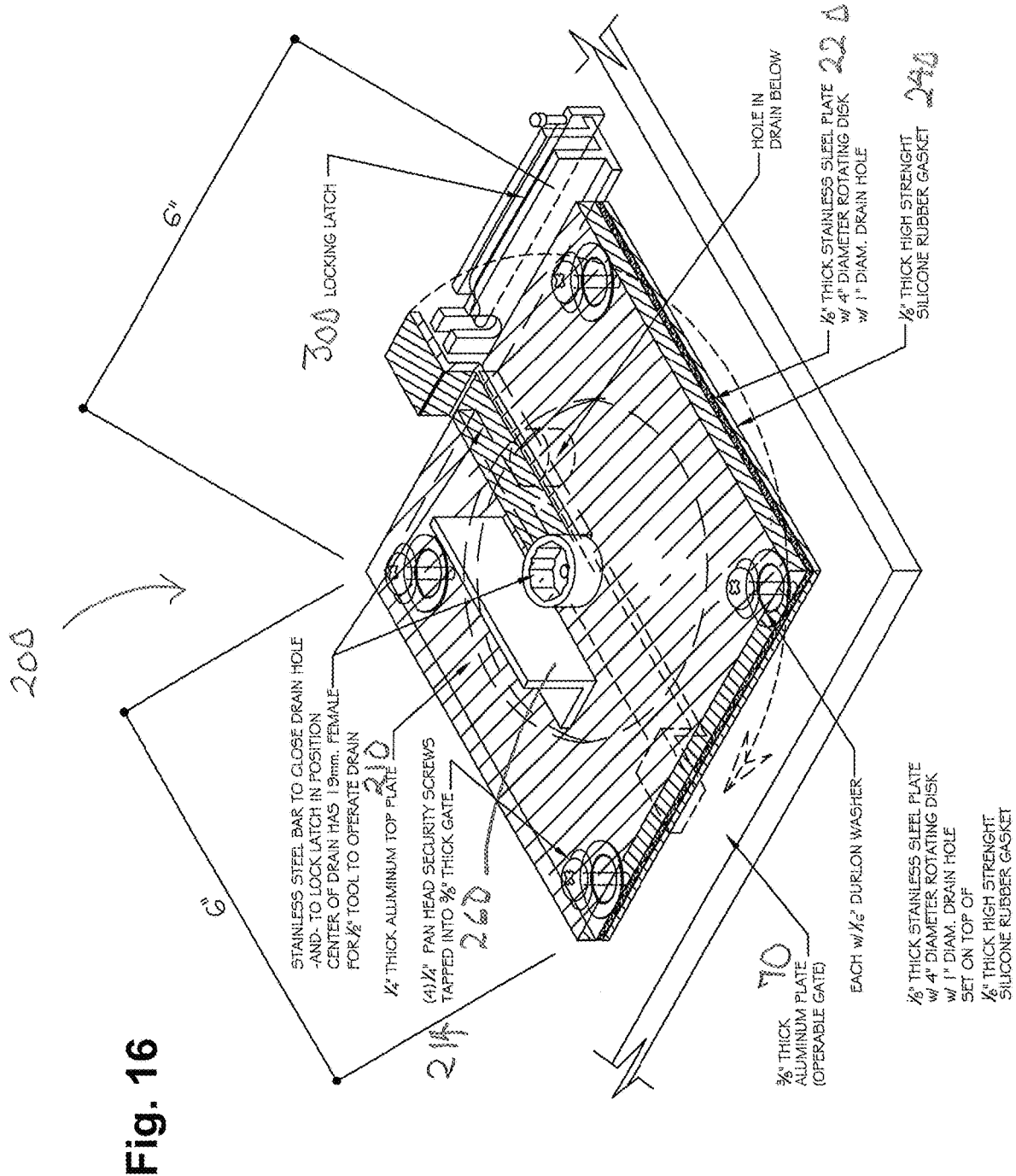
FIG. 16 is an annotated diagrammatic perspective view of the drain assembly and latch of FIG. 14.

With reference to FIGS. 14-21, lockable discharge drain assembly 75 comprises a drain assembly 200 and a locking latch assembly 300. The drain assembly 200 mounts to the top of door 70. A six inch substantially square top plate 210, which is preferably ¼ inch thick aluminum having an access slot 212 mounts over a ⅛ inch thick stainless steel plate 220 with a central opening 222 which receives a four inch diameter rotating disk 230 and, in turn, mounts over a ⅛ inch thick high strength silicone rubber gasket 240. Gasket 240 has a one inch diameter opening 242. The access slot 210 opening 232 and opening 242 are angularly alignable to provide a through drain passage 250. Disk 230 has a one inch drain opening 232. A stainless steel crank arm 234 rotates the disk 230. The top plate 210, plate 220, gasket 240 and door 70 are assembled in sandwich style and are secured at the corners of the top plate by four screws 214 which are secured to the door. In one suitably aligned angular position of the assembly, a continuous passage extends through the assembly to form the through drain passage 250 (FIG. 15).

An angled stop 260 is mounted at the top of the plate to provide a stop for arm 234 of the centrally rotating plug provided by disk 230 which rotates about the central axis of the assembly. The discharge drain assembly 75 functions to prevent the return of the door 70 and 80 to an opened position when the discharge drain assembly 200 is in an opened position to allow the discharge of water through the bottom of the enclosure. After a storm, the personnel will not be able to return the doors to an opened position without the drain assembly 200 being closed. The rationale for this latter feature is that when personnel close the doors prior to an imminent flood, it is crucial to ensure that the discharge drain is closed.

Figure 17:
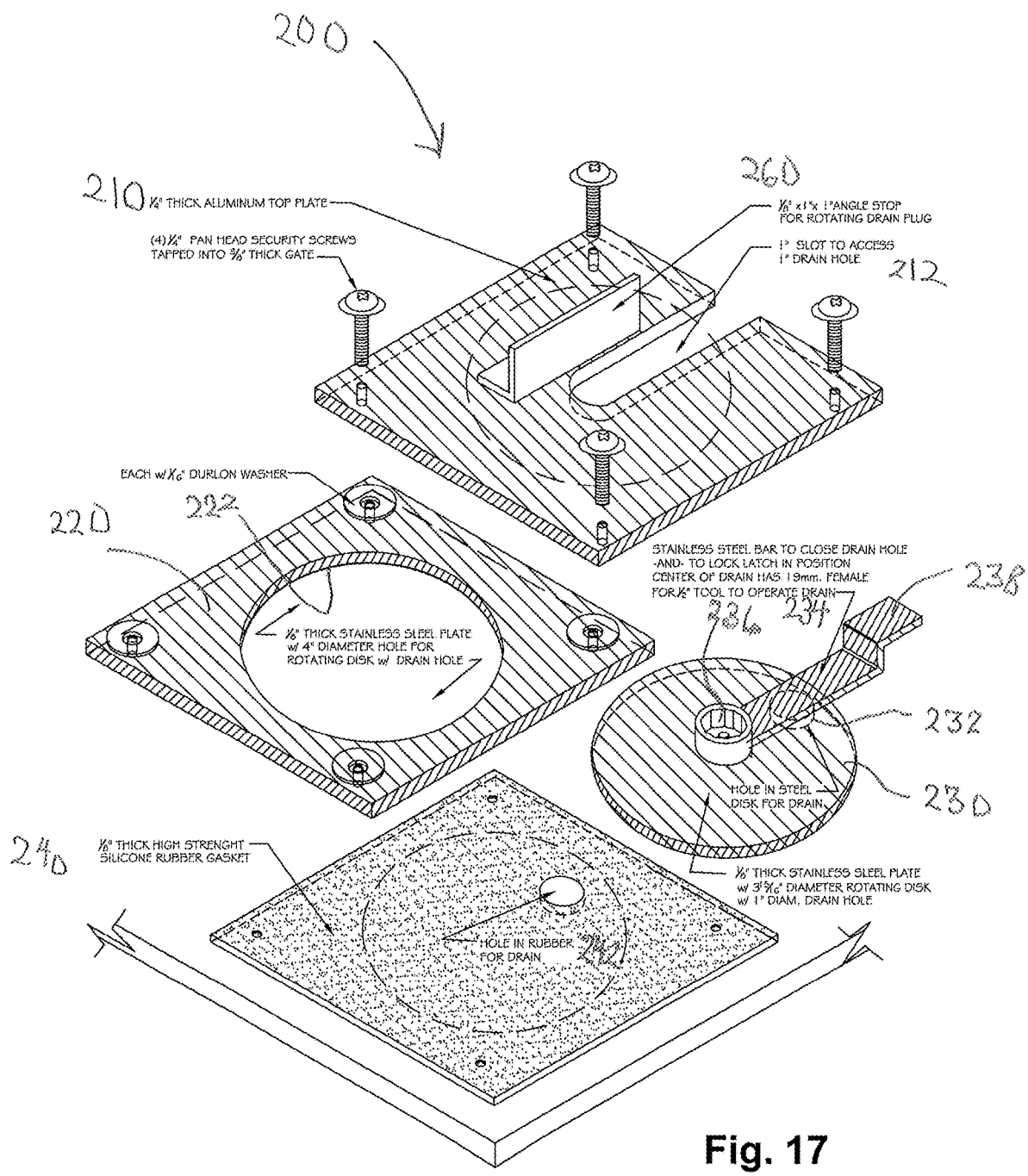
FIG. 17 is an annotated exploded view, portions in phantom, of the drain assembly of FIG. 16.
Figure 18:
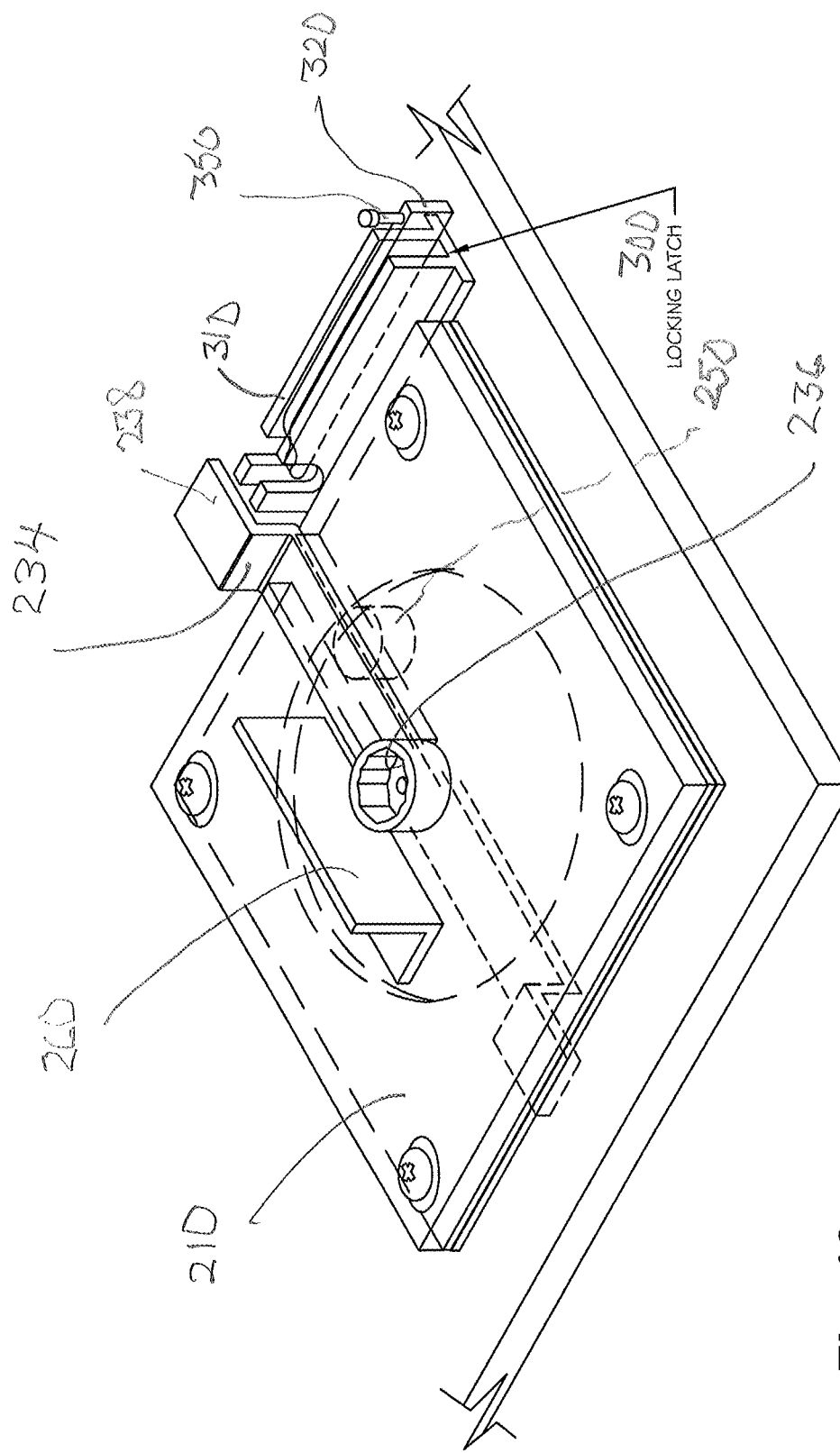
FIG. 18 is an annotated perspective view, portions in phantom, of the drain assembly and the locking latch of FIG. 14.
Figure 19:
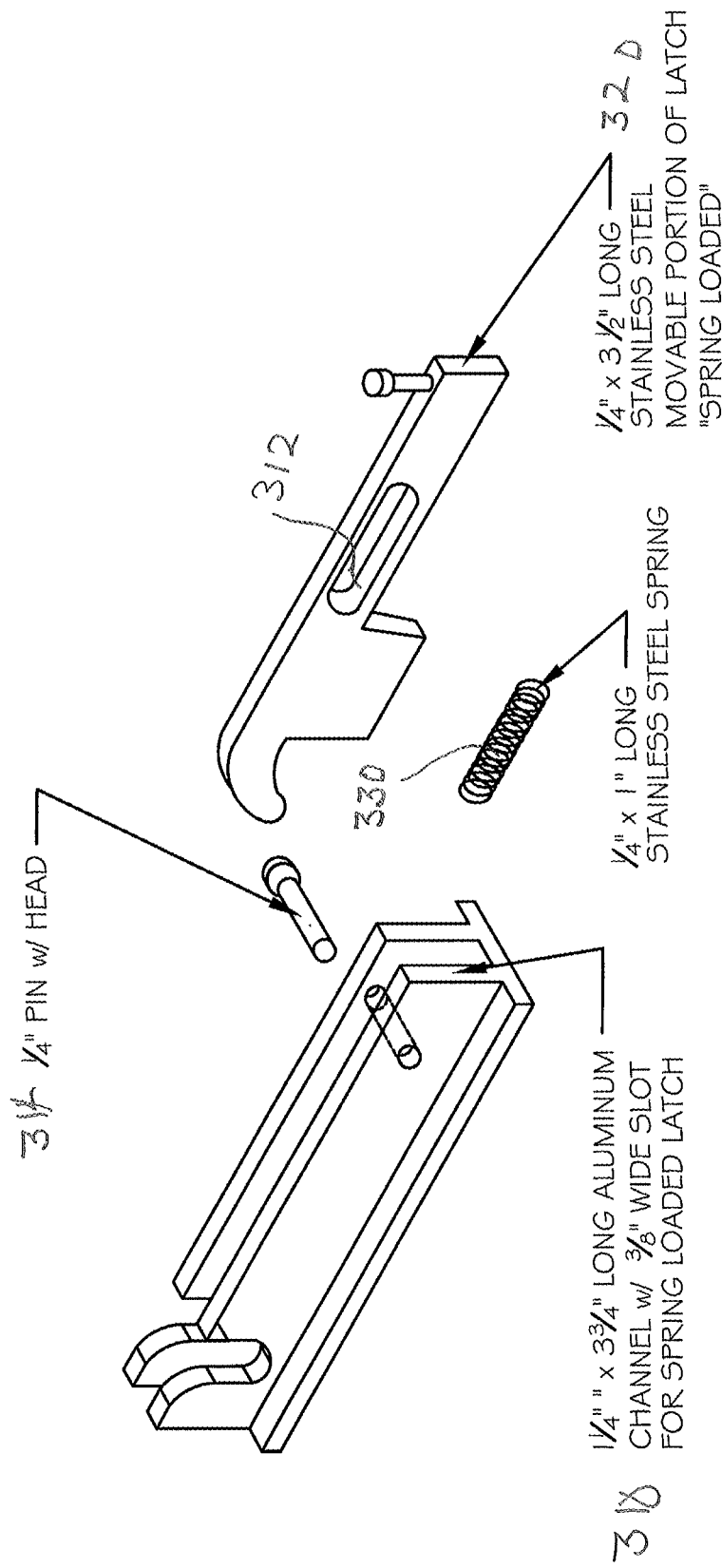
FIG. 19 is an annotated exploded perspective view of the locking latch of FIG. 18.

With additional reference to FIG. 17, the steel plate 220 includes a central opening 222 with a four inch diameter for the rotating disk 230. A one inch access slot 212 extends from the periphery of the top plate 210 to the center thereof. The rotating disk 230 is in rotatably fixed connection with an arm 234 to close the drain hole 250 and to lock the latch assembly 300. A central female socket 236 which may be 19 mm is engageable and operable for rotating the disk 230 for the drain. The arm 234 is in the form of a crank having a distal bent end 238 which is engageable by the latch assembly 300 and prevents the doors 70 and 80 from opening unless the discharge drain is closed.

It will be appreciated that at a given angular position of the disk 230, the drain passage 250 will provide communication from the upper portion above the gate 70 through the bottom opening 30 of the enclosure.

Latch assembly 300 comprises an elongated aluminum channel member 310 which forms a slot 312 for receiving a latch 320. The latch 320 includes a longitudinal slot 312 which receives a transverse pin 314. Pin 314 limits the longitudinal movement of the latch 320 relative to the channel member. The latch 320 includes an integral boss 322 which traps a spring 330. In the engaged latched position, the spring is compressed to secure the closed drain position, as illustrated in FIG. 21.

A vertical pin 350 extends from the top of the latch and is adapted for engagement by the tool 100. The projecting pin allows for the doors to be released from the opened position. Upon release, the spring 330 is not compressed and allows the arm to freely rotate to open and close the drain. The opened position is best illustrated in FIG. 15. In the opened position of the discharge drain, the arm 234 prevents the doors from being opened. The doors may only be opened when the drain is in the closed position so that when the doors 70 and 80 are closed for a subsequent flooding event, the discharge drain will not be opened. It will be further appreciated that the opening and the closing of the discharge drain as well as the opening and the closing of the doors is accomplished by usage of the tool 100 from above the grate over the enclosure.

With reference to FIGS. 25A-28B, another embodiment of a discharge drain assembly is generally designated by the numeral 400. Drain assembly 400 preferably mounts to the top of door 70 and is transformable from a closed position illustrated in FIGS. 25A, 27A and 27B to an opened position illustrated in FIGS. 25B, 28A and 28B. The discharge assembly preferably controls the discharge of water through a drain opening 450 which provides a through passage through the gate doors. The opening 450 preferably has a diameter of 1 inch.

A sliding drain arm 410 integrally connects at one end with a 2¼ inch diameter drain plug 412. A stop angle 414 projects perpendicularly from the sliding drain proximate the other end. A pair of truncated L-shaped guides 416 and 418 form a slot 420 and are disposed over a Delrin™ sheet 430 having a one inch opening 432 and ¼ inch thick silicone rubber gasket 440 having a one inch opening 442. A top 460 plate having a slot 462 is disposed over the guides 416 and 418. The slot 462 and openings 432, 442 align to form the discharge opening 450. The top plate 442, guides 416 and 418 and sheets 420 and 430 are screwed or fastened to the aluminum plate of the operable gate by four screws 470. The guide members define an enlarged slot and a narrow slot which guides the sliding arm 410.

When the drain is in the closed position (FIG. 25A), the opening 450 is covered by plug 412 and water passage to the drain opening is obstructed. When the drain is withdrawn in the direction of the arrow 480 (FIG. 26B), communication is provided through the drain assembly and a discharge drain. A high visibility label 490 is preferably affixed to the upper portion of the door to indicate the drain and the opening direction of the drain. It will be appreciated that the floodgate doors cannot close the latch without the drain being in the closed position due to interference of end 415. In the closed position, the stop angle 414 engages against the rear edge of the drain guide. The drain assembly 400 may also be employed with the MCD embodiments described below.

Figure 32:
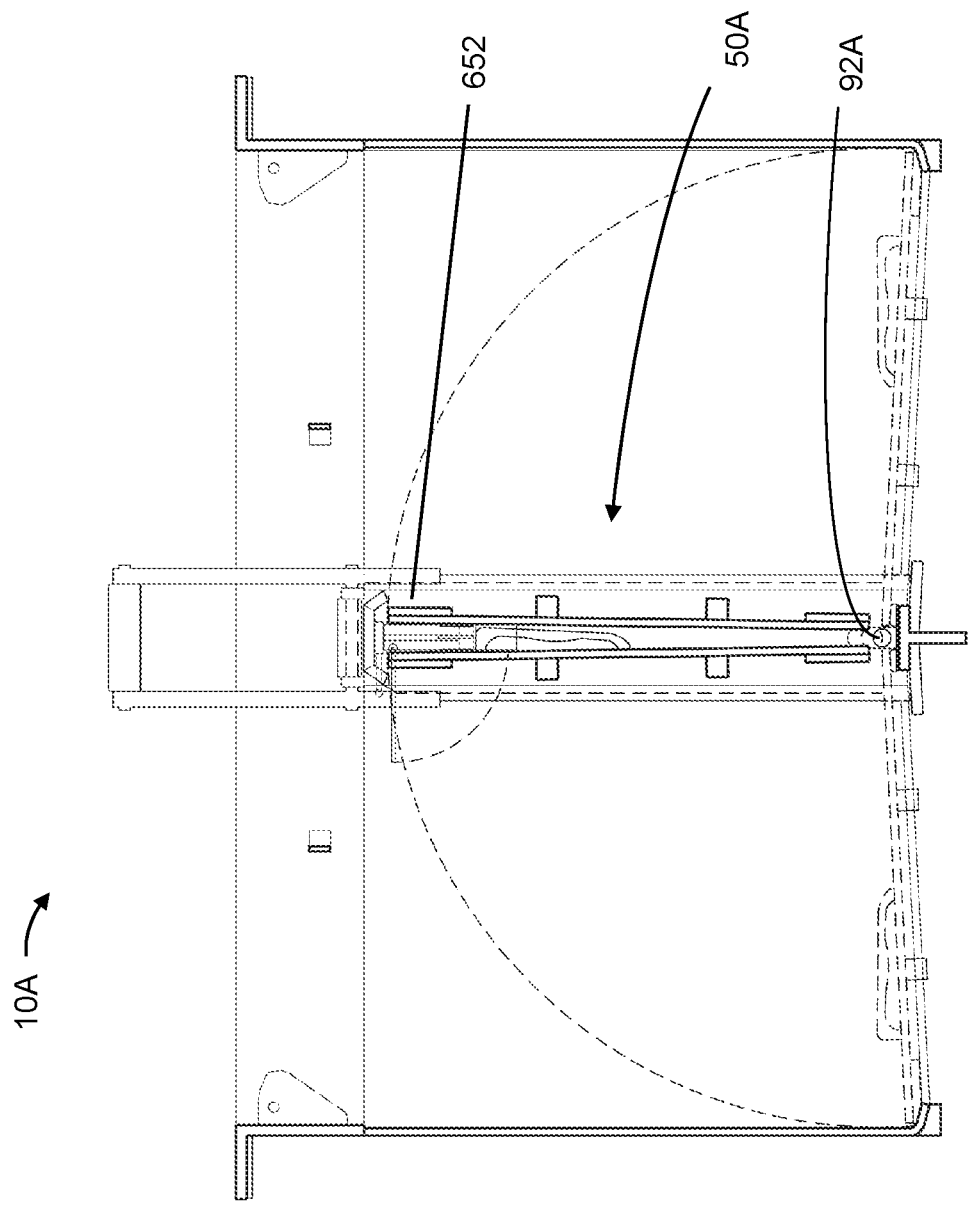
FIG. 32 is an annotated diagrammatic transverse sectional view, partly in phantom and partly in schematic, of the MCD of FIG. 29.
Figure 33:
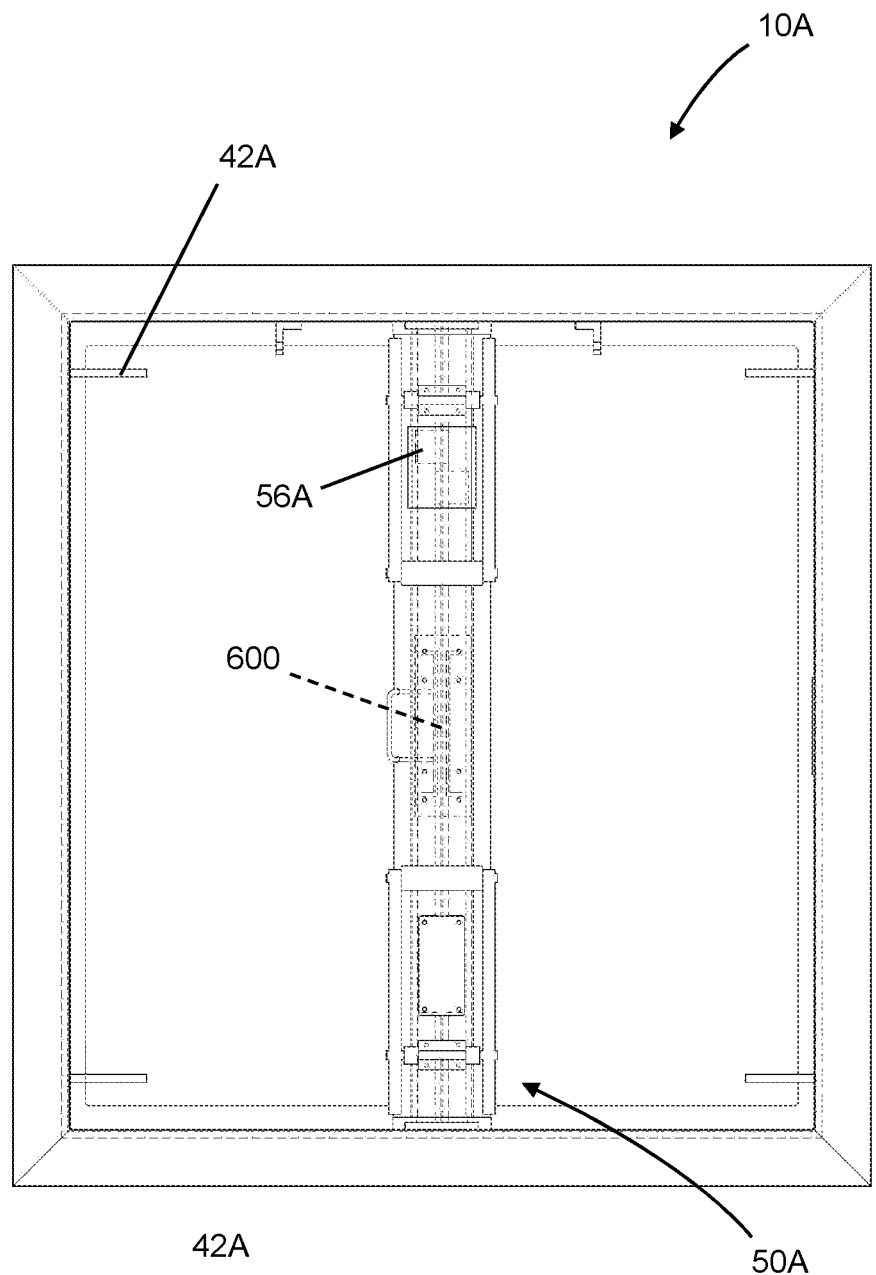
FIG. 33 is an annotated diagrammatic top plan view, portions in phantom, of the MCD of FIG. 29.

MCD 10A is similar in form and function to MCD 10 except for various features described below and apparent from FIGS. 29-38. Corresponding components and assemblies of MCD 10A are designated by the same numeral as those for MCD 10 followed by A. With reference to FIGS. 29-32, MCD 10A has a slidably removable floodgate control assembly 50A which includes floodgate doors 70A and 80A. The doors have handles 78A and 88A to facilitate operation of the gates. In addition, indicia 79A and 89A is applied to the doors on the top so that when viewed from the top, the doors indicate that they are closed. In addition, the opened position of the drain assembly is indicated on door 80A. With reference to FIG. 32, the sides of the closure include lifting tabs 42A together with indicia 43A to indicate the location and direction for the lifting tabs.

Figure 29:
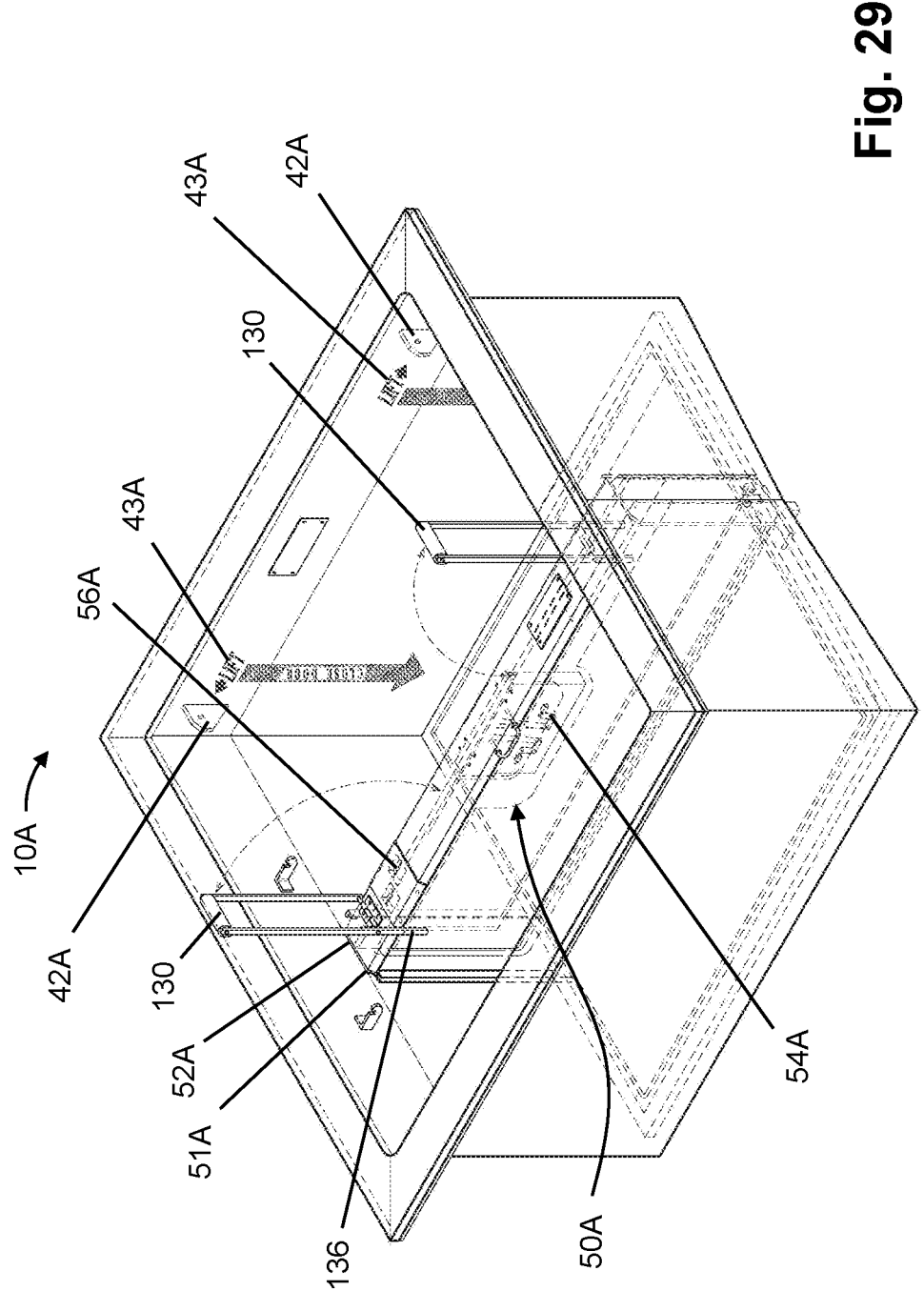
FIG. 29 is an annotated diagrammatic perspective view, partly in phantom, of a second embodiment of a two bay door MCD with the handles extended to remove the floodgate assembly which is illustrated in an opened position.
Figure 30:
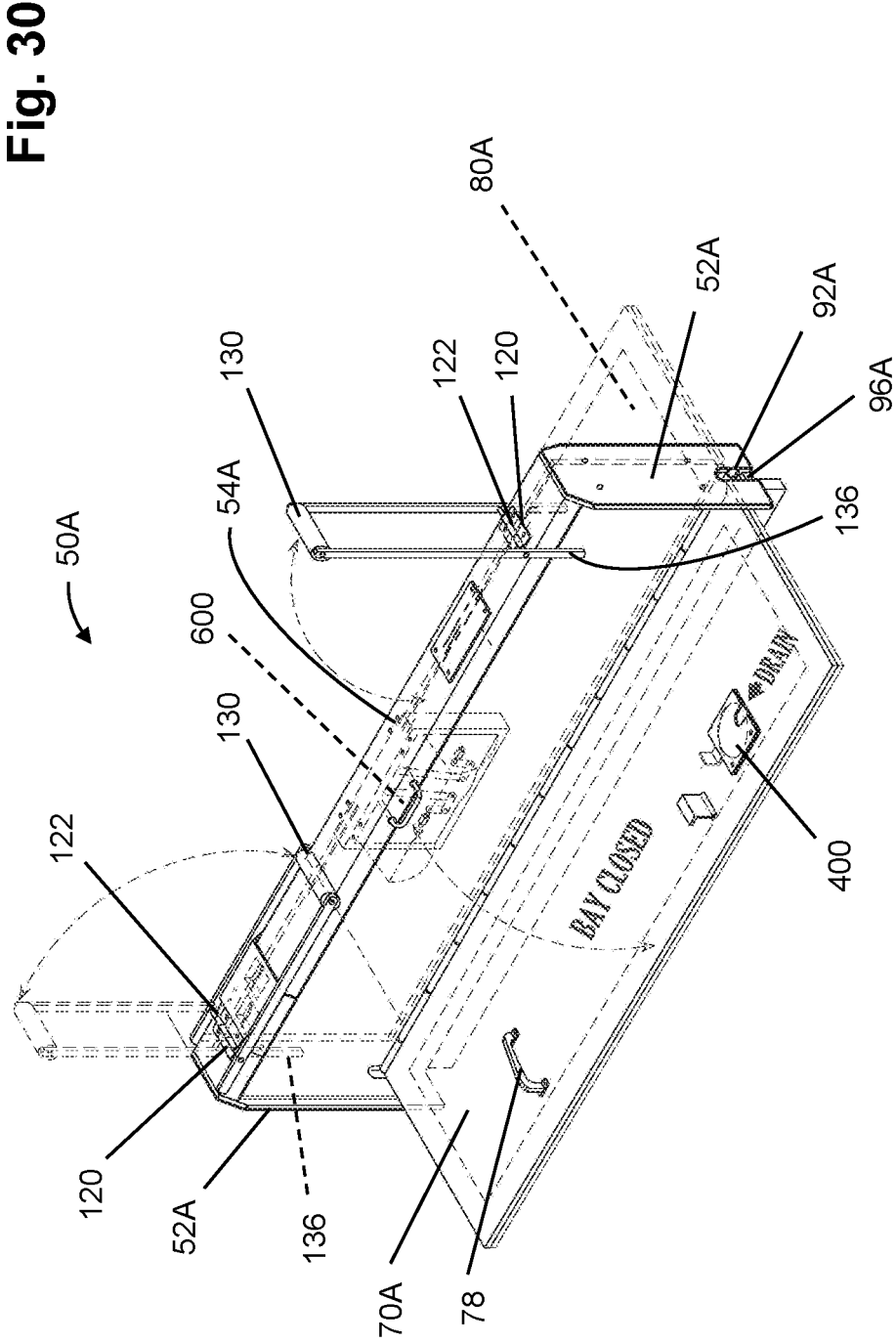
FIG. 30 is an annotated perspective view of the floodgate assembly of FIG. 29, partly in phantom and partly in schematic, as removed from the enclosure for service.
Figure 31:
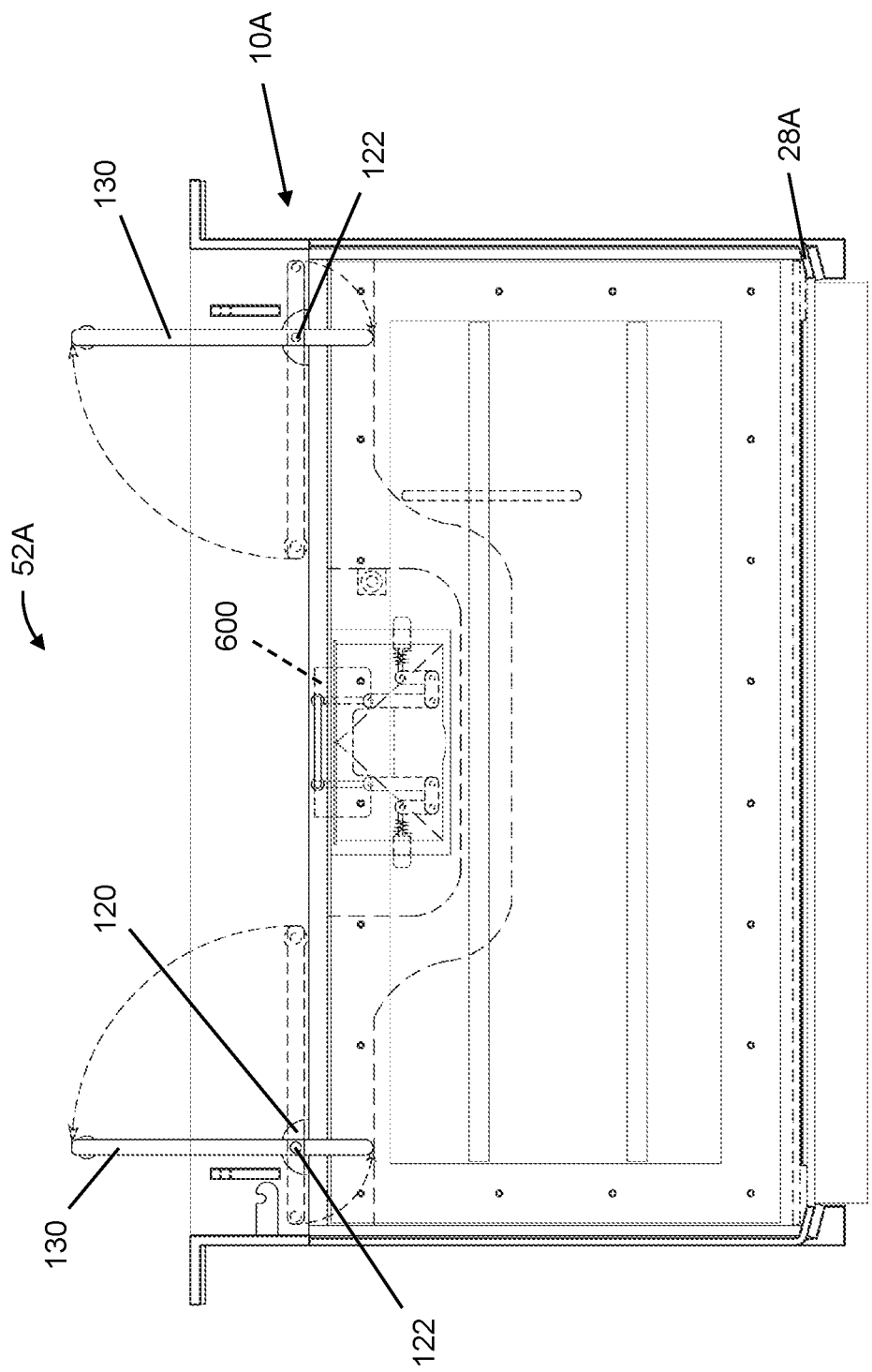
FIG. 31 is an annotated diagrammatic longitudinal sectional view, partly in phantom and partly in schematic, of the MCD of FIG. 29.

With reference to FIGS. 29 and 30, the top of the debris shield 54A includes a pair of spaced yokes 120 which receive an axle 122 which pivotally mounts handles 130 to facilitate the lifting of the floodgate door assembly 50A from the enclosure 20A. The handles are normally pivoted to rest on the top of the debris shield and are manually pivoted perpendicularly, and the handles 130 are grasped to remove the floodgate assembly 50A from the enclosure 20A.

In addition, the enclosure 20A includes opposed vertical slotted guideway 51A (FIGS. 34, 37) which each extends from a central side locator of the enclosure and forms an internal channel for slidably receiving the supports 52A of the removable floodgate control assembly 50A. The supports 52A have Delrin™ edging to remove supports from channel of guideway 51A.

The doors, or floodgates, are lifted by inserting the tool 100 through the opening 56A in the debris shield 54A to engage the handles. The gates or doors 70A and 80 are manually raised by the handles 78A, 88A until they reach the vertical position and are secured by the ends 136 of the handles 130 when the handles are pivoted to the upward vertical position.

Figure 48:
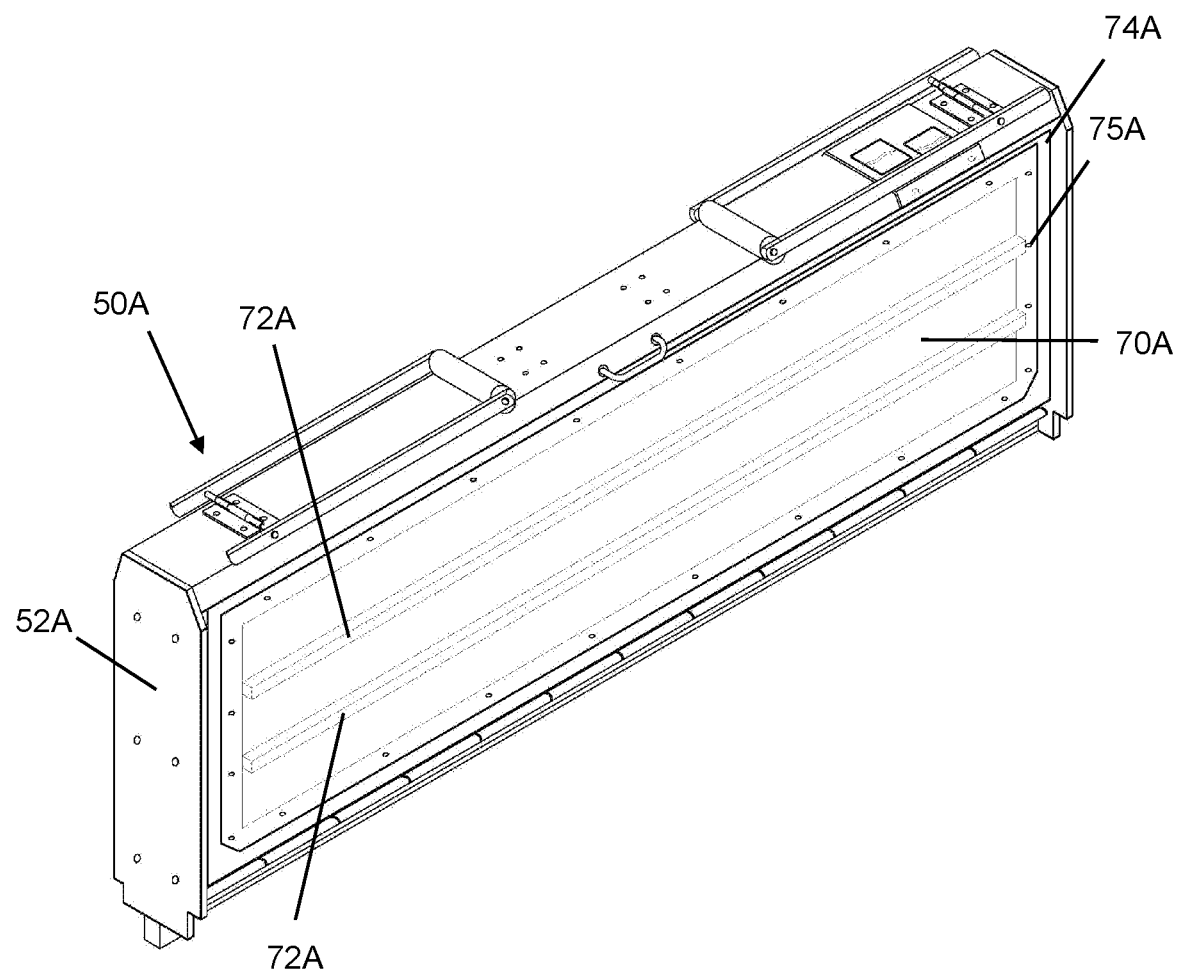
FIG. 48 is a photograph of the floodgate assembly of FIG. 29 in a pre-assembled state illustrating a sealing assembly.
Figure 49:
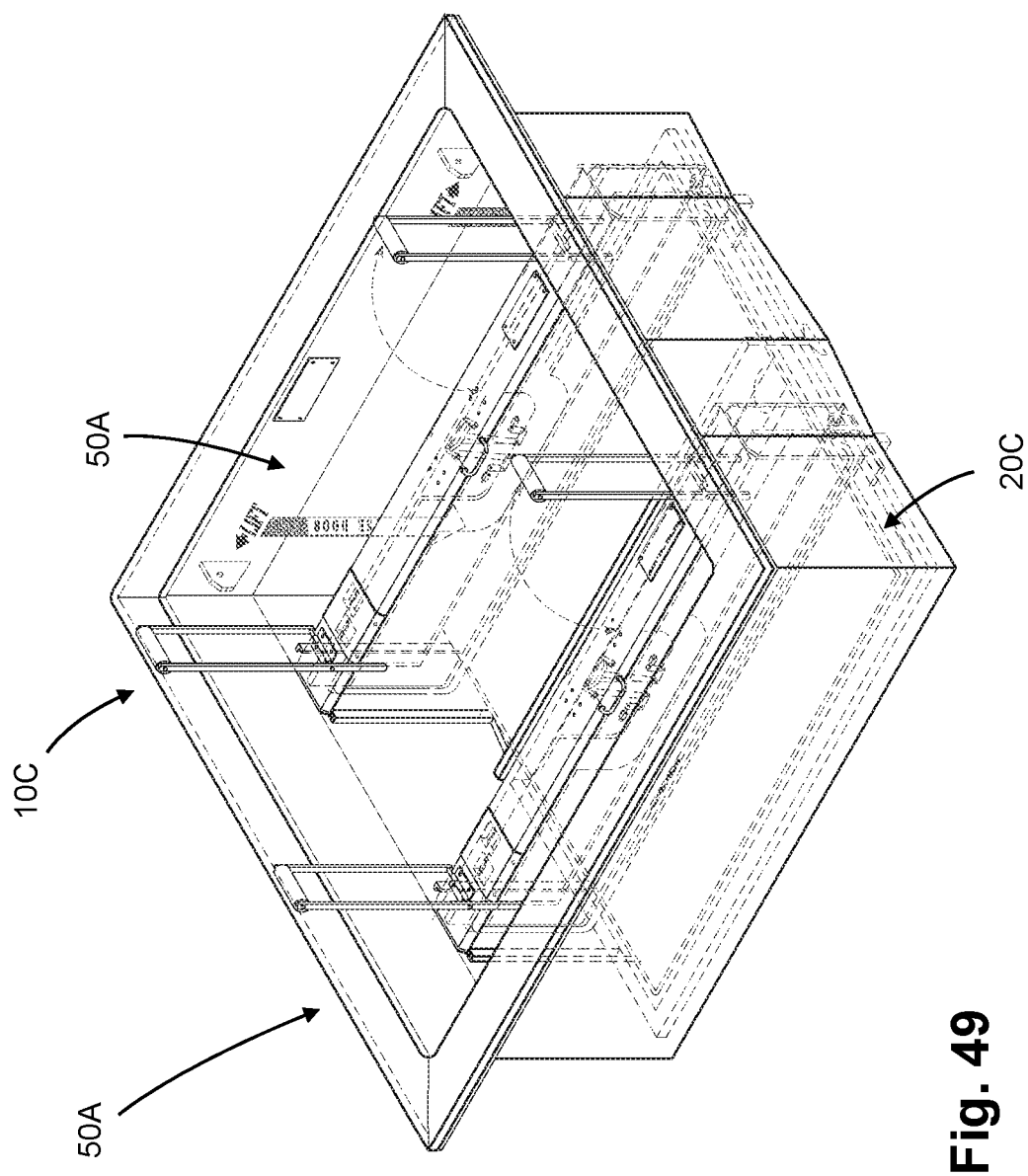
FIG. 49 is an annotated diagrammatic perspective view, partly in phantom, of a quadruple bay door MCD with the handles extended to remove the floodgate assembly which is illustrated in an opened position.
Figure 50:
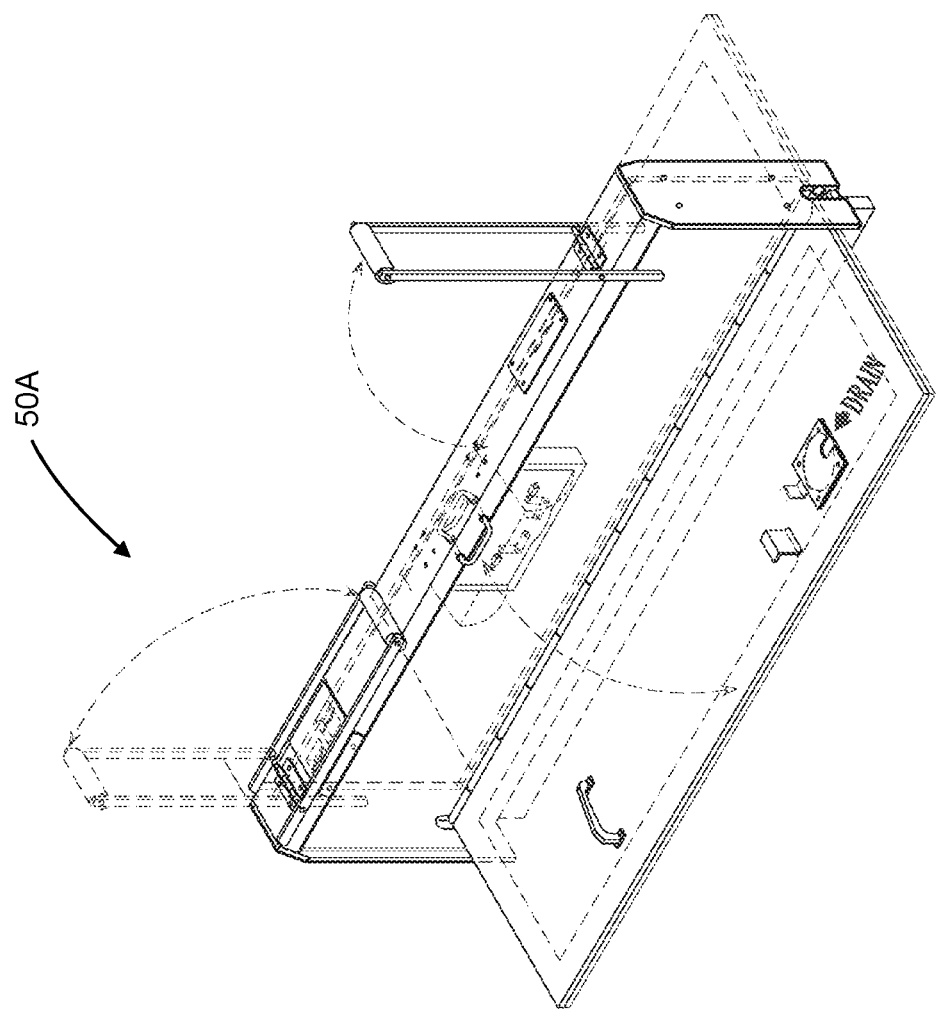
FIG. 50 is an annotated perspective view of the floodgate assembly of FIG. 49, partly in phantom and partly in schematic, as removed from the enclosure for service.
Figure 51:
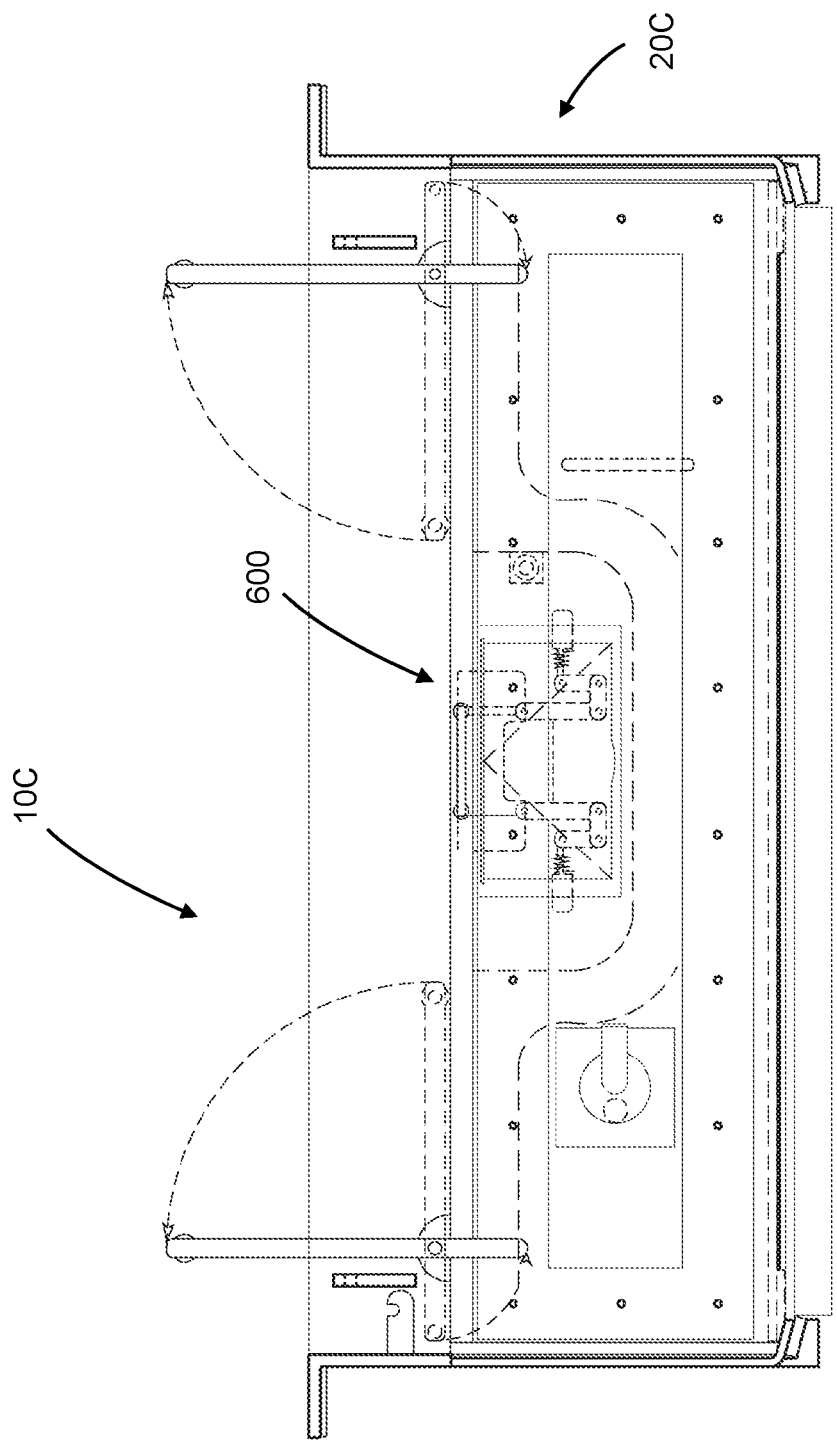
FIG. 51 is an annotated diagrammatic longitudinal sectional view, partly in phantom and partly in schematic, of the MCD of FIG. 49.
Figure 52:
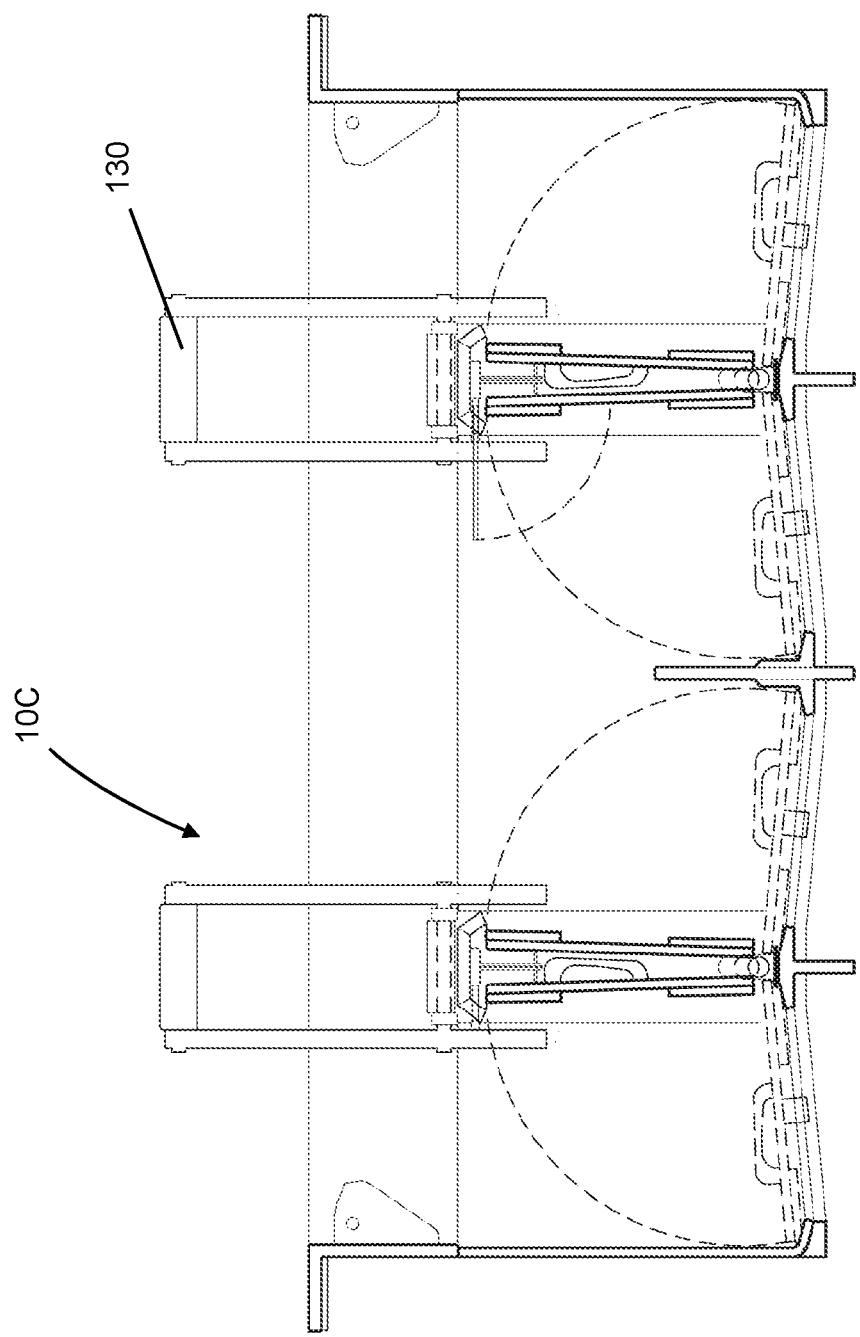
FIG. 52 is an annotated diagrammatic transverse sectional view, partly in phantom and partly in schematic, of the MCD of FIG. 49.
Figure 53:
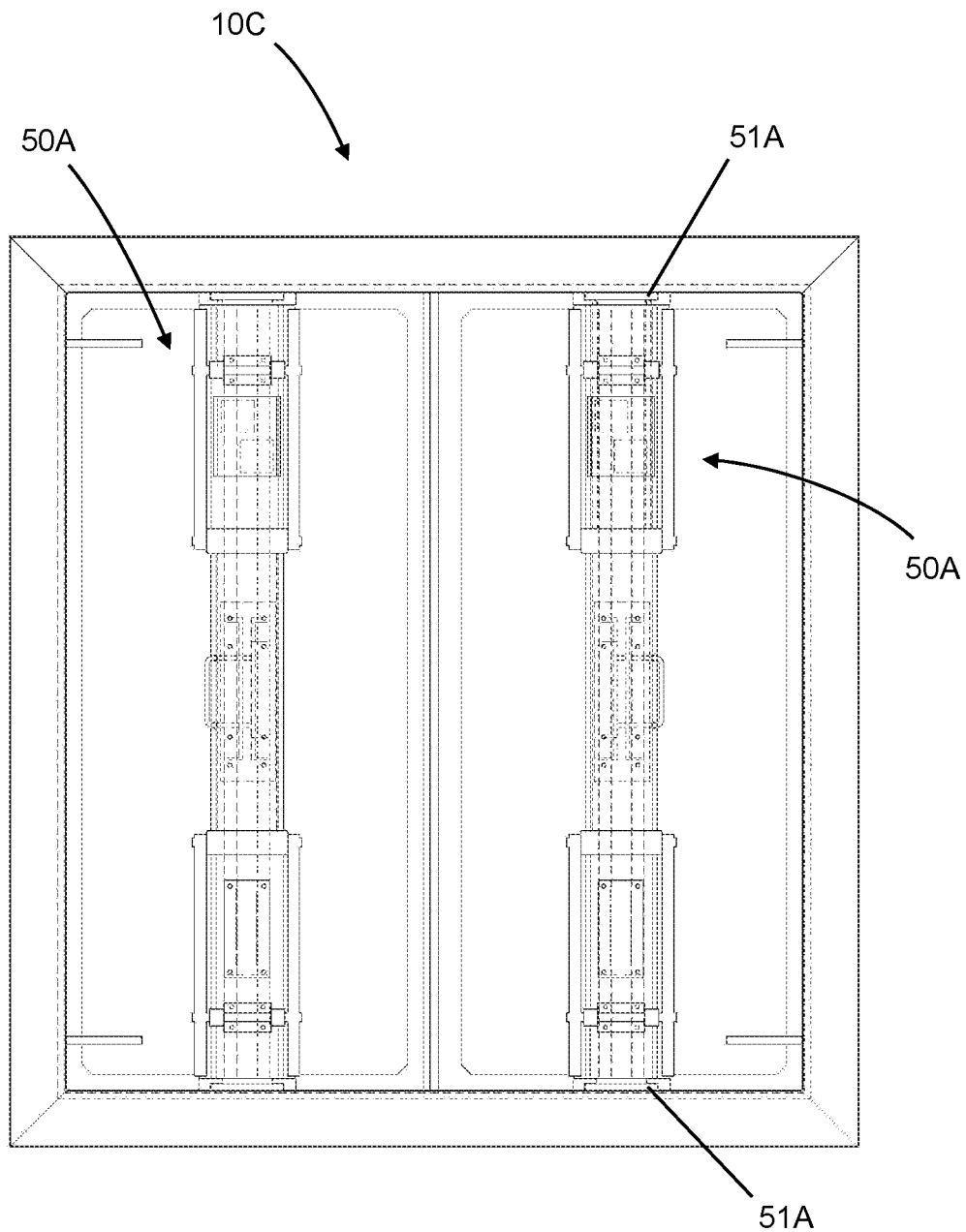
FIG. 53 is an annotated diagrammatic top plan view, portions in phantom, of the MCD of FIG. 49.
Figure 54:
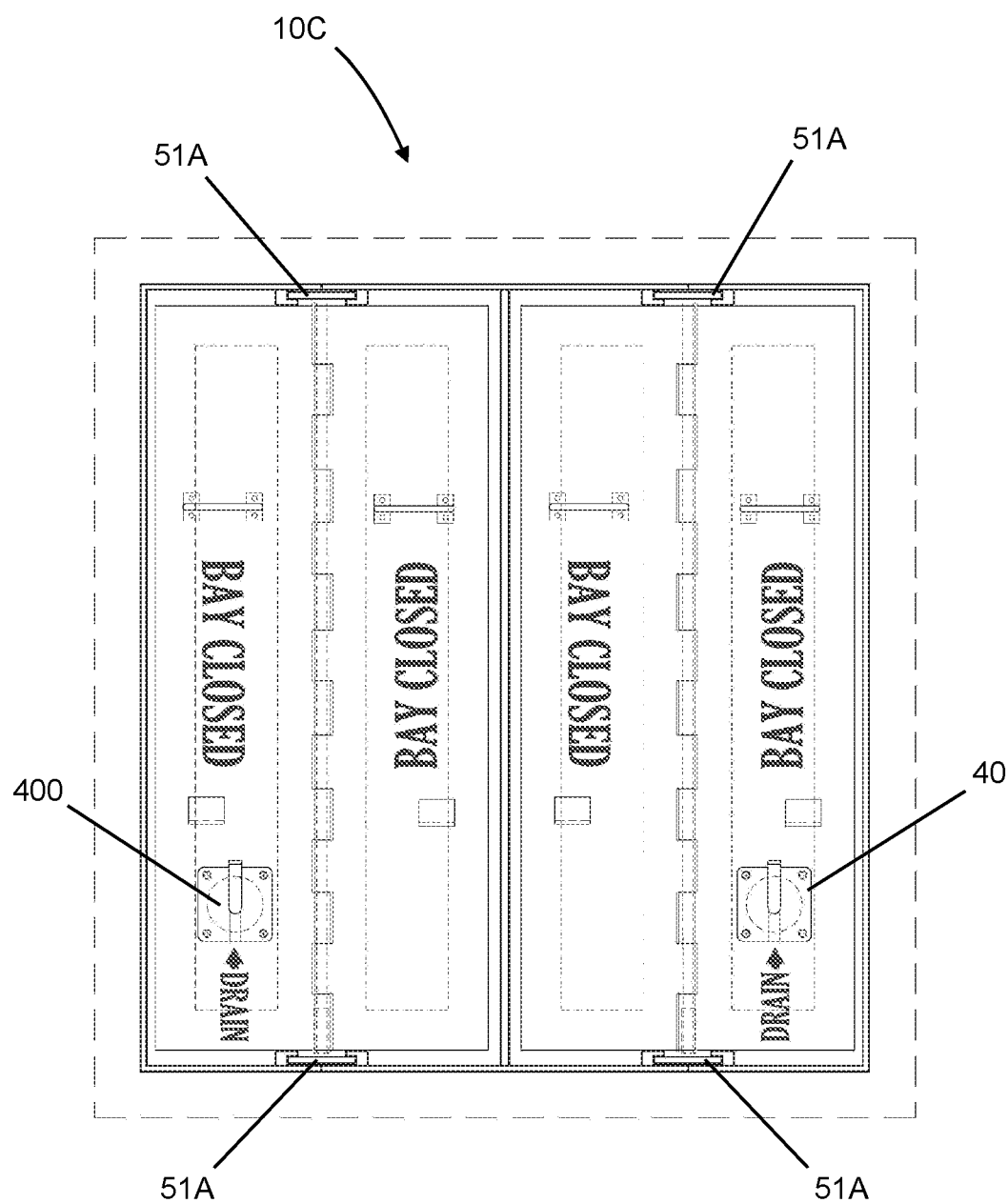
FIG. 54 is an annotated diagrammatic plan sectional view, portions in phantom, of the MCD of FIG. 49 with other floodgates in the closed position.
Figure 55:
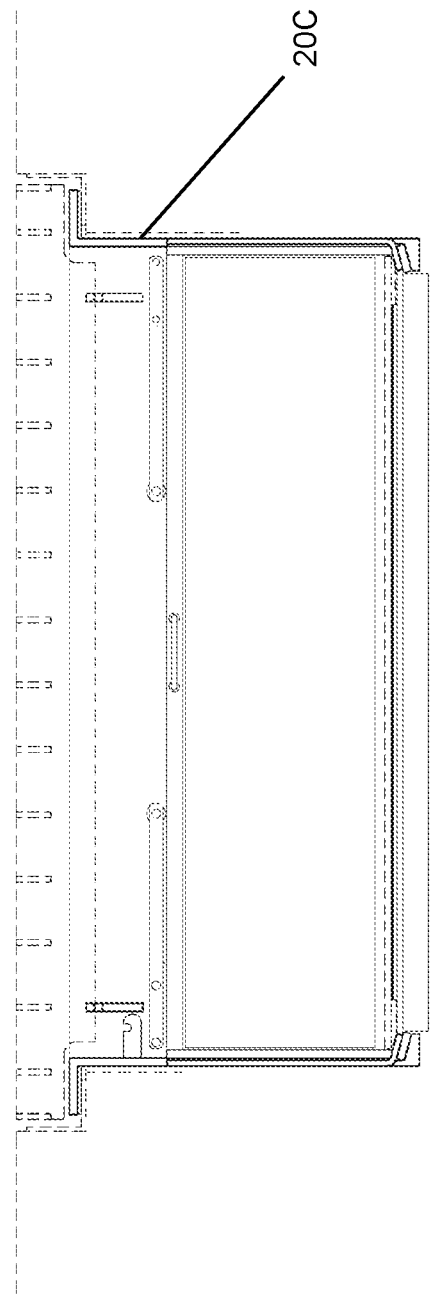
FIG. 55 is a longitudinal sectional view of the MCD of FIG. 49 with the floodgates in an opened position and an overlying grate illustrated in phantom.
Figure 56:
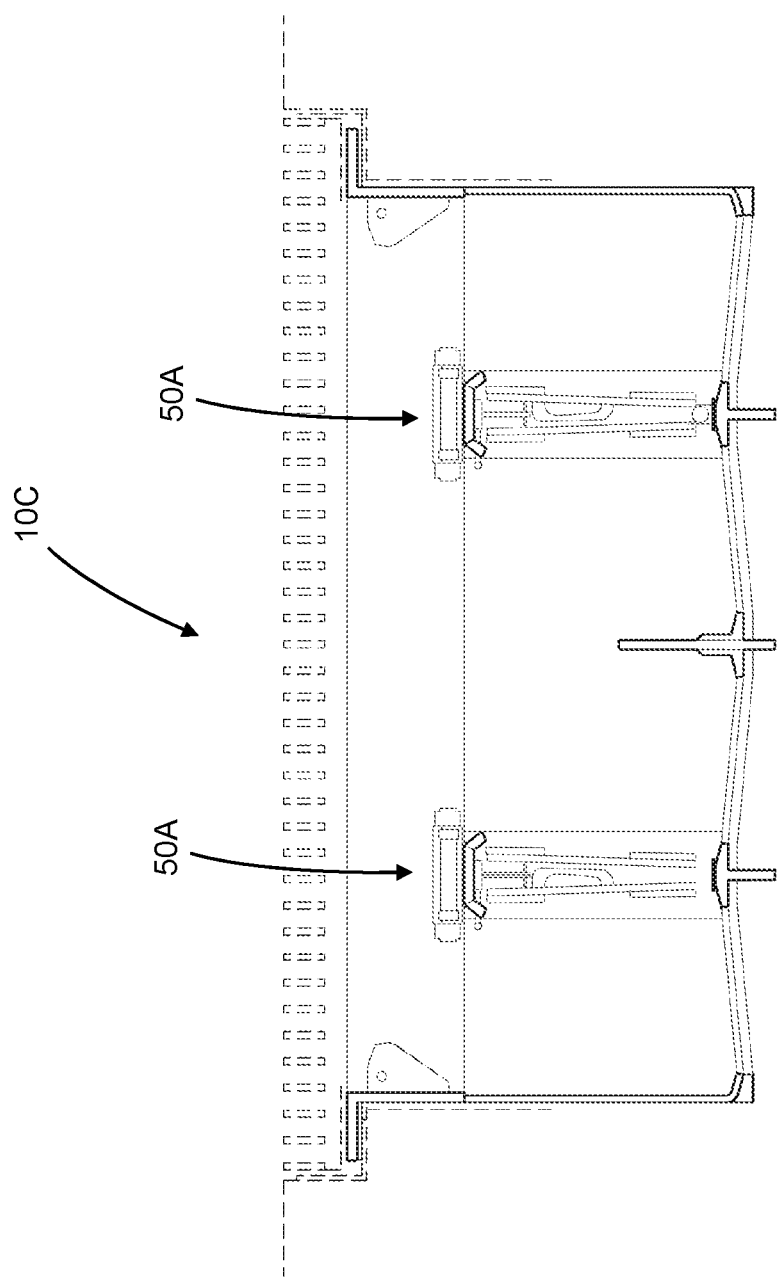
FIG. 56 is a diagrammatic transverse sectional view of the MCD of FIG. 49 with the floodgates in an opened position, portions in phantom, with an overlying grate illustrated in phantom.

With reference to FIG. 48, a neoprene gasket 74A of seamless rectangular form is mounted at the underside of the door. The gasket is secured in place with a stainless steel flange 75A which is bolted to the underside of the door 70A. Silicone is used to seal the screws for fastening the seal flange 75A against the gasket 74A into the doors. The underside of the doors have ribs 72A which reinforce the doors. A Delrin™ sleeve 94A is mounted at each end of the piano hinge to seal the hinge as it rides up and down the slot 96A. It should also be appreciated that the underside flange 28A which seals with the door is preferably the bottom flange is tilted 15° (FIGS. 36, 37, 38) to self-clean from falling debris.

Figure 38:
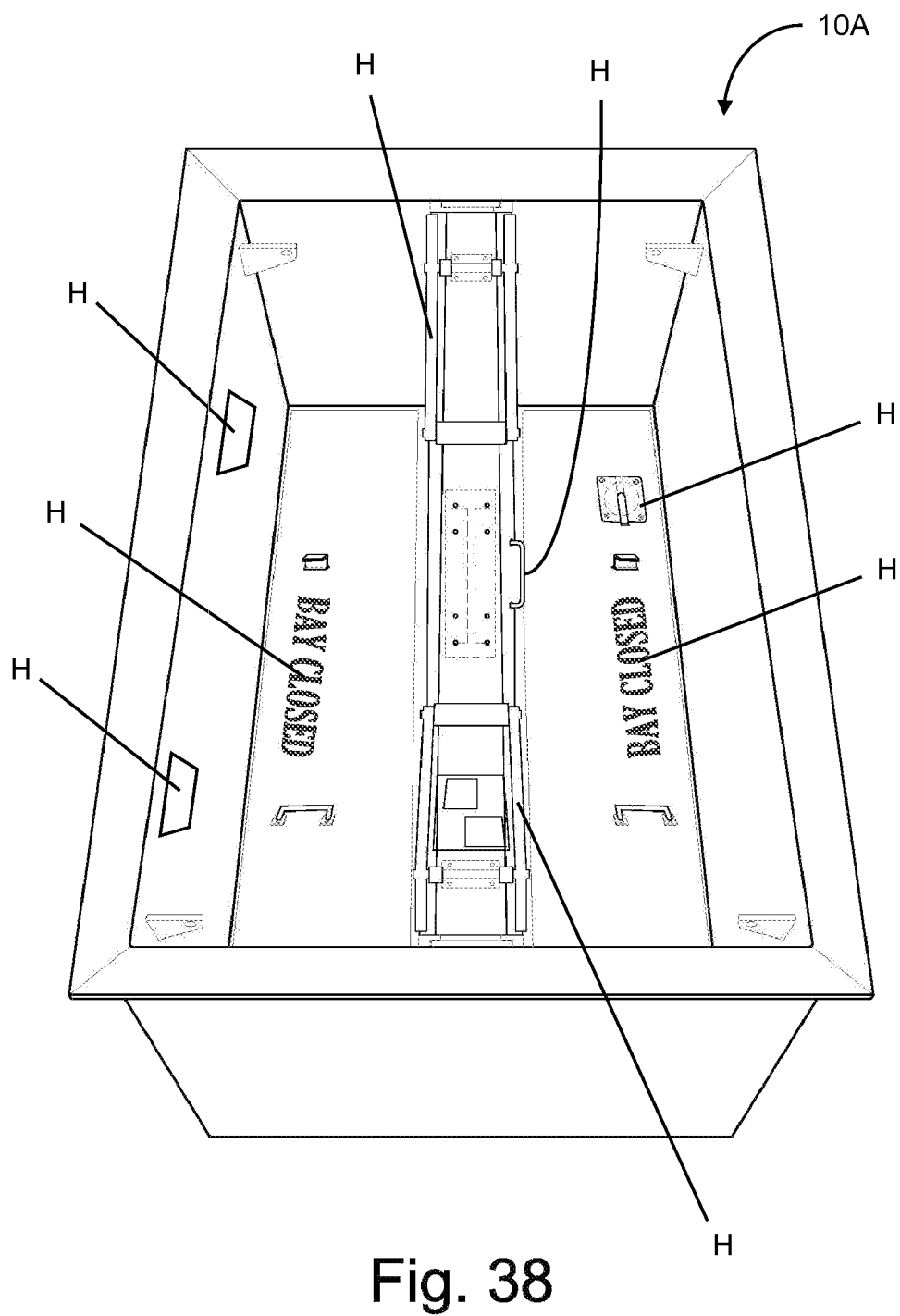
FIG. 38 is a photograph from above of the MCD of FIG. 29 showing the portions of higher visibility.
Figure 39:
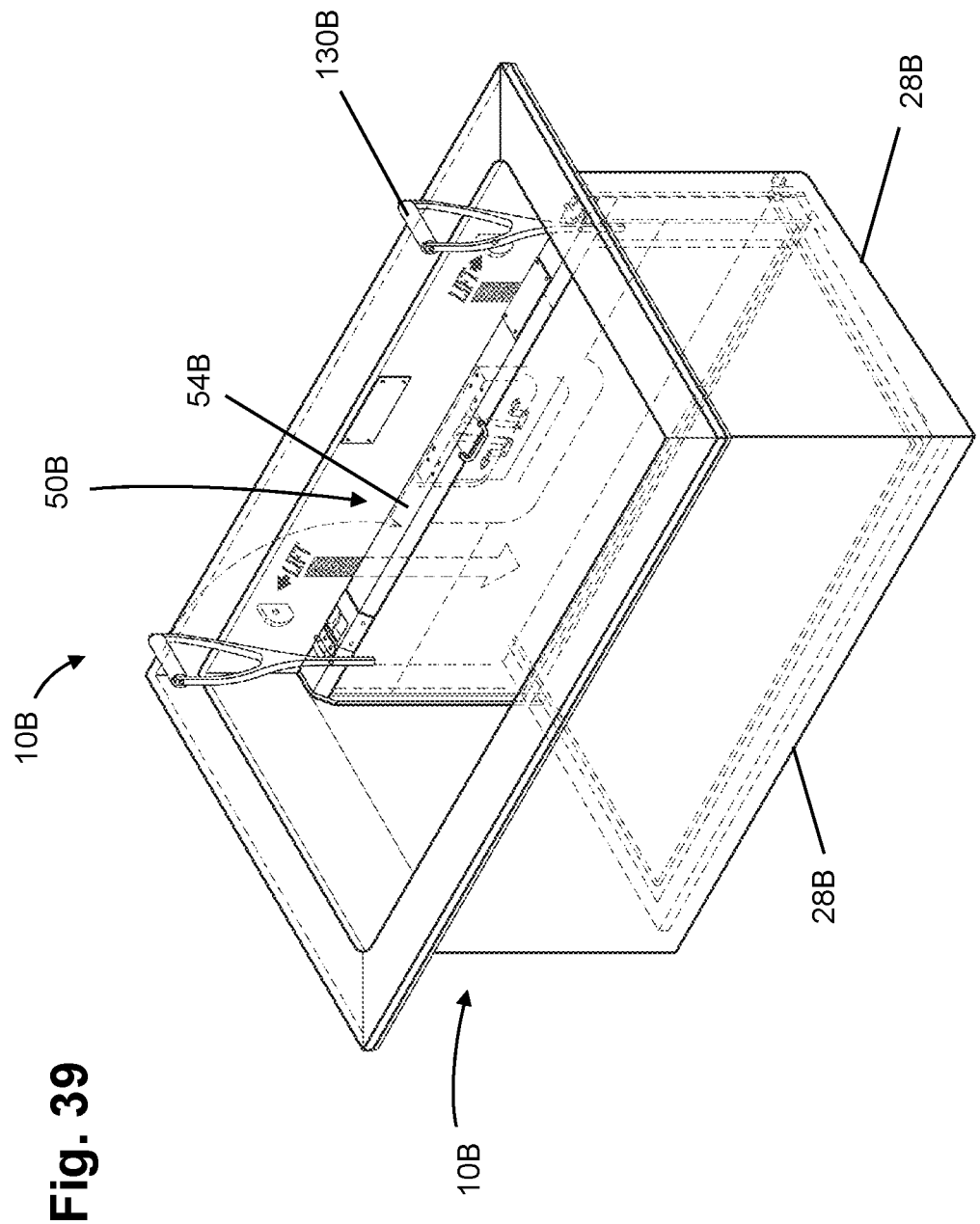
FIG. 39 is an annotated diagrammatic perspective view, partly in phantom, of a single bay door MCD with the handles extended to remove the floodgate assembly which is illustrated in an opened position.
Figure 40:
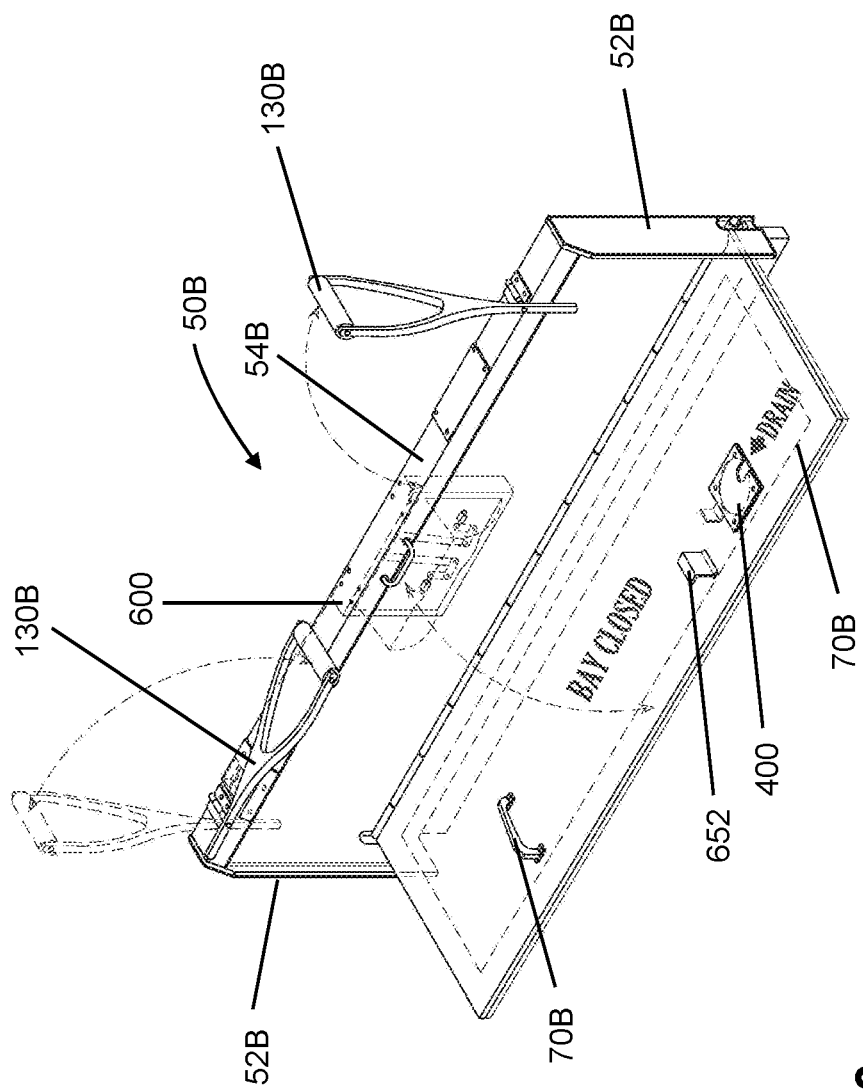
FIG. 40 is an annotated perspective view of the floodgate assembly of FIG. 39, partly in phantom and partly in schematic, as removed from the enclosure for service.
Figure 41:
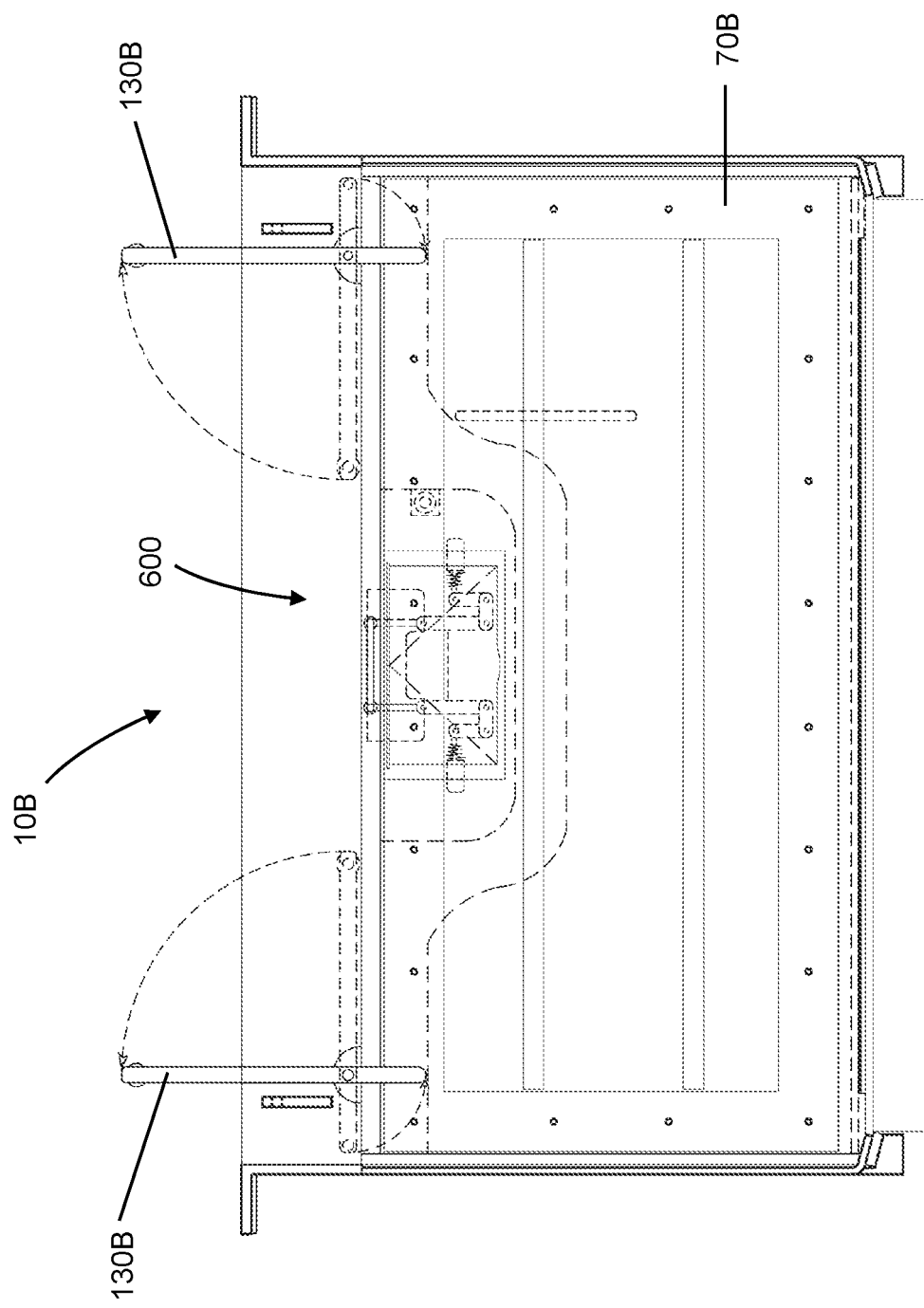
FIG. 41 is an annotated diagrammatic longitudinal sectional view, partly in phantom and partly in schematic, of the MCD of FIG. 39.
Figure 42:
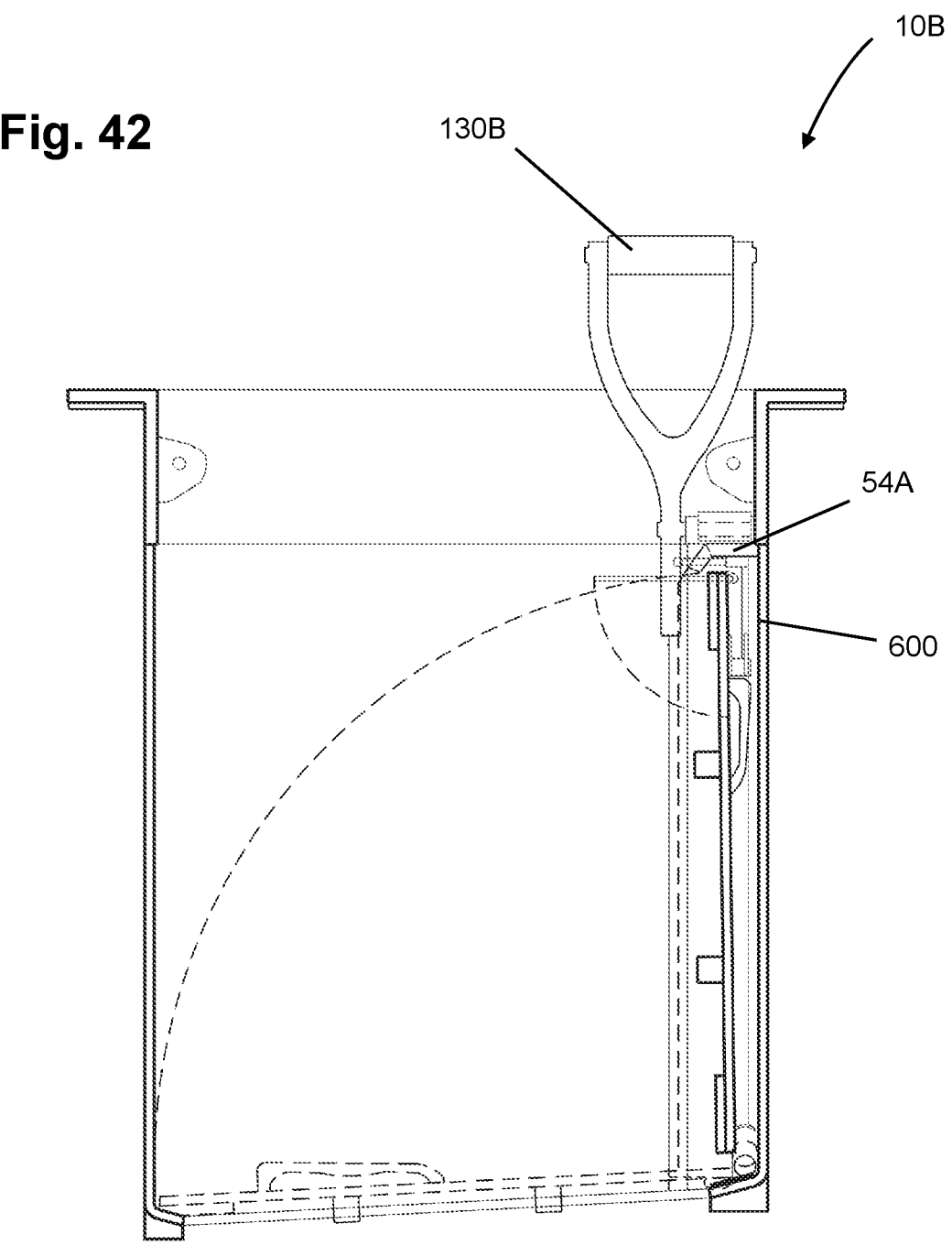
FIG. 42 is an annotated diagrammatic transverse sectional view, partly in phantom and partly in schematic, of the MCD of FIG. 39.
Figure 43:
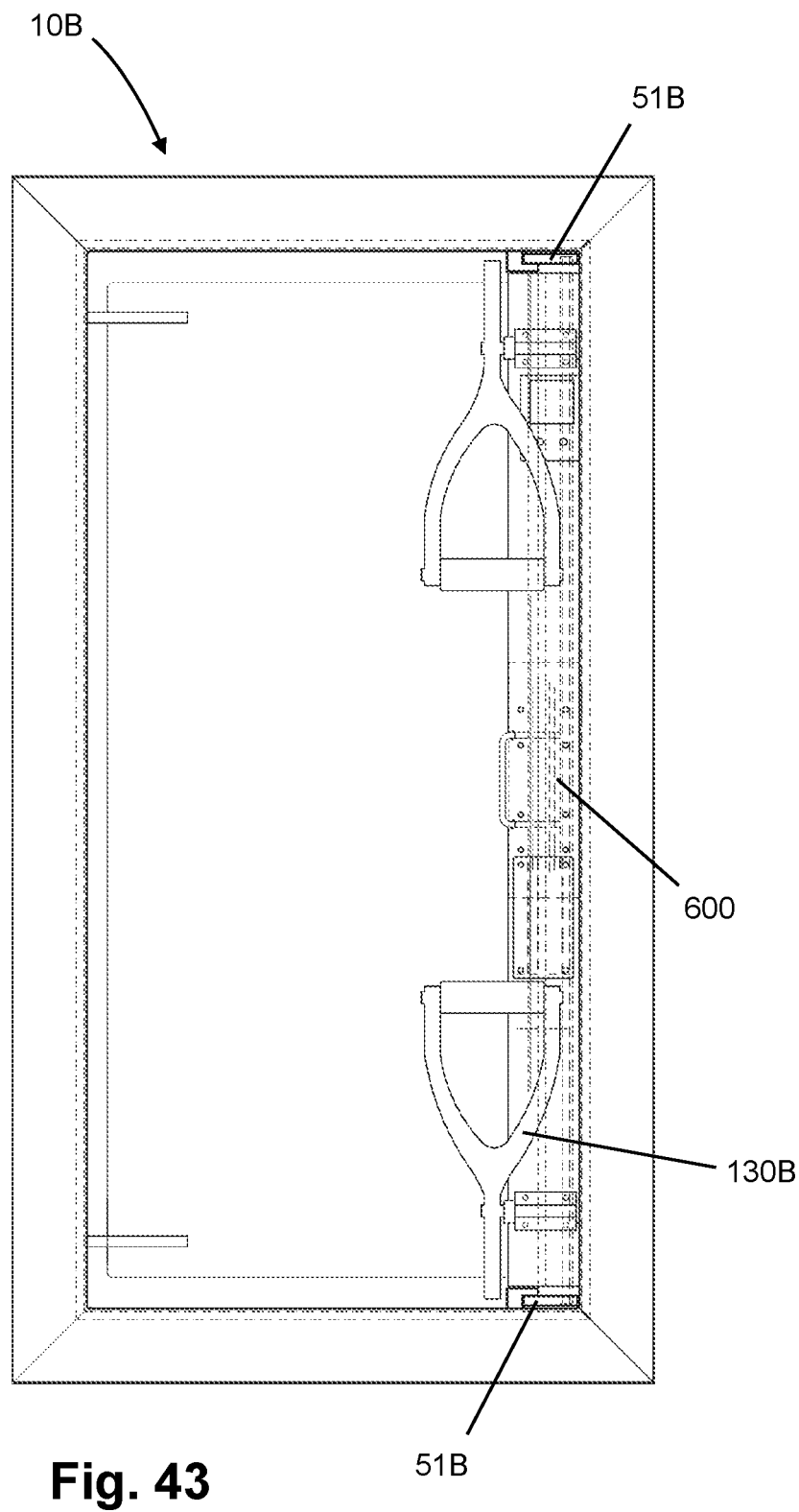
FIG. 43 is an annotated diagrammatic top plan view, portions in phantom, of the MCD of FIG. 39.
Figure 44:
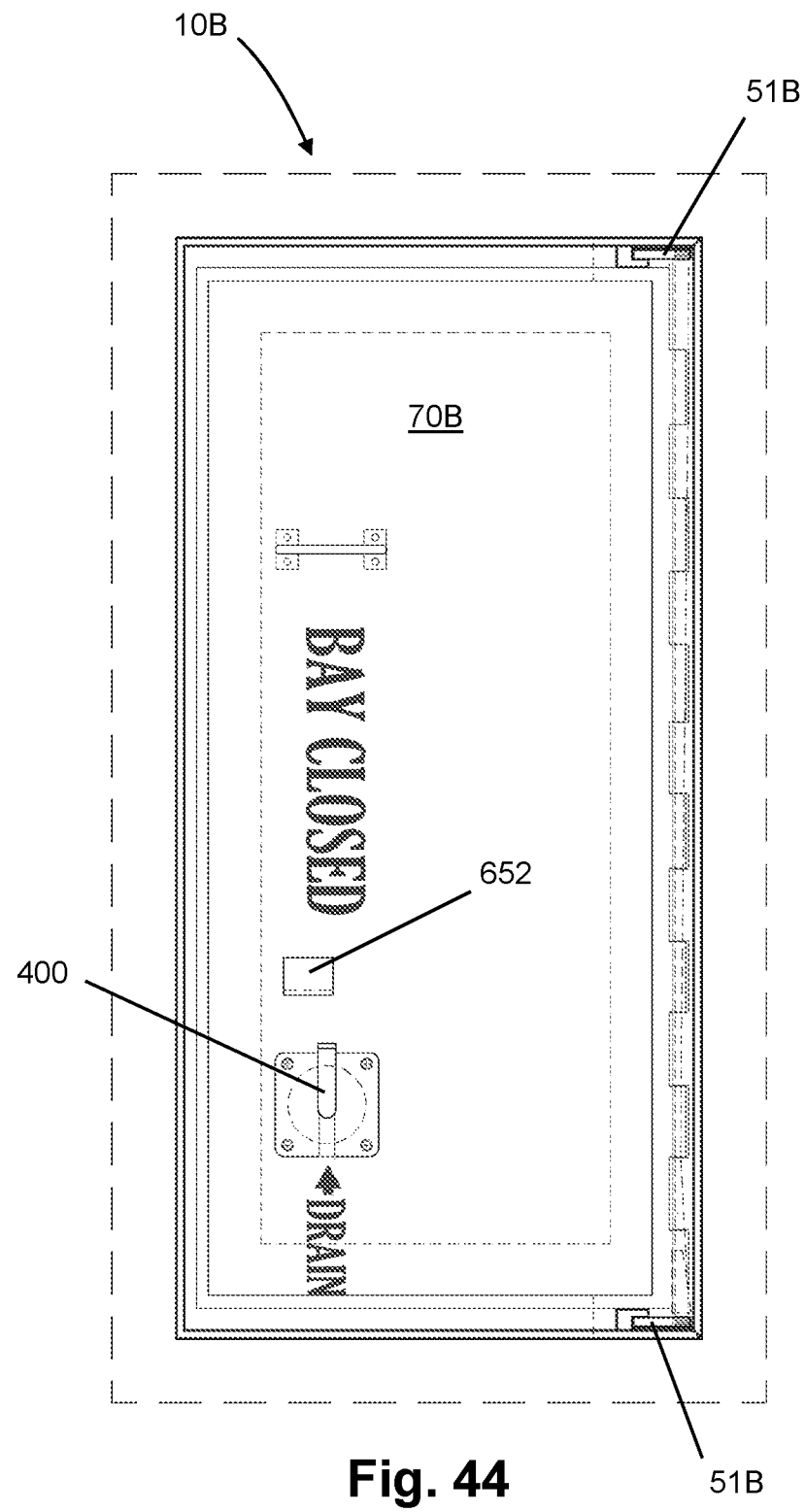
FIG. 44 is an annotated diagrammatic plan sectional view, portions in phantom, of the MCD of FIG. 39 with other floodgates in the closed position.
Figure 45:
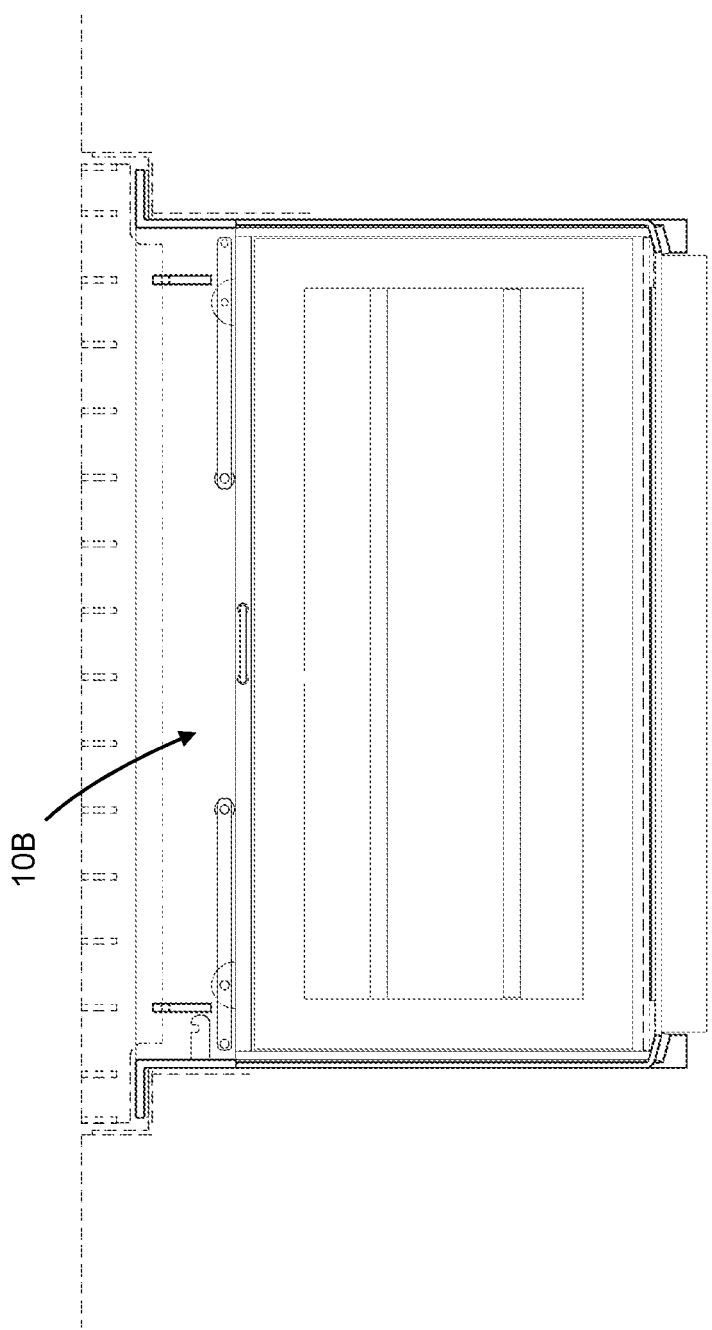
FIG. 45 is a longitudinal sectional view of the MCD of FIG. 39 with the floodgates in an opened position and an overlying grate illustrated in phantom.
Figure 46:
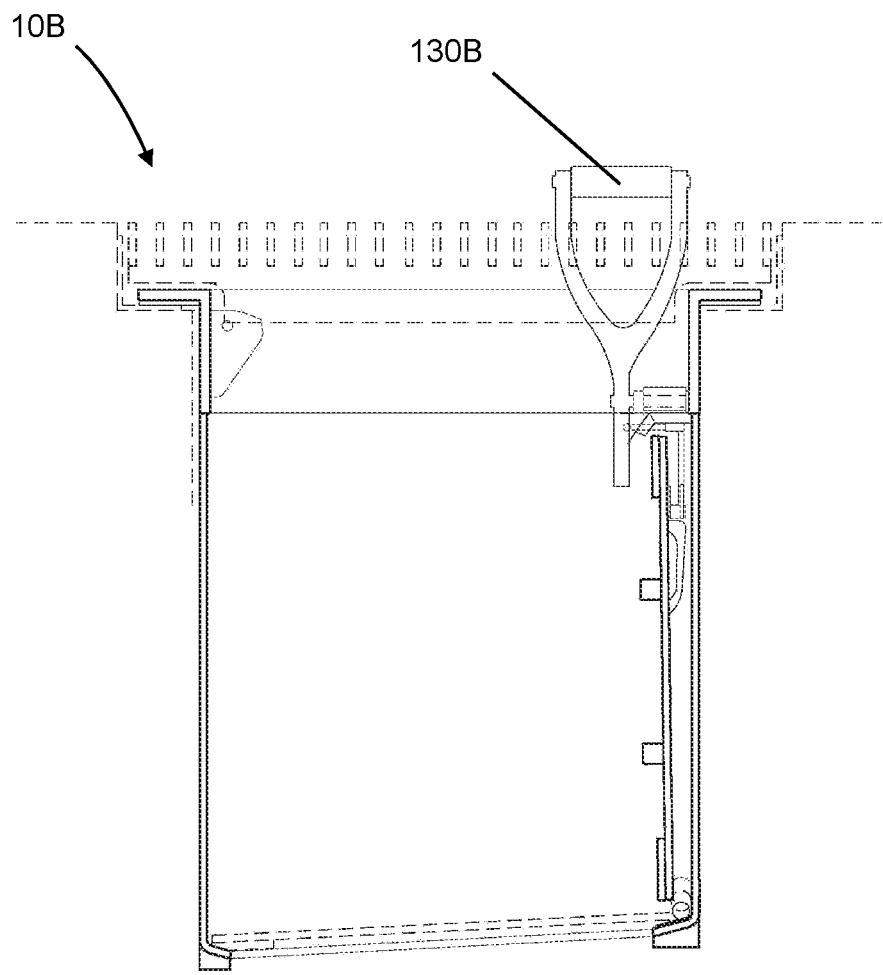
FIG. 46 is a diagrammatic transverse sectional view of the MCD of FIG. 39 with the floodgates in an opened position, portions in phantom, with an overlying grate illustrated in phantom.
Figure 47:
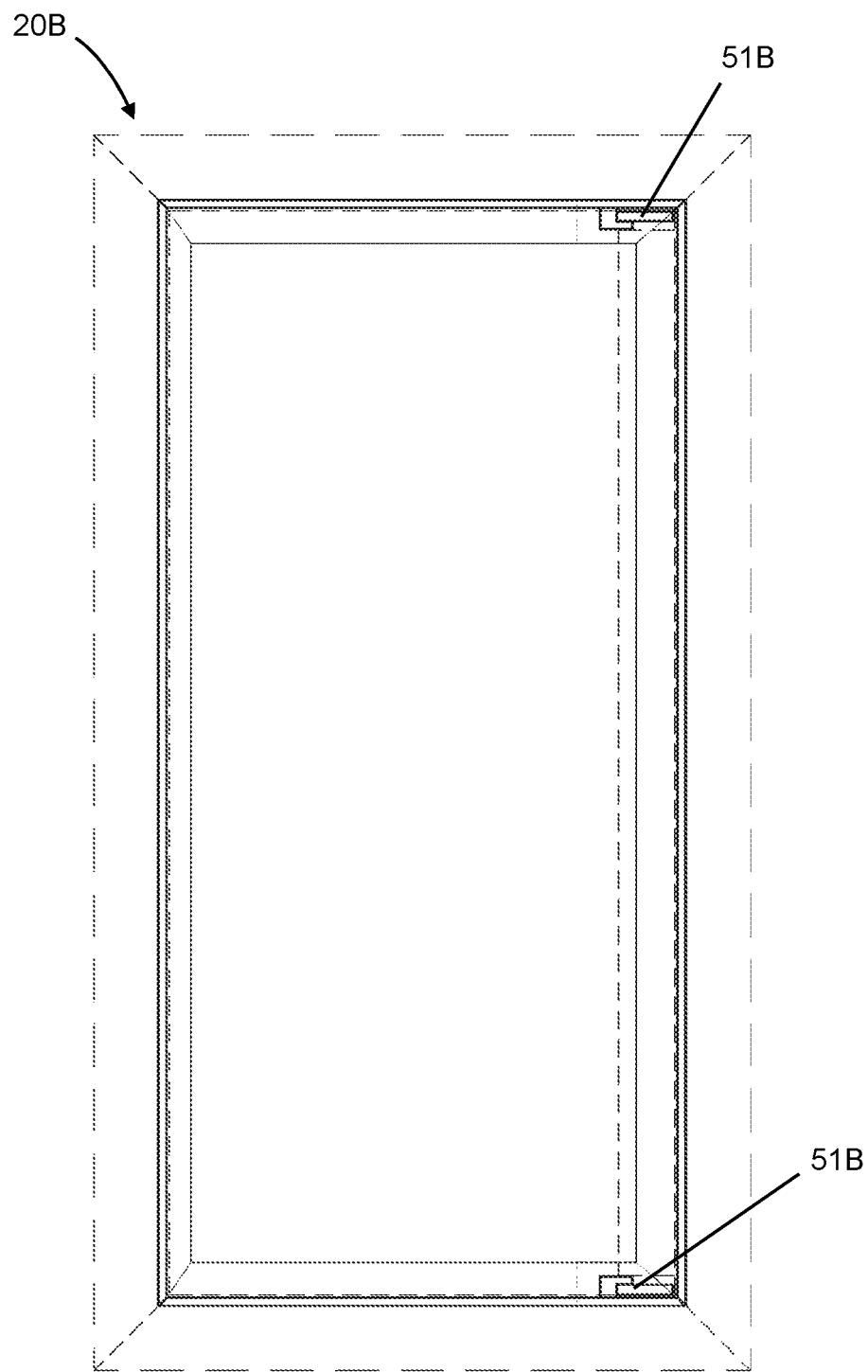
FIG. 47 is an annotated diagrammatic plan sectional view, partly in phantom, of the MCD of FIG. 39 with the floodgate assembly removed.

With additional reference to FIG. 38, high visibility tags and components are indicated by H in the MCD 10A. For example, the word "LIFT" and an arrow points to the lifting ears at the interior of the enclosure. The handles are painted with a high visibility epoxy paint. The handles 130 are also painted with a high epoxy paint. The top of the doors are painted in high visibility epoxy paint with "BAYS CLOSED" to indicate that the bays are closed. The top cover of the discharge drain 400 is painted with a high epoxy paint. The word "DRAIN" and an arrow is also painted to indicate the opening direction of the drain.

With reference to FIGS. 39-47, a single bay door MCD is generally designated by the numeral 10B. MCD 10B is similar in form and function to MCD 10 and MCD 10A except that only a single bay door 70B is provided for the slidably removable floodgate control assembly 50B. It will be appreciated that the enclosure has an L-shaped vertical guideway 51B (FIGS. 43, 44, 47) at one side of the enclosure which forms a channel for receiving the support 52B of the removable floodgate control assembly 50B. Naturally, the dimensions of the single floodgate door MCD 10B will be different from those associated with MCD 10 and MCD 10A. The handles 130B also have an alternative configuration to accommodate the relationship of the debris shield 54A to the adjacent side of the enclosure 20B.

With reference to FIGS. 49-56, an embodiment employing a pair of removably mountable floodgate assemblies 50A having a quadruple bay door configuration is generally designated as MCD 10C. MCD 10C essentially employs a pair of floodgate units substantially identical to floodgate assembly 50A in side-by-side disposition within the enclosure 20C. It will be appreciated that two guide assemblies for slidably receiving each of the floodgate assemblies are provided within the enclosure. Naturally, MCD 10C has dimensions which are greater than those of MCD 10A to accommodate the additional floodgate assembly.

The components and assemblies corresponding to the components and assemblies for MCD 10 and MCD 10A are designated by the numerals for MCD 10 followed by a C. It will be appreciated that the MCD 10C functions in a manner similar to that previously described for MCD 10 and MCD 10A except for the addition of an additional dismountable floodgate assembly. Two pairs of opposed guideways 51A for receiving the floodgate control assemblies 50A are mounted at the interior of the enclosure.

Figure 57:
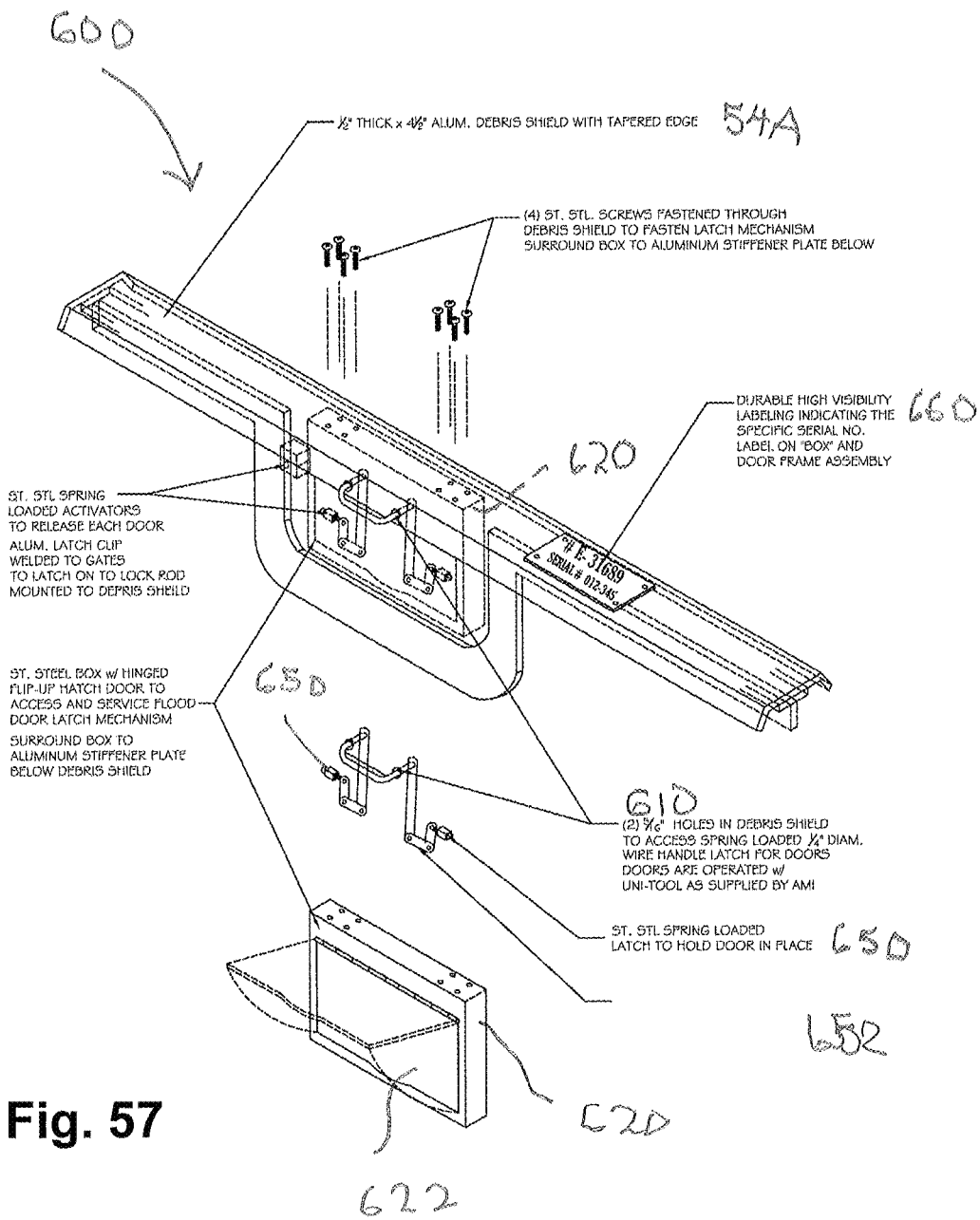
FIG. 57 is an annotated exploded view, partly in phantom, of a latch assembly and a portion of the MCD of FIG. 29.
Figure 58:
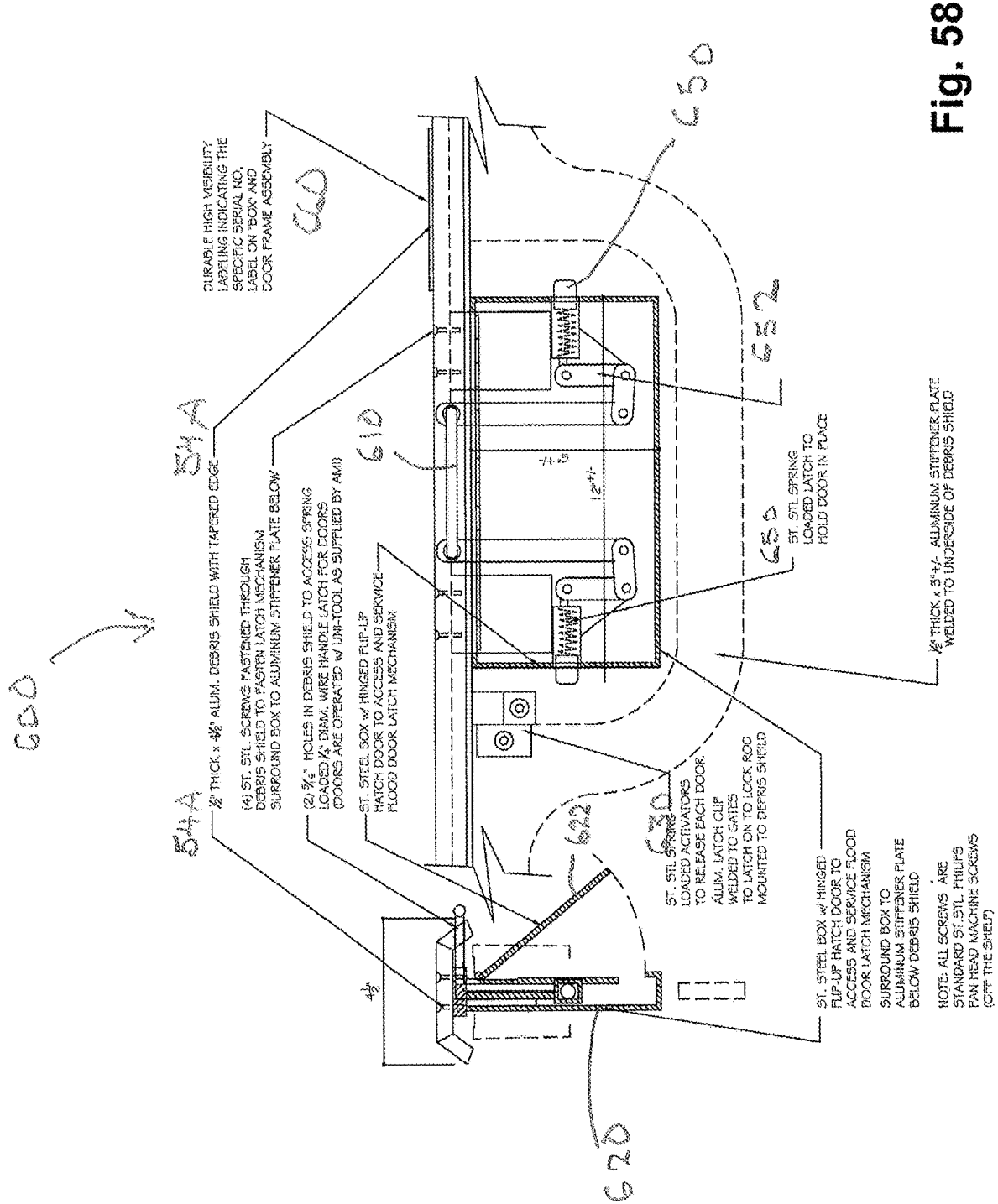
FIG. 58 is a composite side/end sectional view, partly in phantom, of the latch assembly and MCD portions of FIG. 57.
Figure 59:
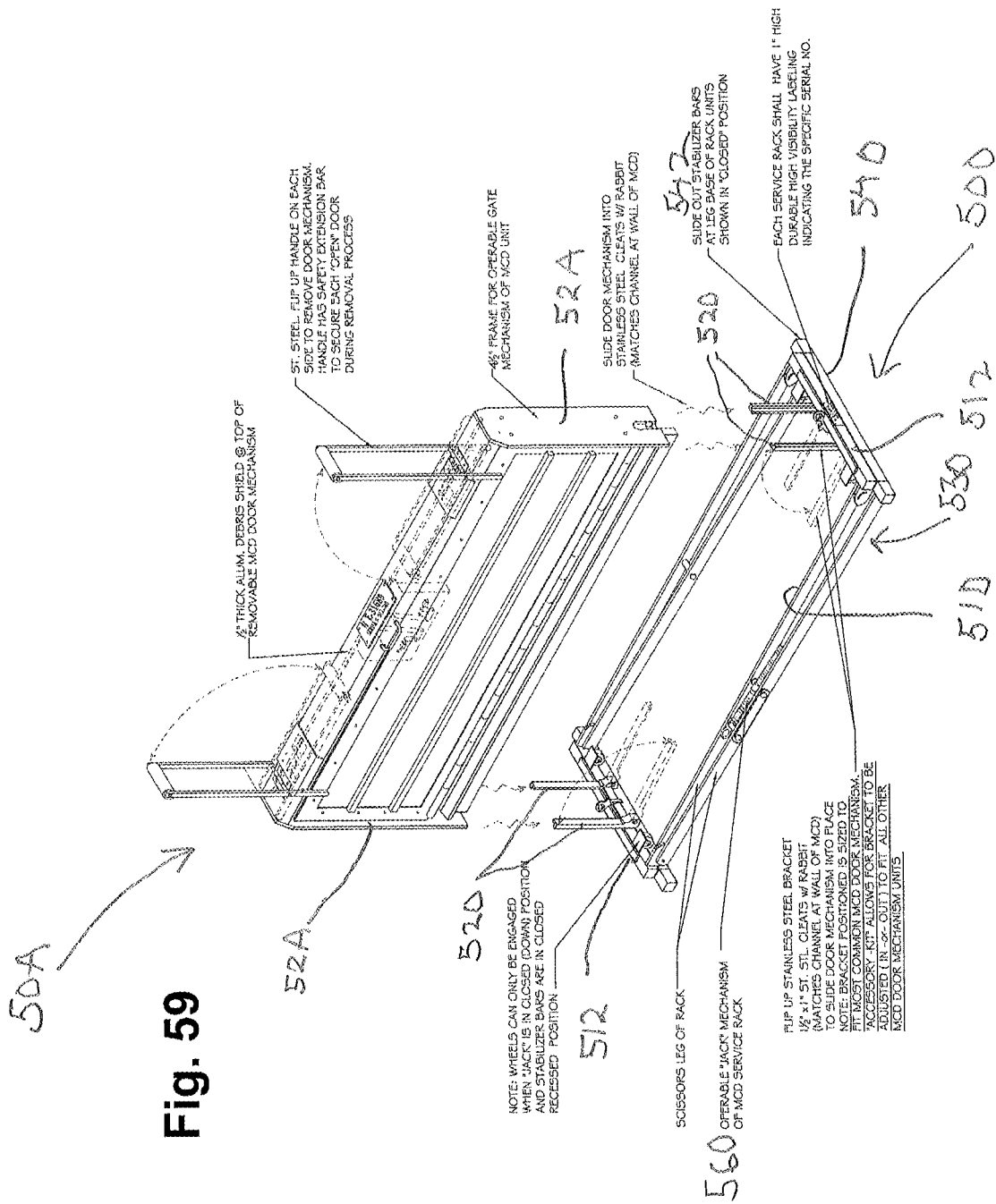
FIG. 59 is an annotated perspective view, partly in diagram, of a floodgate assembly prior to mounting to a service rack disposed in a collapsed position.
Figure 60:
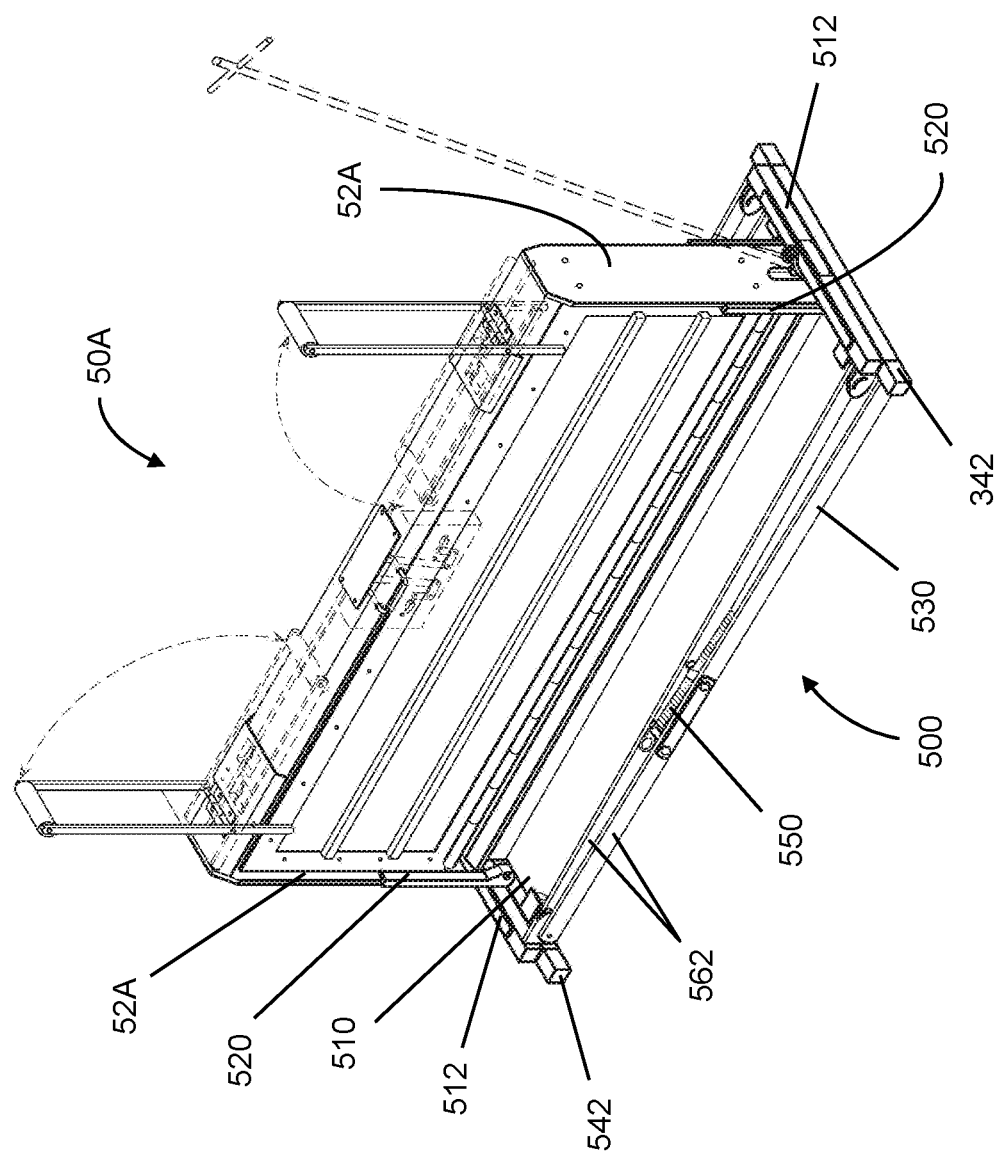
FIG. 60 is an annotated perspective view, partly in schematic and partly in phantom, of the floodgate assembly mounted to the service rack of FIG. 59 in the collapsed position.
Figure 61:
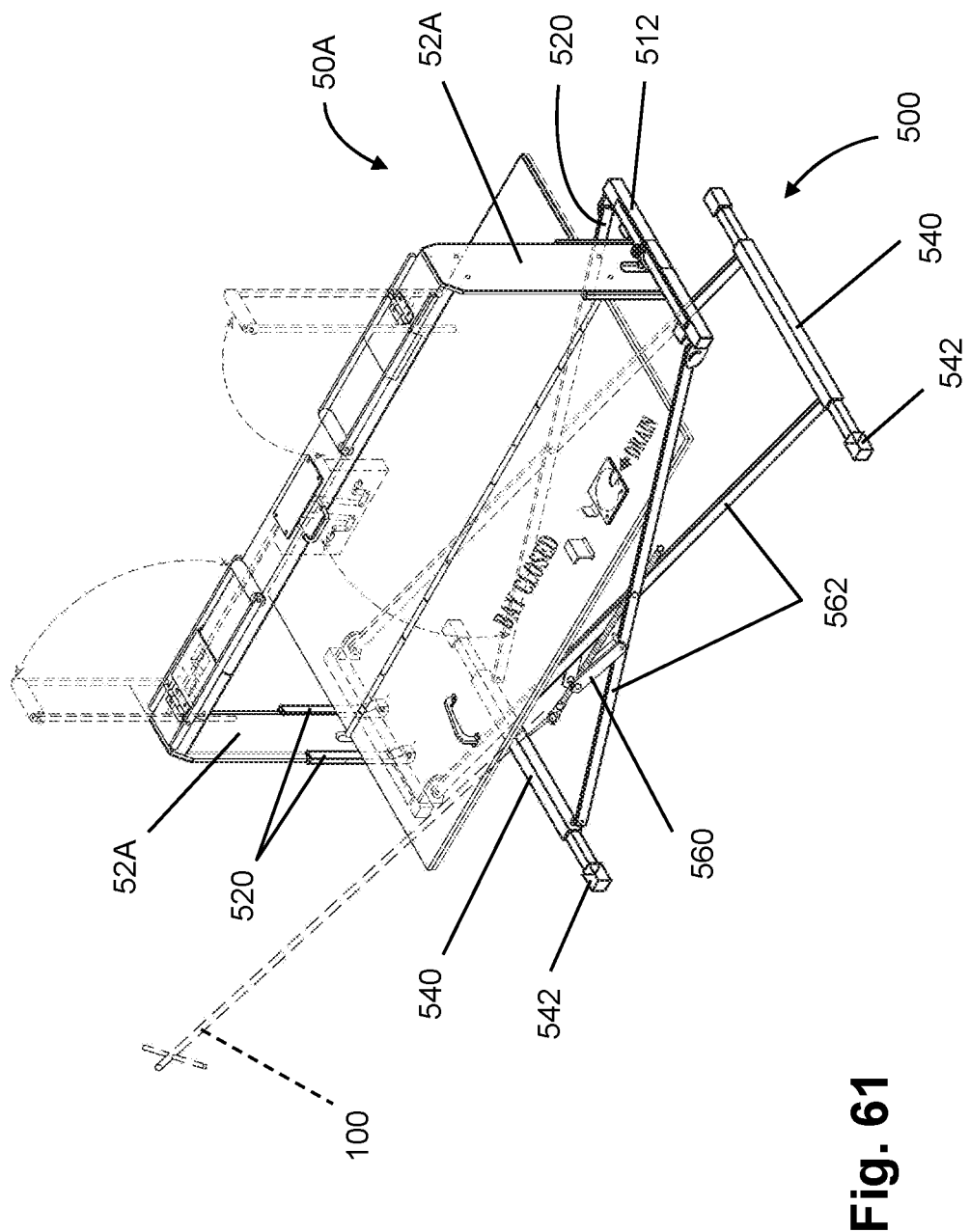
FIG. 61 is an annotated perspective view, partly in diagram and partly in phantom, of the floodgate assembly and service rack in an elevated position.
Figure 62:
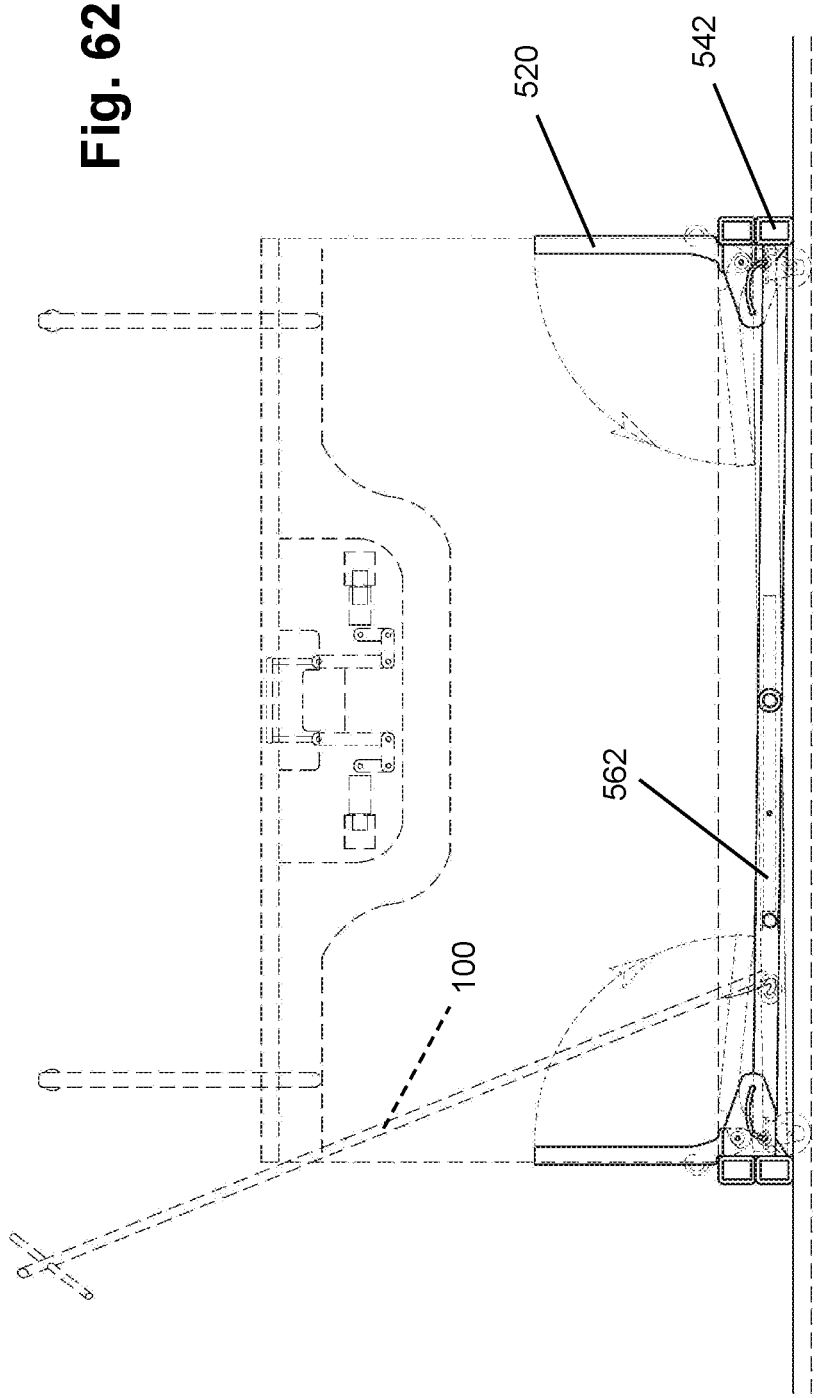
FIG. 62 is an annotated side sectional view of the service rack of FIG. 59 in the collapsed position together with the received floodgate assembly and service tool illustrated in phantom.
Figure 63:
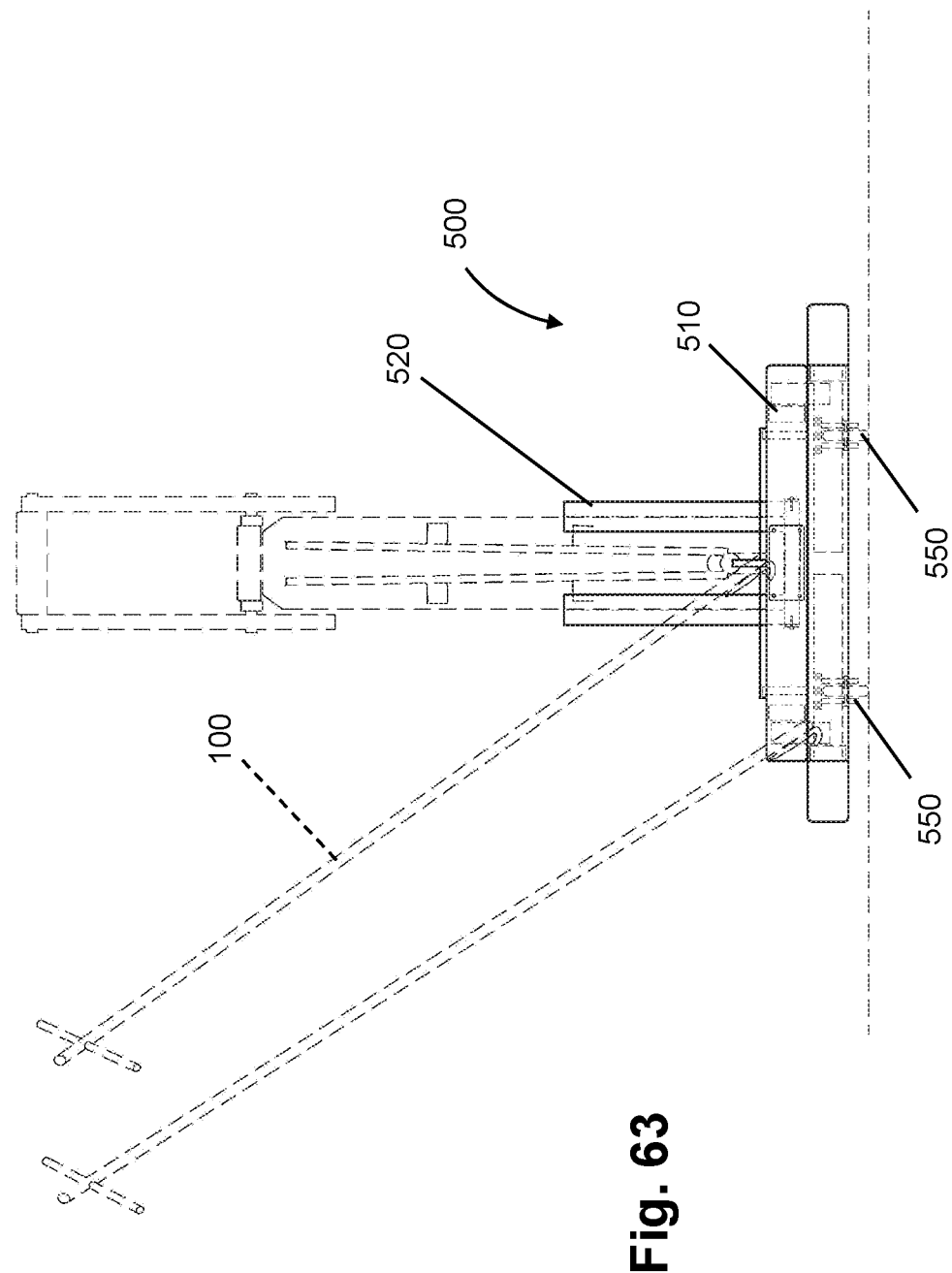
FIG. 63 is an end elevational view of the service rack of FIG. 59 in the collapsed position together with a received floodgate assembly and tool illustrated in phantom.
Figure 64:
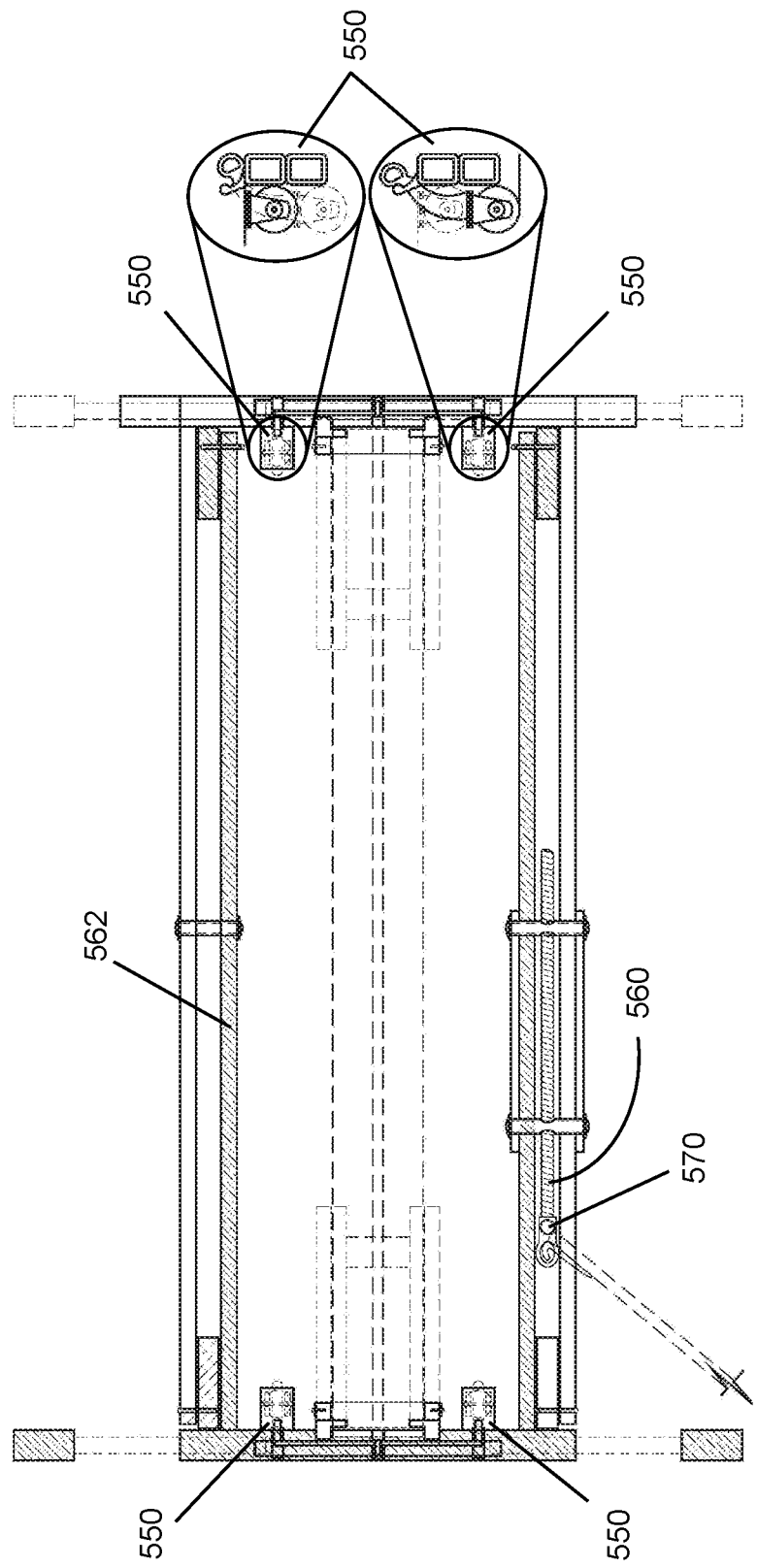
FIG. 64 is an annotated plan view of the service rack of FIG. 59 together with the received floodgate assembly and enlarged views of rack wheels being illustrated schematically.

With reference to FIGS. 57 and 58, a door latch assembly which is employed in MCD 10A and is suitable for other MCD embodiments is generally designated by the numeral 600. The latch assembly 600 is mounted at the underside of the debris shield 54A. The latch assembly includes a ¼ inch diameter handle latch 610 for the doors 70A and 80A. The handle latch is operated by the tool 100 as previously described. The latch assembly 600 is mounted in a steel box 620 with a hinged flip-up hatch door 622. The hatch door provides access for servicing the latch assembly.

Figure 34:
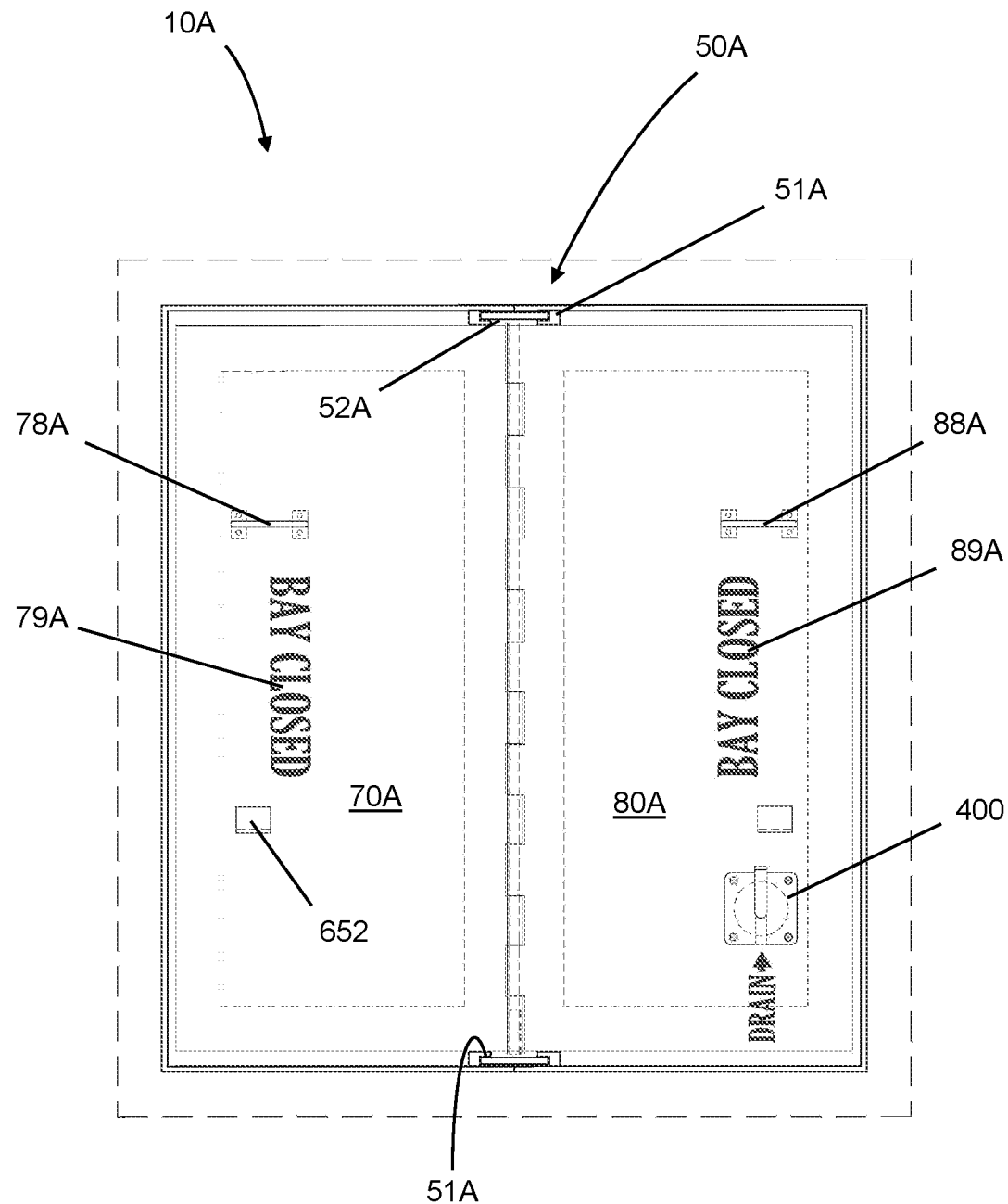
FIG. 34 is an annotated diagrammatic plan sectional view, portions in phantom, of the MCD of FIG. 29 with other floodgates in the closed position.
Figure 35:
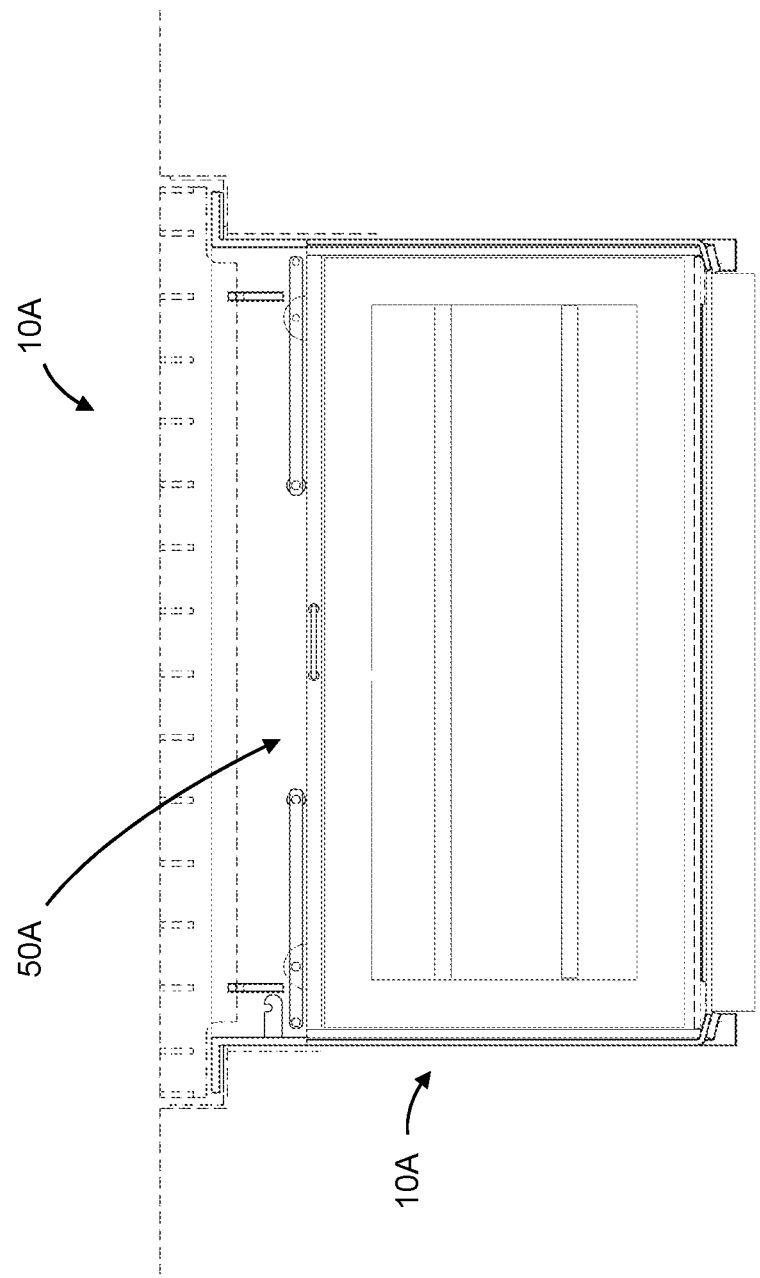
FIG. 35 is a longitudinal sectional view of the MCD of FIG. 29 with the floodgates in an opened position and an overlying grate illustrated in phantom.
Figure 36:
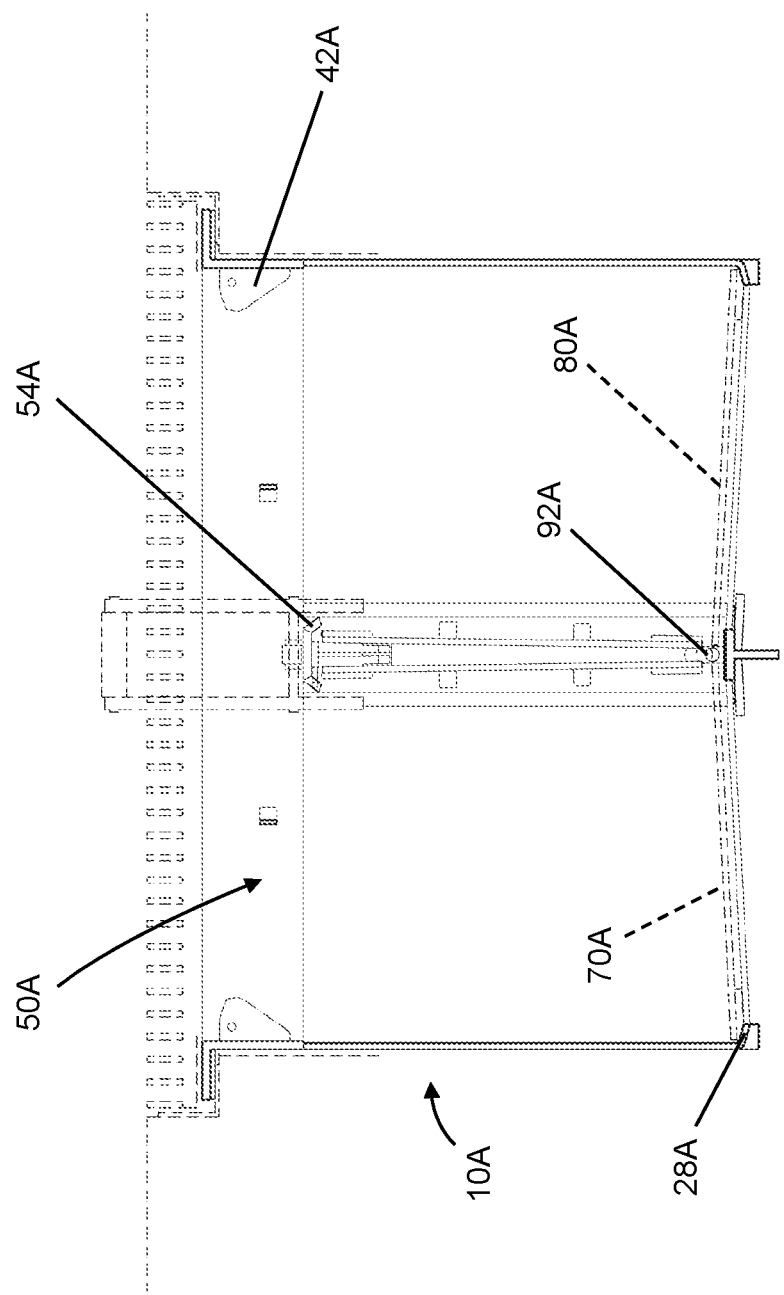
FIG. 36 is a diagrammatic transverse sectional view of the MCD of FIG. 29 with the floodgates in an opened position, portions in phantom, with an overlying grate illustrated in phantom.
Figure 37:
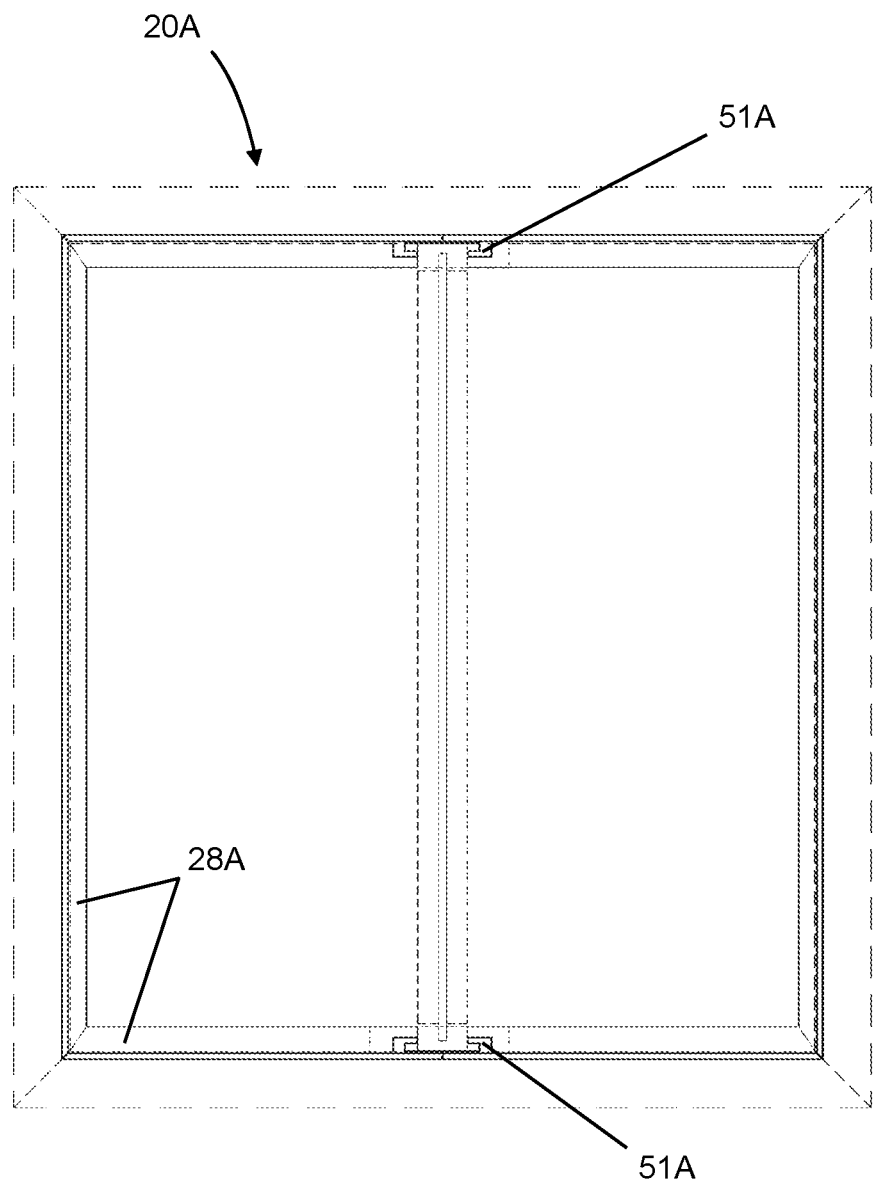
FIG. 37 is an annotated diagrammatic plan sectional view, partly in phantom, of the MCD of FIG. 29 with the floodgate assembly removed.

Spring loaded activators 630 are mounted for releasing each door. An aluminum latch cup 640 is welded to the gates to latch onto a lock rod mounted to the debris shield. A spring loaded latch 650 secures each door in place to a catch 652 (FIGS. 32, 34). The latches are linked to the latch 610 by a linkage 652 for retaining the latches. A high visibility label 660 which indicates the MCD serial number is mounted on top of the debris shield assembly.

When the doors 70A and 80A are in the opened position, each of the doors latch onto the spring loaded latch 600 fastened to the debris shield 54A of the door frame assembly 50A. Both of the doors release simultaneously when the hook tool 100 engages the latch 610 to close the doors. It will also be appreciated that each door may be operated independently for opening and closing for maintenance and servicing.

With reference to FIGS. 59-68, a service rack for the mechanical closure device 10A is generally designated by the numeral 500. Service rack 500 is adapted to stably receive the floodgate assembly 50A after it is removed from the enclosure 20A and to facilitate the various service and maintenance required to keep the mechanical portions of the MCD, which is principally the floodgate assembly 50A, in sound mechanical working condition.

Service rack 500 comprises a frame-like platform 510 having opposed ends 512. A pair of stainless steel pivotal brackets 520 adjacent the ends 512 flip up. The brackets are configured to slidably engage in opposing channel-like fashion the end edges of supports 52A of the floodgate assembly so that the floodgate door assembly may be slid onto the brackets 520 and stably positioned on the platform.

Figure 65:
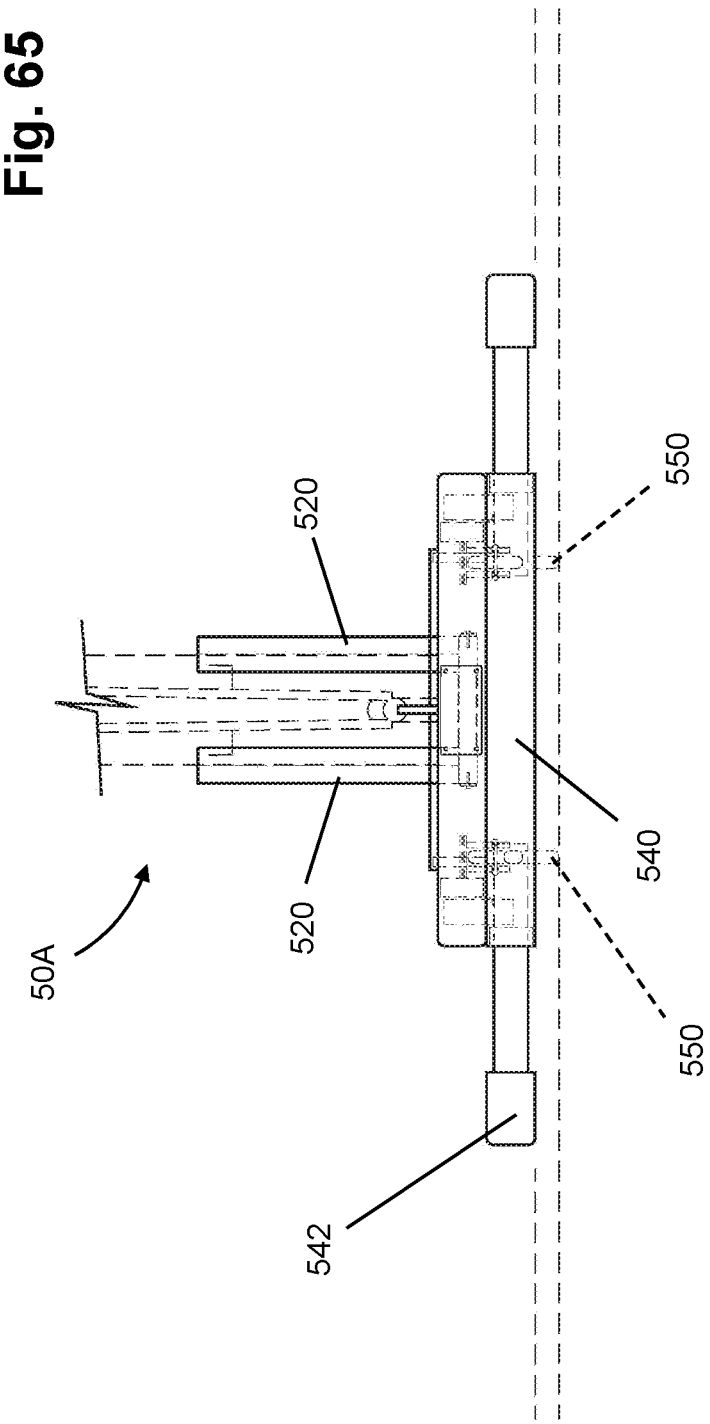
FIG. 65 is an end elevational view of the service rack of FIG. 59 in a collapsed position together with a portion of the received floodgate assembly illustrated in phantom and the rack wheels illustrated schematically.
Figure 66:
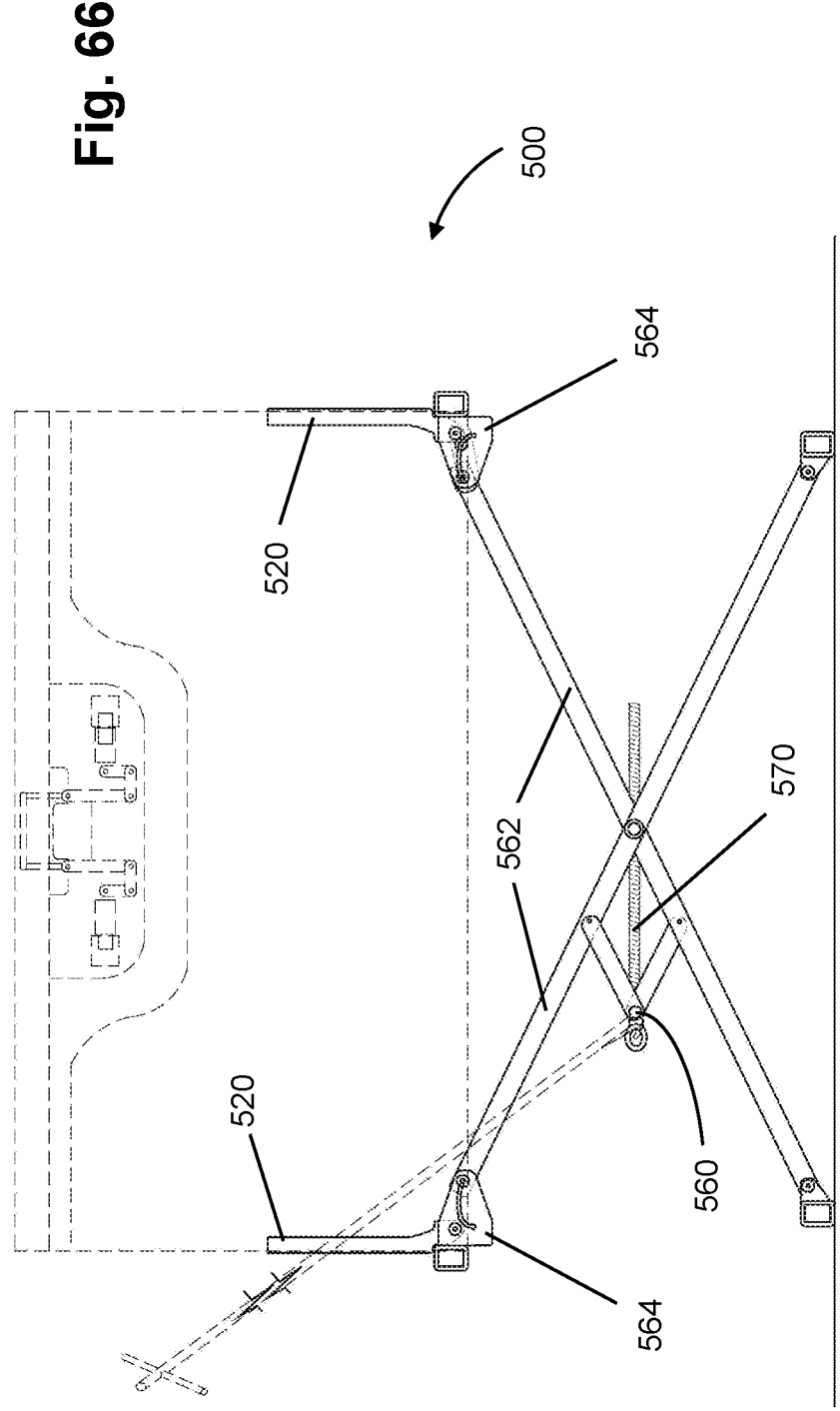
FIG. 66 is a side sectional view of the service rack of FIG. 59 illustrated in a high point elevated position together with a portion of the floodgate assembly and service tool illustrated in phantom.
Figure 67:
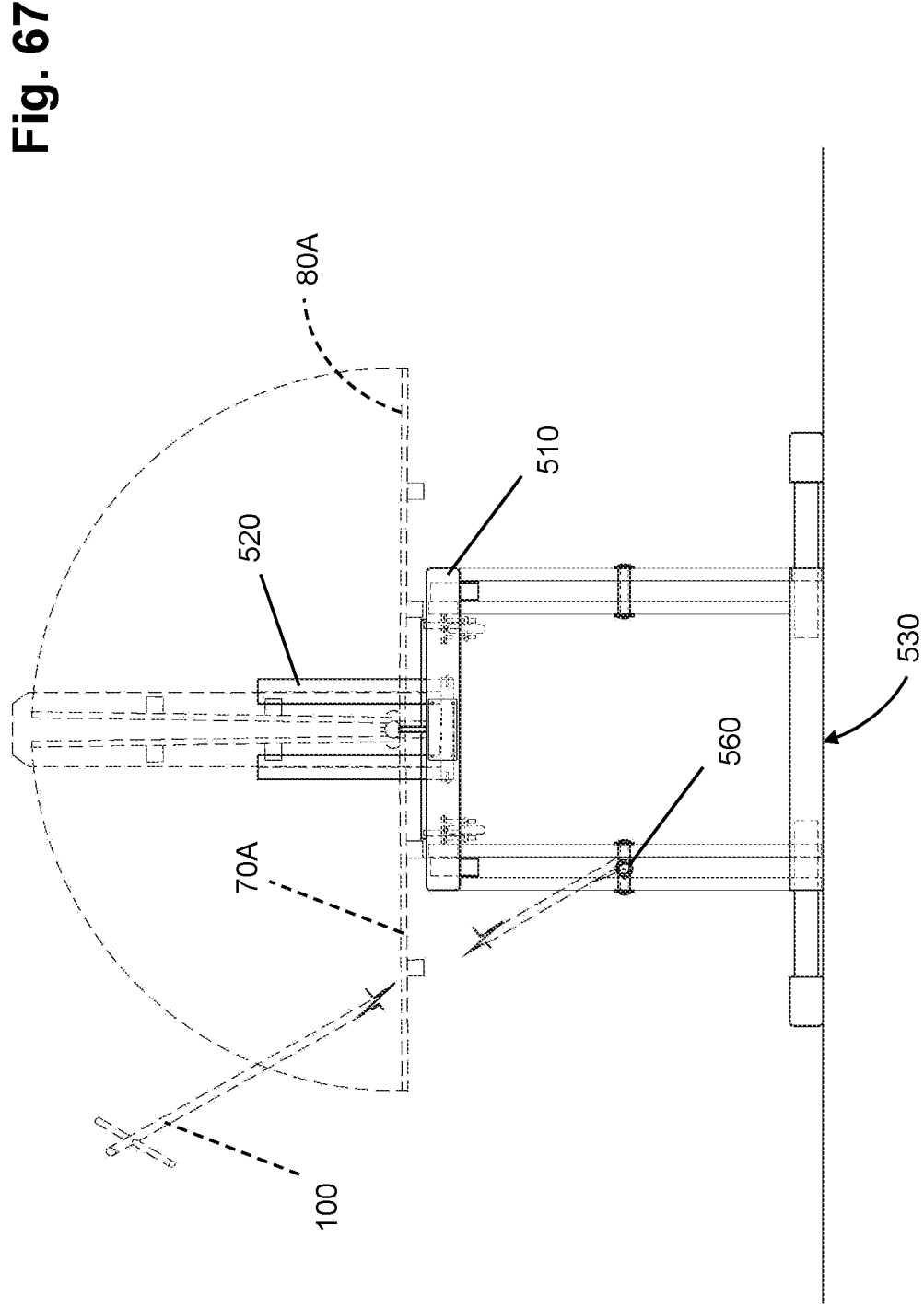
FIG. 67 is an end elevational view of the service rack at the high point elevated position of FIG. 66, portions of the service tool and the floodgate assembly being illustrated, in phantom and diagrammatically.

The platform 510 is variably vertically positionable above a frame-like base 530 which has a pair of transversely extending tubular feet 540. Opposed ends of each of the feet slidably receive stabilizer bars 542 which are projectable outwardly at the opposed ends of the feet 540. The feet 540 also preferably mount two pairs of roller wheels 550 at the underside. The roller wheels can only be engaged for mobility when the stabilizer bars 542 are in the retracted closed position. When the stabilizer bars 542 are extended, the bars elevate the wheels so that the wheels do not engage the surface, as best illustrated in FIG. 65.

The service rack 500 has a jack assembly 560 which essentially connects the base with the platform and allows the platform 510, and hence a received floodgate assembly 50A, to be vertically adjusted as required for servicing. A pair of transversely spaced scissor supports 562 connect at transversely opposed sides with the base and the platform. The scissor supports 562 connect the platform 510 via a slotted bracket 564. A worm jack mechanism 570 is operable by means of the hook tool 100 for the MCD unit to provide a torque and to adjust the vertical positions of the scissors 562 similar to a car jack mechanism. The service rack can thus be lifted from the collapsed position of FIG. 60 to an elevated position of FIG. 61 as well as a number of intermediate positions as may be required for servicing the floodgate assembly.

While preferred embodiments of the foregoing invention have been set forth for purposes of illustration, the foregoing descriptions should not be deemed a limitation of the invention herein. Accordingly, various modifications, adaptations and alternatives may occur to one skilled in the art without departing from the spirit and the scope of the present invention.

The invention claimed is:

1. A mechanical closure device comprising:
   an enclosure having four sides, a top and a bottom with a flange projecting inwardly at the bottom and defining a discharge opening;
   a floodgate assembly interiorly mounted to said enclosure and mounting a pair of doors pivoted on a hinge assembly between an opened position and a closed position wherein the doors seal against said flange to prevent passage of water through said opening, and each of said doors mounts a gasket at its underside for sealing between said door and said flange in the closed position;
   at least one appendage mounted to each door to facilitate opening and closing said door; and
   a discharge drain assembly disposed on one door and having an opened and a closed position.

2. The mechanical closure device of claim 1 wherein said floodgate assembly further comprises a debris shield substantially extending between opposed sides of said enclosure and disposed above said hinge assembly.

3. The mechanical closure device of claim 2 wherein said debris shield further includes at least one opening.

4. The mechanical closure device of claim 1 wherein said enclosure further mounts a plurality of lift tabs.

5. The mechanical closure device of claim 3 wherein said at least one appendage generally aligns with said opening in said debris shield.

6. The mechanical closure device of claim 1 wherein said at least one appendage defines an opening and further comprising a T-shaped tool which mounts a hook which is engageable in said appendage opening.

7. The mechanical closure device of claim 1 wherein said floodgate assembly further comprises a pair of spaced supports which mount said hinge assembly and said supports are slidably received in opposed channel-like guides and secured to opposed sides of said enclosure.

8. The mechanical closure device of claim 7 and further comprising a bolt which secures a support to said enclosure and further comprising a T-shaped tool having a torque driver which is engageable with said bolt for tightening or loosening said bolt.

9. The mechanical closure device of claim 1 wherein said hinge assembly further comprises an elongated rod which engages each of said doors to form a piano hinge.

10. The mechanical closure device of claim 9 wherein said rod has opposed ends which are received in a sleeve and said rod moves in a slot of said floodgate assembly.

11. The mechanical closure device of claim 1 wherein said discharge drain assembly has a lockable latch which latches said doors in the opened position and said doors cannot be moved to the opened position unless said drain assembly is in a closed position.

12. A mechanical closure device comprising:
    an enclosure having four sides, a top and a bottom with a sealing portion projecting inwardly at the bottom and defining a discharge opening;
    at least one floodgate assembly interiorly mounted to said enclosure and slidably dismountable therefrom and mounting at least one door pivoted on a hinge assembly between an opened position and a closed position wherein each door seals against said sealing portion to prevent passage of water through said discharge opening, and wherein each said floodgate assembly further comprises a debris shield substantially extending between opposed sides of said enclosure and disposed above said hinge assembly and mounting a latch assembly;
    at least one appendage mounted to each door to facilitate opening and closing said door; and
    a discharge drain assembly disposed on one door and having an opened and a closed position.

13. The mechanical closure device of claim 12 wherein said debris shield further defines an opening which accesses said latch assembly.

14. The mechanical closure device of claim 12 wherein each said door mounts a gasket at its underside for sealing between said door and a sealing portion in the closed position.

15. The mechanical closure device of claim 12 wherein there are two substantially identical floodgate assemblies and four doors.

16. A floodgate assembly mountable to an enclosure comprising:
    a frame assembly comprising spaced supports and a debris shield;
    a pair of doors hinged to said frame assembly and moveable between an opened and a closed position; and
    at least one handle pivotally mounted to said debris shield and having a pair of end portions which engage said doors for securing said doors in an opened position.

17. The floodgate assembly of claim 16 and further comprising a vertically pivotable service rack which receives said floodgate assembly.

18. The floodgate assembly and service rack of claim 17 wherein said service rack further comprises a rack assembly.

19. A mechanical closure device comprising:
    an enclosure having four sides, a top and a bottom with a flange projecting inwardly at the bottom and defining a discharge opening;
    a floodgate assembly interiorly mounted to said enclosure and mounting a pair of doors pivoted on a hinge assembly between an opened position and a closed position wherein the doors seal against said flange to prevent passage of water through said opening, and wherein said floodgate assembly further comprises a debris shield substantially extending between opposed sides of said enclosure and disposed above said hinge assembly;

at least one appendage mounted to each door to facilitate opening and closing said door; and a discharge drain assembly disposed on one door and having an opened and a closed position.

20. The mechanical closure device of claim 19 wherein each of said doors mounts a gasket at its underside for sealing between said door and said flange in the closed position.

21. A mechanical closure device comprising:

an enclosure having four sides, a top and a bottom with a flange projecting inwardly at the bottom and defining a discharge opening;

a floodgate assembly interiorly mounted to said enclosure and mounting a pair of doors pivoted on a hinge assembly between an opened position and a closed position wherein the doors seal against said flange to prevent passage of water through said opening, and said floodgate assembly further comprises a pair of spaced supports which mount said hinge assembly, and said supports are slidably received in opposed channel-like guides and secured to opposed sides of said enclosure;

at least one appendage mounted to each door to facilitate opening and closing said door; and a discharge drain assembly disposed on one door and having an opened and a closed position.

22. The mechanical closure device of claim 21 wherein each said floodgate assembly further comprises a debris shield substantially extending between opposed sides of said enclosure and disposed above said hinge assembly and mounting a latch assembly.

23. A mechanical closure device comprising:

an enclosure having four sides, a top and a bottom with a flange projecting inwardly at the bottom and defining a discharge opening;

a floodgate assembly interiorly mounted to said enclosure and mounting a pair of doors pivoted on a hinge assembly between an opened position and a closed position wherein the doors seal against said flange to prevent passage of water through said opening;

at least one appendage mounted to each door to facilitate opening and closing said door; and a discharge drain assembly disposed on one door and having an opened and a closed position, wherein said discharge drain assembly has a lockable latch which latches said doors in the opened position and said doors cannot be moved to the opened position unless said drain assembly is in a closed position.

24. A mechanical closure device comprising:

an enclosure having four sides, a top and a bottom with a flange projecting inwardly at the bottom and defining a discharge opening;

a floodgate assembly interiorly mounted to said enclosure and mounting a pair of doors pivoted on a hinge assembly between an opened position and a closed position wherein the doors seal against said flange to prevent passage of water through said opening, and said hinge assembly further comprises an elongated rod which engages each of said doors to form a piano hinge;

at least one appendage mounted to each door to facilitate opening and closing said door; and a discharge drain assembly disposed on one door and having an opened and a closed position.

* * * * *